US008463912B2

(12) United States Patent
Bharadwaj

(10) Patent No.: US 8,463,912 B2
(45) Date of Patent: Jun. 11, 2013

(54) REMOTE DISPLAYS IN MOBILE COMMUNICATION NETWORKS

(75) Inventor: Srinivas Bharadwaj, Sunnyvale, CA (US)

(73) Assignee: Media Farm, Inc., Los Altos, CA (US)

( * ) Notice: Subject to any disclaimer, the term of this patent is extended or adjusted under 35 U.S.C. 154(b) by 1417 days.

(21) Appl. No.: 09/863,425

(22) Filed: May 22, 2001

(65) Prior Publication Data

US 2002/0032751 A1 Mar. 14, 2002

Related U.S. Application Data

(60) Provisional application No. 60/206,543, filed on May 23, 2000.

(51) Int. Cl.
*G06F 15/177* (2006.01)
(52) U.S. Cl.
USPC ............................ 709/227; 709/228; 709/203
(58) Field of Classification Search
USPC ................. 709/227, 236, 203, 217–219, 206, 709/228
See application file for complete search history.

(56) References Cited

U.S. PATENT DOCUMENTS

| | | | | |
|---|---|---|---|---|
| 5,727,950 A * | 3/1998 | Cook et al. | ..................... | 434/350 |
| 6,076,109 A * | 6/2000 | Kikinis | ......................... | 709/228 |
| 6,199,099 B1 * | 3/2001 | Gershman et al. | ........... | 709/203 |
| 6,223,213 B1 * | 4/2001 | Cleron et al. | ................ | 709/206 |
| 6,336,137 B1 * | 1/2002 | Lee et al. | ....................... | 709/219 |
| 6,546,425 B1 * | 4/2003 | Hanson et al. | ................ | 709/227 |
| 6,643,690 B2 * | 11/2003 | Duursma et al. | .............. | 709/217 |
| 6,654,784 B1 * | 11/2003 | Wei | ................................ | 709/203 |
| 6,757,712 B1 * | 6/2004 | Bastian et al. | ................ | 709/206 |
| 7,702,719 B1 * | 4/2010 | Betz et al. | ...................... | 709/203 |
| 2004/0054717 A1 * | 3/2004 | Aubry et al. | .................. | 709/203 |
| 2010/0132023 A1 * | 5/2010 | Reese et al. | ....................... | 726/7 |

OTHER PUBLICATIONS

3GPP TS 22.057: "MExE Stage 1 Description", filed May 22, 2001.
3GPP TS 23.057: "MExE Stage 2 Description", filed May 22, 2001.
3GPP TS 22.121: "Universal Mobile Telecommunications System (UMTS); Provision of Services in UMTS—The Virtual Home Environment: Stage 1", filed May 22, 2001.
3GPP TS 23.140: "Multimedia Messaging Service (MMS): Stage 2", filed May 22, 2001.

(Continued)

*Primary Examiner* — Kenneth R Coulter

(57) ABSTRACT

A method and system that uses a thin client solution in a mobile network is disclosed. The thin client is not required to be equipped with an execution environment; rather, the client is used as a display device for applications that run on remote servers. Applications such as E-mail client, browser and others execute on a remotely located server, but use the client as a display and input device. The client is equipped with a speech input device, which receives speech input and transmits it to the server for interpretation or recognition at the server. Because bandwidth is limited, a method of combining requests that are transmitted and received between the client and one or more servers is contemplated, which method results in a reduction of traffic between the client and the server(s). The server, which runs applications that are used and accessed by a user via the client, maintains application state on the server. Thus, when a user turns "off" the client device, the server may still maintain the state of the applications the user executed at the server. When the client reestablishes connection with the server, the user's prior state may be restored.

6 Claims, 10 Drawing Sheets

OTHER PUBLICATIONS

3GPP TS 26.090: "Mandatory Speech Codec speech processing functions, AMR speech codec; Transcoding function", filed May 22, 2001.
RFC 1831, Srinivasan, R., "RPC: Remote Procedure Call Protocol Specification Version 2", Aug. 1995.
RFC 1832, Srinivasan, R., "XDR: External Data Representation Standard", Aug. 1995.
RFC 1833, Srinivasan, R., "Binding Protocols for ONC RPC Version 2", Aug. 1995.
RFC 2025, Adams, C., "The Simple Public-Key GSS-API Mechanism (SPKM)", Oct. 1996.
RFC 2203, Eisler, M., Chiu, A. and L. Ling, "RPCSEC_GSS Protocol Specification", Aug. 1995.
RFC 2847, Eisler, M., "Lipkey—A Low Infrastructure Public Key Mechanism Using SPKM", Jun. 2000.
RFC 2624, Shepler, S., "NFS Version 4 Design Considerations", Jun. 1999.
RFC 3010, S.Shepler, B.Callagen, et al , NFS version 4 Protocol, Dec. 2000.
The Festival Speech Synthesis System, filed May 22, 2001.
Multimodal Requirements for Voice Markup Languages, W3C Working Draft Jul. 10, 2000.
3GPP TS 26.234: "Packet Switched Streaming Services: Protocols and Codecs", May 22, 2001.

\* cited by examiner

REMOTE DISPLAYS IN MOBILE COMMUNICATION NETWORKS

TECHNICAL FIELD

The present invention claims priority from application No. 60/206,543 filed on May 23, 2000 titled REMOTE DISPLAYS IN MOBILE NETWORKS and application 60/277,001 filed on Mar. 18, 2001 titled VIRTUAL PALMTOP PLATFORM. This invention is related generally to client-server computing, and particularly, to handheld computing devices used in mobile communication networks.

BACKGROUND 3G is an evolving wireless standard. The types of applications used with this new standard include improved multimedia communications that combine voice, video, text and other methods. The next generation wireless communication services are expected to rely increasingly on data—including video and moving pictures—whereas the current wireless communication services are limited to voice-based applications such as telephone services. Other applications that are contemplated to use the new wireless networking standard include providing Internet browsing—web browsing—in a large number of formats; and applications that enhance personal productivity—e.g., financial, calendar, groupware, and others—and location-based services. The current systems use microbrowsers and execution environments that run on the customer terminal devices. The newly contemplated applications impose severe restrictions on the existing solutions. The amount of data that should be handled, the speed with which the data should be transmitted from and to the customer terminal device is expected to overwhelm the current architectures and strain the capabilities on both the customer devices such as the hand-held terminal devices as well as on the back-end devices such as the servers that support and deliver these applications.

SUMMARY

This disclosure is directed toward a system and method to enable a client device such as a handheld computer or a cellular telephone device. Examples of such client devices include the commercially available Palm™ Personal Digital Assistant (PDA), and similar devices marketed by companies such as Nokia Corporation of Finland, Handspring, Inc. of Mountain View, Calif., and others. The following discussion uses a novel device called a VirtualPalmTop. This device comprises hardware and/or software configured to enable a general-purpose client device such as the aforementioned exemplary devices to function in a manner as disclosed and described herein.

A feature of these client devices is that they are small (i.e., they have a small screen or a form-factor). Because of their size, which is typically configured to fit in a person's shirt pocket, they cannot be equipped with an unlimited amount of memory. Further, their processing power is limited because of limitations due to the amount of battery power available, and the amount of heat they can dissipate. A further feature of these client devices is that they are typically designed to work with a mobile communication network, and this requirement imposes additional restrictions such as the amount of bandwidth available, and how to handle in case of a service interruption or outage. Due to these and other limitations, applications that run well on conventional computers such as personal computers do not run as desired on these handheld and/or mobile devices.

Traditional systems such as the 3G PP Mobile Execution Environment (MExE) have been developed to enable execution of client applications on a client device for wireless and mobile applications. In contrast to MExE, one can execute applications on a remotely situated server, and use the client device as a mere output device rather than an execution environment. By so configuring, the client device can be adapted to handle a number of applications that may be running on a variety of application servers. For example, a browser program may be running on a first server, and an electronic mail application may be running on a second server, but the client device will be used as a common output device for both the applications. As a consequence, the client device can be treated as a thin client, with minimal need to handle complex applications locally. This configuration enables the client device to handle any type of application such as a Wireless Access Protocol (WAP) application, a Common Language Infrastructure (CLI) application, or a Java Virtual Machine (JVM) application. Accordingly, with a minimal need for additional software on the client device, any currently existing application may be accessed using this system.

In some situations, however, there is a need to perform certain localized actions on the client device as a result of a user action or inaction. Examples of these situations include the need to highlight a specified portion of the display area to indicate a user's selection of that portion of the display area. In such cases, there could be deposited on the client device a small piece of code to handle these localized actions without the need to transmit an indication of the user's action to the server and wait for an instruction as to how the user's action should be handled. As a result, the amount of data transmitted from the client device to the server (and back) is somewhat reduced.

A second feature of the disclosed system is to further reduce the amount of data transmitted from the client device to the server. This is accomplished by the use of a novel feature called a "compound request." In a normal client device, all user interactions generate "events." An event is typically a result of a user action or inaction. When events are generated at the client device, they are transmitted to the server, whereupon the server takes an appropriate previously defined action or may simply ignore the events. These events are sent to the server from the client device in a data packet. But if a large number of data packets are generated at the client device, and all these packets are sent to the server, the limited bandwidth offered by the wireless network may not be able to effectively handle them. Moreover, the transmission delay—also called "latency"—of these "event" data packets decreases the responsiveness of the system and may lead to user frustration. Combining a number of events that occur in a predefined time interval and transmitting them in a single data packet alleviates this problem. It should be noted, however, that these principles do not require that only one data packet be transmitted; rather, a fewer number of data packets than are typically sent will reduce the latency problem. Similarly, a number of responses from the server to the client device can also be combined and sent in a fewer number of data packets to save bandwidth.

In order for the client device to provide a display interface to a number of applications that may run on a number of different application servers, it is necessary to maintain the state of each of these applications at some location, preferably on the respective servers. Advantageously, the state of the application programs may be stored so that in case of a disconnection between the client device and the server, a user may reestablish his state easily.

Software Configuration on the Client Device

The presently disclosed system includes a client device configured to support the above-mentioned features. It should be noted that a client device contemplated for use with this invention does not need an execution environment, as is the case with commercially available handheld computers such as Palm™. The presently contemplated client device may use only a graphics protocol engine rather than a full-fledged execution environment. Of course, it should be easily understood that in alternative embodiments, the graphics protocol engine could be added to a commercially available handheld computer, which may include an execution environment to function according to the method disclosed herein. The description provided in this document presents the features of the client software, which features are collectively called VP client. VP client features include, a graphics protocol subsystem, an event protocol subsystem, a speech protocol subsystem, and an ALM protocol subsystem. Also present is a cache management subsystem, which is configured to combine user actions and manage drawables and server requests.

Application Perspective

From an application environment's viewpoint, a Virtual PalmTop Client device abstracts its display as a series of drawables on which certain drawing actions are possible. The protocol between the client device and the server enables actions on these drawables and sending of user events back to the applications running on the server.

Four different protocols come together to define a system for running a broad range of graphical applications, multimedia applications, multimodal applications, etc. FIG. 7 describes the 4 different protocols used by the invention that operate between clients and servers. Of these, Graphics and Speech Interface Protocol specifies the mechanism of how the user display is updated and how multiple drawables on the client are managed and the use of compound actions to update and manage them.

The invention contains several different components. The Graphics and Speech protocol outlines a basic graphical interaction. There are several different capabilities in this protocol. They are, (1) Capability Negotiation—Query the device for its capabilities and negotiate a list of capabilities to use in subsequent requests; (2) Mandatory Drawing Requests—a range of requests that establish the mandatory parts of the drawing protocol; (3) Optional Widget Protocol—a list of optional requests that allow a server to use the Widget capabilities of a device if they exist; (4) Drawable Management; (5) On Action primitives; (6) Visual Objects and Management; and (7) Speech support and Notification.

The Event System protocol delivers user events and input back to the application running on the server. A variety of input methods are possible, including Key and Mouse style devices, touch panels, etc. In addition, speech too can be an input method. The Event System protocol delivers the various inputs to the server and these are used to send input actions up to the application.

The ALM protocol along with DHCP is used to bootstrap handsets back to their prior existing state notably by helping them reestablish connections to the user's running applications. They also offer a way of launching new applications.

An implementation would involve a 2.5 Generation or $3^{rd}$ Generation Wireless WideArea or Wireless LAN network. Handsets would run the VP Client. Servers hosted at the Mobile Service Switching Center (in the case of the Wide Area Solution) would act as the VP Server. The thin client would use these servers to run applications downloaded from the Internet or those provided specifically by the service provider. An alternative emobodiment would involve a trusted Application Service Provider which purchases networking that allows it to run the same applets and applications on behalf of the client. A third embodiment would involve an enterprise or other service provider owning and operating the VP server. It is also possible for the server to be agented and a mobile RPC implementation allowing an agent to exist between the server and the client. The agent would mediate requests and act as a buffering agent that bridges two networks, namely the wireline internet and the wireless mobile network.

An alternative embodiment exists in Wireless LAN environments. In these environments, the VP client and server interact over the Wireless LAN in a similar fashion. It is also possible for a handset to use both environments. In this case as the user leaves the WLAN environment and goes over the wide area environment, the user can connect back to his previously running applications now using the wide area connection or vice versa. Advantageously, the applications may also be migrated.

Software Configuration on the Server Computer

As is the case with the client device, the server computer is programmed to execute a number of subsystems, each designed to interact with a similar subsystem on the client device. Accordingly, counterparts to the each of the several subsystems present in the client device, namely, the graphics subsystem, the event protocol subsystem, the speech protocol subsystem, the ALM subsystem and the cache management subsystem, are present in the server computer. In addition to these subsystems, the server computer also executes application programs for use by a user of the client device and optionally, an execution environment such as a Java Virtual Machine.

An aspect of the present disclosure includes a method of compounding drawing requests and other transmissions from the server. For example, certain display actions required to update a drawable can be aggregated into fewer actions and sent to the client, thereby conserving bandwidth. This can be implemented in a number of ways. For example, if one considers a display system to be a series of drawables, one can aggregate a series of requests to draw an object on the client device and send the aggregated actions to the client in a fewer number of transmissions.

Additionally, a feature of the presently disclosed system includes storing these compounded drawing requests in the server for later use. By thus storing the data transmitted to the client device at the server, the server can maintain state information for the client device. In case the client device is turned off or otherwise "lost" its state, the server can restore the client device's state by retransmitting ("replaying") the client's state information to the client device. A number of transmissions to be sent to the client can be aggregated and sent as fewer transmissions than ordinarily required.

As will be explained in detail below, the server computer is configured to include an Application List Manager (ALM) module. The Client deals with the ALM server. ALM server keeps track of the number of applications currently run by the client, and a list of available applications. The respective servers where these applications were running when the client is turned off store and maintain a log file for that client for that application. When client is turned on, the ALM server notifies the client (or the client informs the ALM server) and the original client state is restored.

VP Client Specification

The VP Client specification requires a set of mandatory procedures and a set of optional procedures. The mandatory procedures are raw drawing primitives and primitives intended to establish the initial capability negotiation and connect the system. Additional primitives like Widget primitives, drawable manipulation, OnAction Primitives, Visual Objects and support procedures for compound requests are optional.

The VP Client provides the necessary display abstraction needed by a server to first obtain information on the capabilities of the display notably its form factor, color capabilities, voice capabilities and input capabilities, support for compound requests, caching, widgets, etc. VPSYSTEMINFO, INITIALIZEGRAPHICSYSTEM, INITIALIZEEVENTSYSTEM, GETVISUALINFO provide support for such capability negotiation.

An illustrative sequence of packets that can establish a client/server session can be described as follows:

```
Server      ------- VPSYSTEMINFO----→                        Client
            ←----- VPSYSTEMTINFO (REPLY)
Server      --------INITIALIZEGRAPHICSSYSTEM-→               Client
            ←----- INITIALIZEGRAPHICSSYSTEM (REPLY)
Server      ------InitEventSystem →                          Client
Server      ←----InitEventSystem (Evnt protocol) ------------ Client
            -------InitEventSystem (REPLY)----------------------→
Server      ←-----InitializeEventSystem (REPLY) ------------- Client
```

This initial exchange sets up the Client and server to interact. The VP client then awaits requests from the server requiring drawing actions on drawables or other display or output actions. When there is input, the VP client picks up these events and delivers them to the server using the DeliverNextEvent or DeliverEvents requests of the Event Protocol.

An External Data Representation (XDR) library on the client first decodes every server request. Thereafter, VP Client executes a corresponding drawing action. The server request can be either a simple or a compound request. If it is a simple request, then after the drawing action is taken the client replies with VPOK or indicates the cause of the failure. If it is a compound request, the client executes the various subrequests contained in the compound request in a predetermined sequence and then returns the results in one large reply. If any of these subrequests fails, the client may both stop executing additional requests and return with a failure indication and the list of committed requests. Alternatively, the client may ignore the failed subrequest and continue processing the remaining subrequests. The server can then replay the rest of the requests as it sees appropriate.

A server will then use either a raw drawing protocol and/or a widget protocol. If the VP client and server negotiate that the client supports compound requests but not widgets, then the VP server will look to issue a sequence of drawing actions corresponding to each widget drawing request. The following code is an example of a graphical application in the Java programming language:
Button b=new Button ("ABUTTON");
f.add (b);
Scrollbar B=new Scrollbar ( . . . );
f.add (B);
f.setVisible ( );

The above will cause the setVisible request to issue possibly one or two compound requests to the VP client. This may lead to a single Compound Request (CR):

```
---
|      DrawRect      |
|      DrawLine      | → These represent CR for Button
|      DrawString    |
|      DrawRect      |
|      DrawRect      |
|      DrawPolygon   |
|      DrawPolygon   | → These represent CR for Scrollbar
|      DrawRect      |
|      DrawLine      |
|      DrawLine      |
---
```

The ability to batch requests represents an enormous win for thin client solutions over wireless when compared to the use of single drawing requests both in minimizing overhead and reducing over-the-air latency. Individually and serially sent the 10 requests would take 1 second on a wireless network with 100 ms. latency as contention to regain control enormously slows down the network with additional costs relating to interrupt latency etc. adding marginal delay. Using the one compound request, the thin client solution reduces it to a single data exchange.

A client can cache requests on drawables as it chooses but must do so on an all or none basis. This enables cache replay on a per drawable basis. The VP Server section provides an illustration for how efficiently drawable state can be reestablished by a VP server on a client.

The VP Client tracks these drawables. A preferred embodiment might store the drawable cache in Non-Volatile Memory but this is NOT a requirement. At a time only one application is considered ACTIVE in a VP client. The VP client could switch from application to application. As it does so, the drawables of suspended applications are deleted gradually to make space for new drawables for the active application. This form of lazy caching—i.e., not discarding cache soon after it is no more needed or actively accessed—is also commonly used in microprocessor memory hierarchies, virtual memory systems and caches in file systems. The VP client which is close to the display where there is minimal memory present is viewed as a more expensive cache for requests on active drawables. A discarded cache can be updated as and when required by the corresponding server side environment (like Java Virtual Machine) supporting the application.

The VP client implementation can vary based on the capabilities of the device. On a device with a very good Windowing system and widget library a very advanced implementation is possible.

BRIEF DESCRIPTION OF THE DRAWINGS

These and other features of the principles of the disclosed system are more readily understood from the following detailed description in conjunction with the accompanying drawings, in which.

DETAILED DESCRIPTION

Definitions

Figure 1:
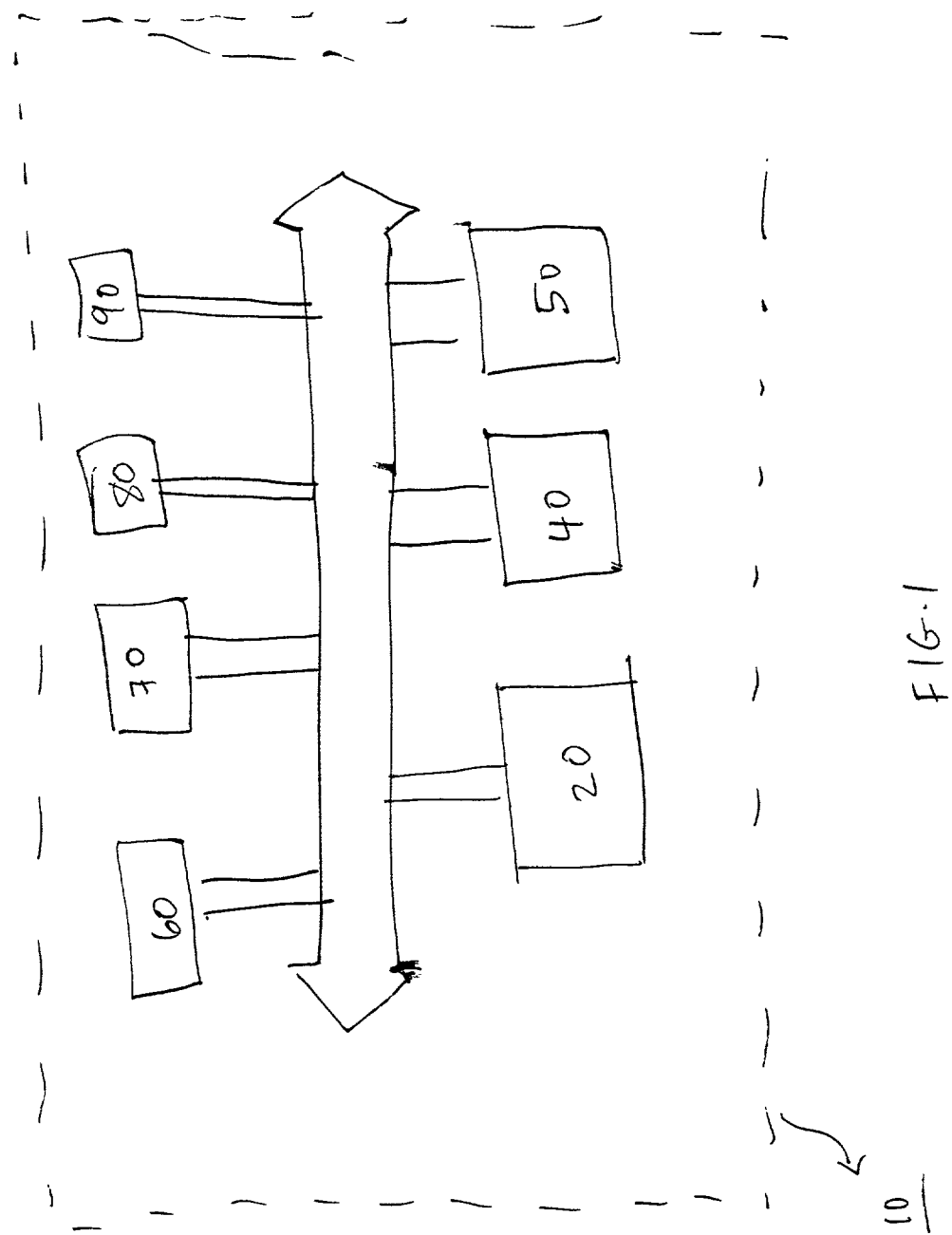
FIG. 1 shows a client device that can be adapted to practice the principles of the present invention.

Pixmap: An off-screen buffer on which a graphics can be drawn. After drawing into a pixmap, the graphics can be copied to a window and cause the graphics to appear on a screen if the window is visible. It should be noted that there is no need to have a pixmap buffer; a graphics can be drawn on a window directly. But using a pixmap helps a rapid update of the screen without repeating a series of primitive drawing operations. Pixmaps are typically used to store image data such as icons, logos that are loaded from a disk. These images can then be copied to a window. Like windows, pixmaps are server-side resources.

Bitmap: A bitmap is similar to a pixmap, except that in a bitmap a single bit represents each pixel. In X-windows terminology, a bitmap is considered a pixmap with a depth of 1.

Drawable: A drawable is anything on which a graphics can be drawn. Drawables include windows, pixmaps, and bitmaps. According to X-windows terminology, everything that can be displayed is a drawable Window: In X, a window is an actual visible drawable element, and is normally rectangular in shape, though this shape can be modified. Pixmap, on the otherhand, is an off-screen chunk of memory to which one can draw a graphic, but a pixmap is not visible. Windows can have child windows that are bounded by the parent window. Windows can be resized, moved, their masks changed, reparented to other windows, mapped (i.e., once a window is created, it must be mapped to make it visible), unmapped (i.e., a window can be made invisible by unmapping it) and destroyed. Windows and pixmaps can be drawn using several primitive drawing functions provided in X. Among others, this includes drawing lines, rectangles, polygons, filled rectangles or polygons, arcs, filled arcs, copying one drawable to another drawable, etc.

Events: An event is a happening on a window. This could be a user action such as a button press, button release, key press, mouse click, exposure of a window on a screen, resizing a window, moving a window or an object, or simply moving a cursor or a mouse pointer on a window. A window can be configured to select what events are captured or serviced by that window. The events a window can select are enumerated by turning on appropriate bits in an "event mask." A programmer can configure an unlimited number of events including some events based on a user inaction such as timeout after a window is exposed, the amount of time expired after a button is pressed and held before it is released, etc. When an event occurs, if it is masked, then it can be captured by the server (in the case of X-windows) and propagated to a predefined code segment called an "event handler." The event handler either ignores the event or performs an action responsive to the event.

Server: The word "server" is used in two different ways in this document. "Server" as applied to a client-server hardware system implies a server computer that services a client device's needs. On the other hand, the word "server" as applied to a user-interface ("windowing") environment denotes a program that runs on a computer with which a user interacts. In a client-server computing system using an X-window type user interface environment, the "X-server" is a program that runs on the client device and is configured to capture events that are generated at the client device and transmit them to an "application" running on the server computer. In this document, the word "server" should be understood based on the context in either of these two ways.

Agent: An "agent" as used in this document is an intermediate computer that may control, manage, mediate or coordinate the data transmission activities between the client device and the server computer. In the disclosed system herein, the agent computer is an optional component.

Hardware Architecture

As illustrated in FIG. 1 a client device 10 configured according to the principles disclosed herein includes a central processing unit 20 ("CPU"), which could be a general-purpose processor such as an Intel® StrongARM® processor or a special-purpose processor. The CPU 20 is connected through a bus 30 to, among other things, volatile memory 40 (also called RAM or random access memory), non-volatile memory 50 (such as disk drives, CD-ROMs or data tapes), a network communications adapter 60 (such as an Ethernet card), an input means 70, such as a keyboard and/or a pointing or point-and-click device (such as a mouse, light pen, touch screen, touch pad, joy stick, jog dial), an output device, such as a video display screen and/or an audio speaker, and a removable media drive 80, such as a floppy disk drive, CD-ROM drive, PCMIA port, CD-WORM drive or data tape drive.

The client device 10 operates client software 90 for use with the present invention. The client software is shown graphically in FIG. 1 as being stored in non-volatile memory 50. However, it should be understood that it can also be stored in transportable media read by removable media drive 80. All, or portions of the client software 90 also can be loaded into volatile memory 40 (RAM), for example during operation. Exemplary transportable media implementing the client software (which may be in any form, such as source code, compiled or binary versions) include floppy disks, magnetic tape and optical disks, and others. In one embodiment, a client device is a portable computer such as a hand-held device and the electronic communications network is a wireless network connected to the Internet or an online service. Further, "Client device" or "Client device" 10 should be understood in this description to include any portable or hand-held device used for access an electronic communications network, such as a data processing system.

The client is optionally equipped with a location-determination device (not shown in FIG. 1) such as a Global Positioning System (GPS) receiver whereby the physical location of the client device, i.e., its coordinates or other information that allow one to locate where the client device is located. With the help of such location determination device, the location of the client device can be determined and the location information can be transmitted to a remote server. Using GPS information, location-based services can be provided to the client. Other methods of determining location include known methods such as triangulation such as those used in locating the position in cellular telephony applications may also be used. An advantage of determining location is that a user may see a different set of applications based on whether he/she is in a shopping mall, an airport, or a different location.

The client device is also equipped to receive speech input from a user. A microphone can be incorporated to accomplish this (not shown in FIG. 1) or other speech input device such as a telephone into the client device. Speech can take two forms: (1) either it can be speech as a part of the payload such as in the case of a telephone call, i.e., when the client device is used to make ordinary telephone calls, or (2) when speech is provided as a way to instruct an application, for example, in the case of an E-mail application, a spoken input may be used to command the E-mail application to send a reply to an E-mail.

Some embodiments described herein are related to methods to achieve better results in wireless hand-held devices. In addition, such client devices may effectively employ the present invention when utilizing a variety of operating systems or programming languages, such as the "Windows-CE", "Windows ME", "Palm OS", "Linux" or other operating systems such as real-time operating systems.

Figure 2:
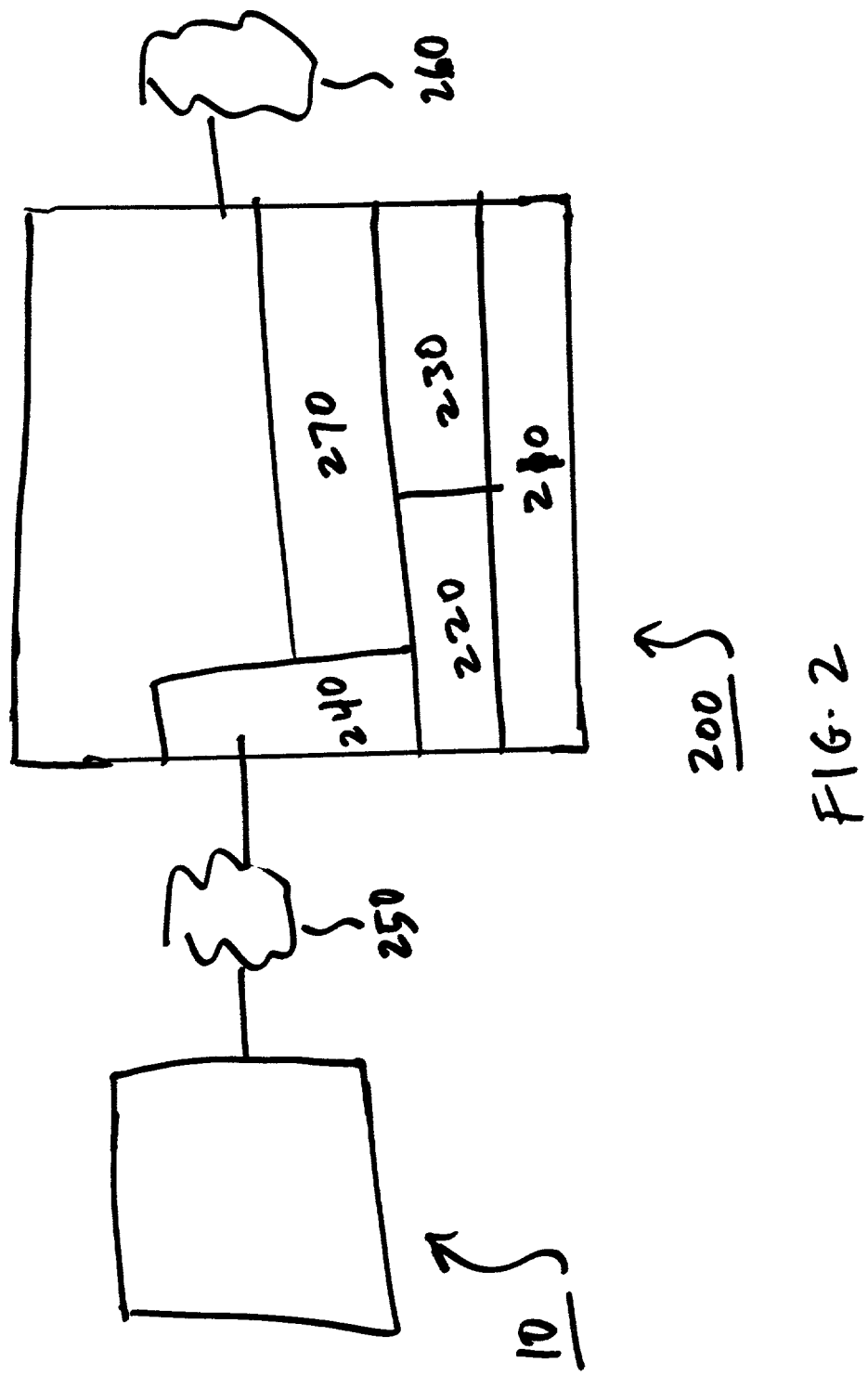
FIG. 2 depicts a server computer that can be adapted to implement the principles of the present invention.
Figure 3:
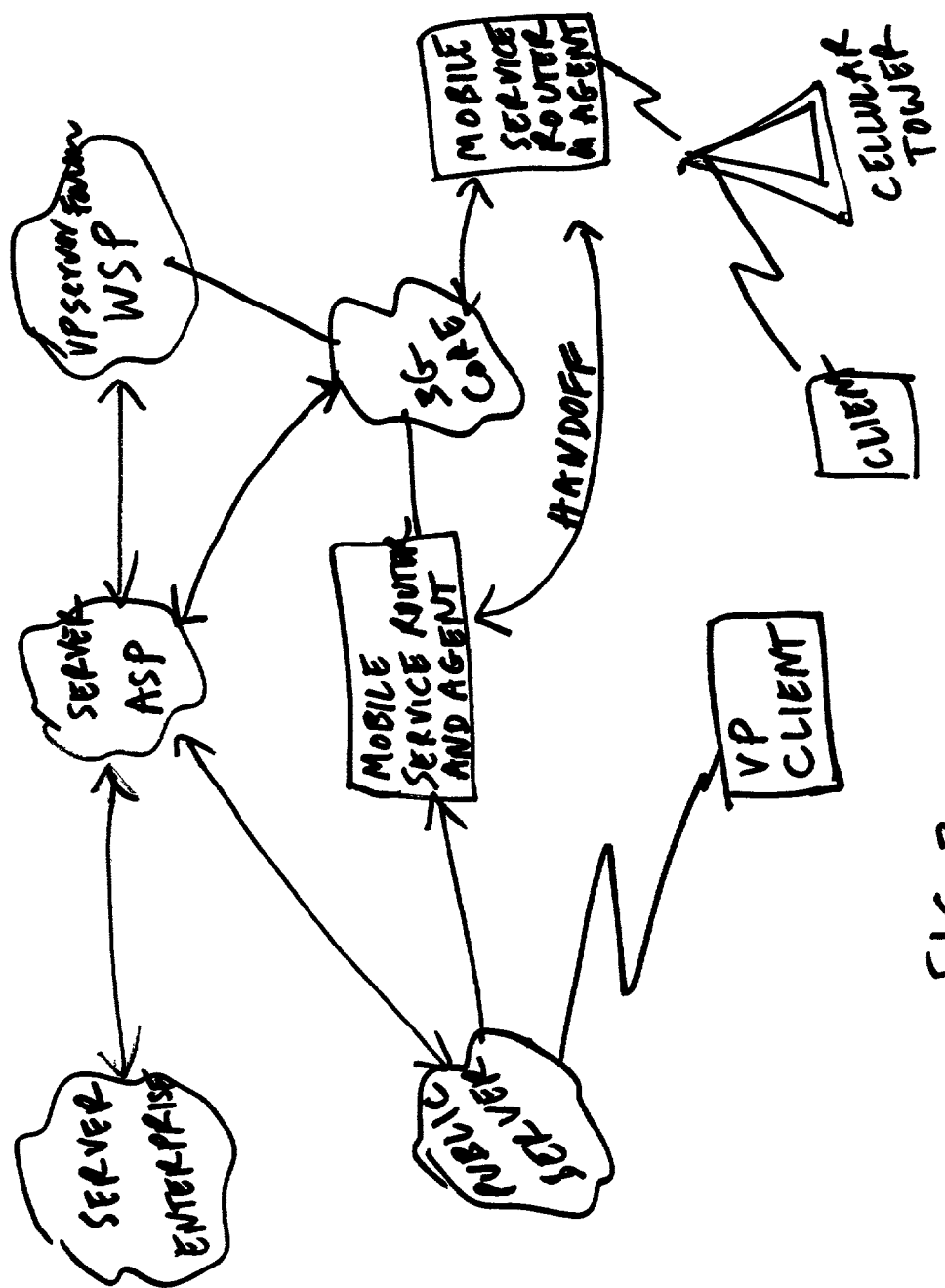
FIG. 3 describes the 3G Environment depicting servers and clients including several server farms hosted in the service environment at the mobile switching services center (MSC) by the Wireless Service Provider, or at an ASP or within an Enterprise.
Figure 4:
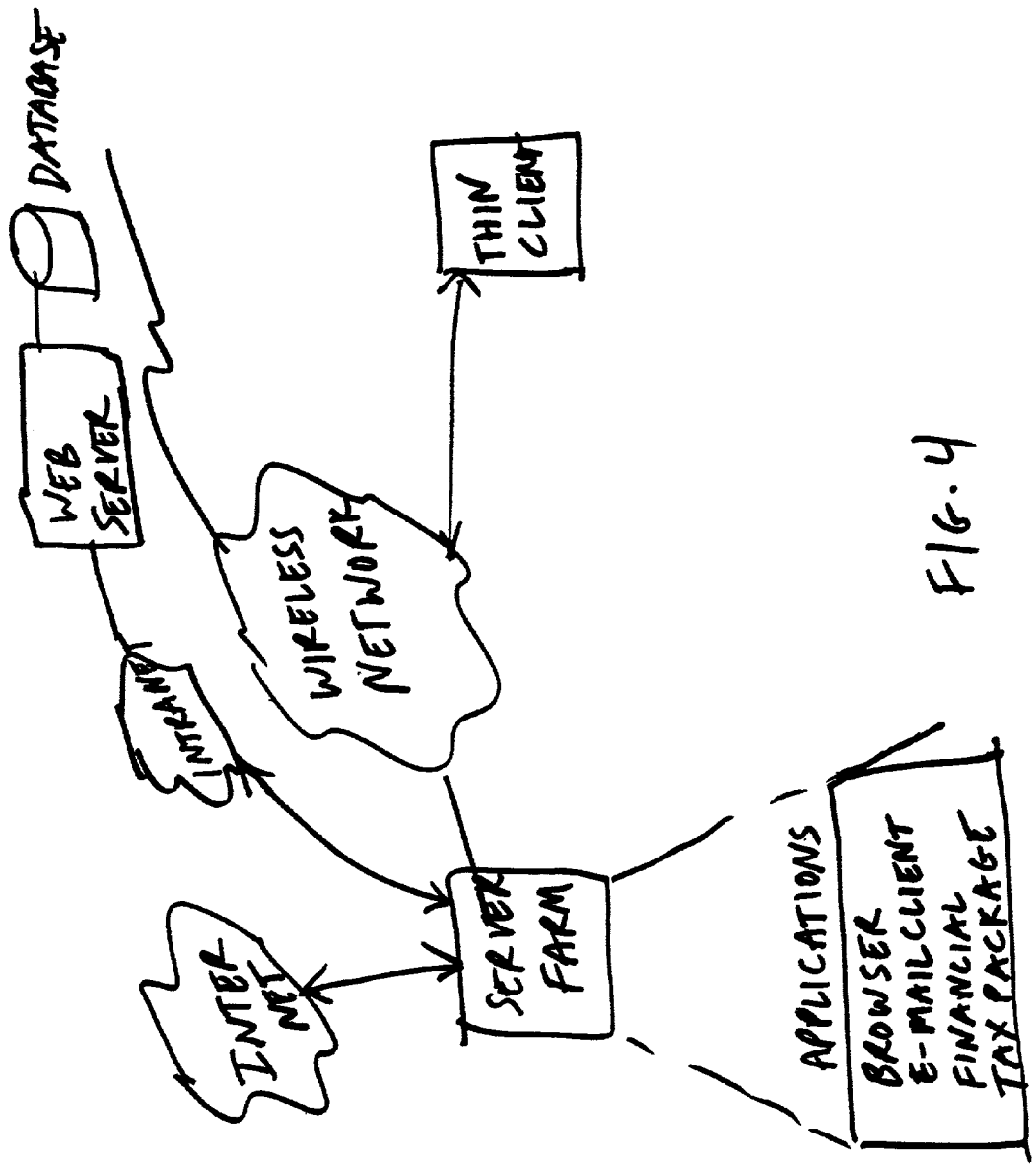
FIG. 4 describes the conceptual architecture for a client device configured according to the principles disclosed herein, which figure shows a plurality of applications running on remotely located servers using the client device for output (display), in addition to a depiction of activity from the client device transmitted to the server.

FIG. 2 is a block diagram showing a server computer 200. The server computer 200 includes a general-purpose microprocessor 210 such as a IBM RS/6000™ processor, a storage device such as a hard disk 220, memory device 230 such as semiconductor memory, and a communication device 240 that enables the server computer 200 to connect to a network such as a wireless communication network 250. The server computer 200 is further connected to other data communication networks 260 such as the Internet—also known as the World Wide Web—and other public and private networks. The client device 10 is illustratively coupled to the server computer 200 via a mobile communication network such as a 3G network 250. See FIG. 3. In operation, the processor 210 operates software such as server software 270 adapted for establishing a communications link with the client device 10. Operation of the server software 270 is discussed in more detail below. Exemplary transportable media implementing the server software 270 may be in any form, such as source code, compiled or binary versions. The server computer 200 and the client device 10 may be programmed to execute instructions that instruct the respective processors to act in accordance with the principles disclosed herein.

As stated above, the client device is coupled to the server computer using a wireless communication link. This link is explained below in the section 1.1.3 entitled Overview of the Speech Interactions and Protocol.

The following describes one or more illustrative embodiments of the principles discovered. These illustrative embodiments should not be used to limit the spirit and scope of the novel principles disclosed.

The VP Server

Figure 7:
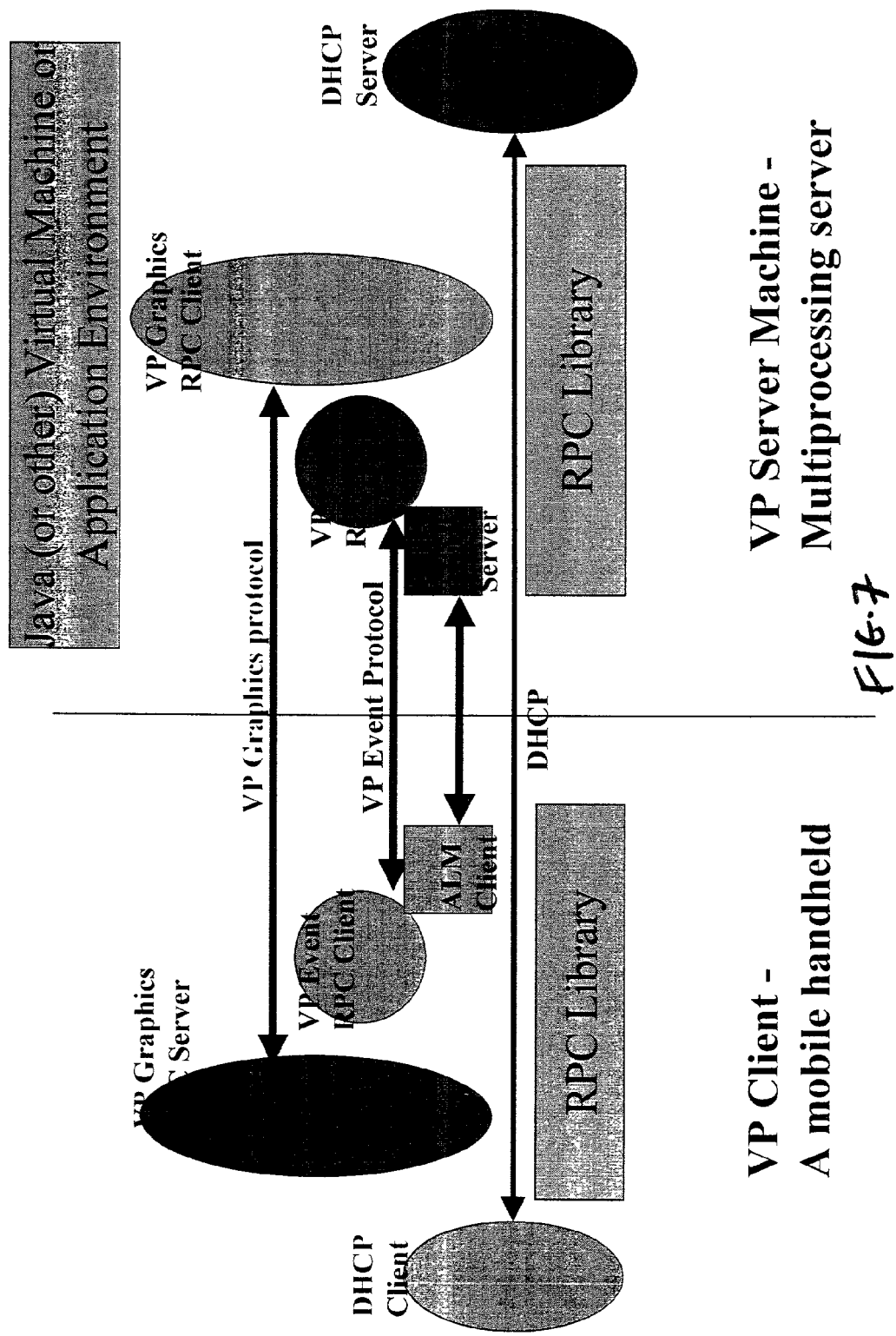
FIG. 7 pictorially describes aspects of certain protocols—VP Graphics protocol, Speech Protocol, Event Protocol, ALM Protocol, remote procedure call (rpc) and DHCP—in addition to RTP, an optional protocol for speech and multimedia.

FIG. 7 shows various protocols run by the VP Server. There are several different, possibilities for implementing VP Servers. Illustrative server configurations would include application-running servers that also interact with Speech recognition servers for running multimodal applications.

Figure 8:
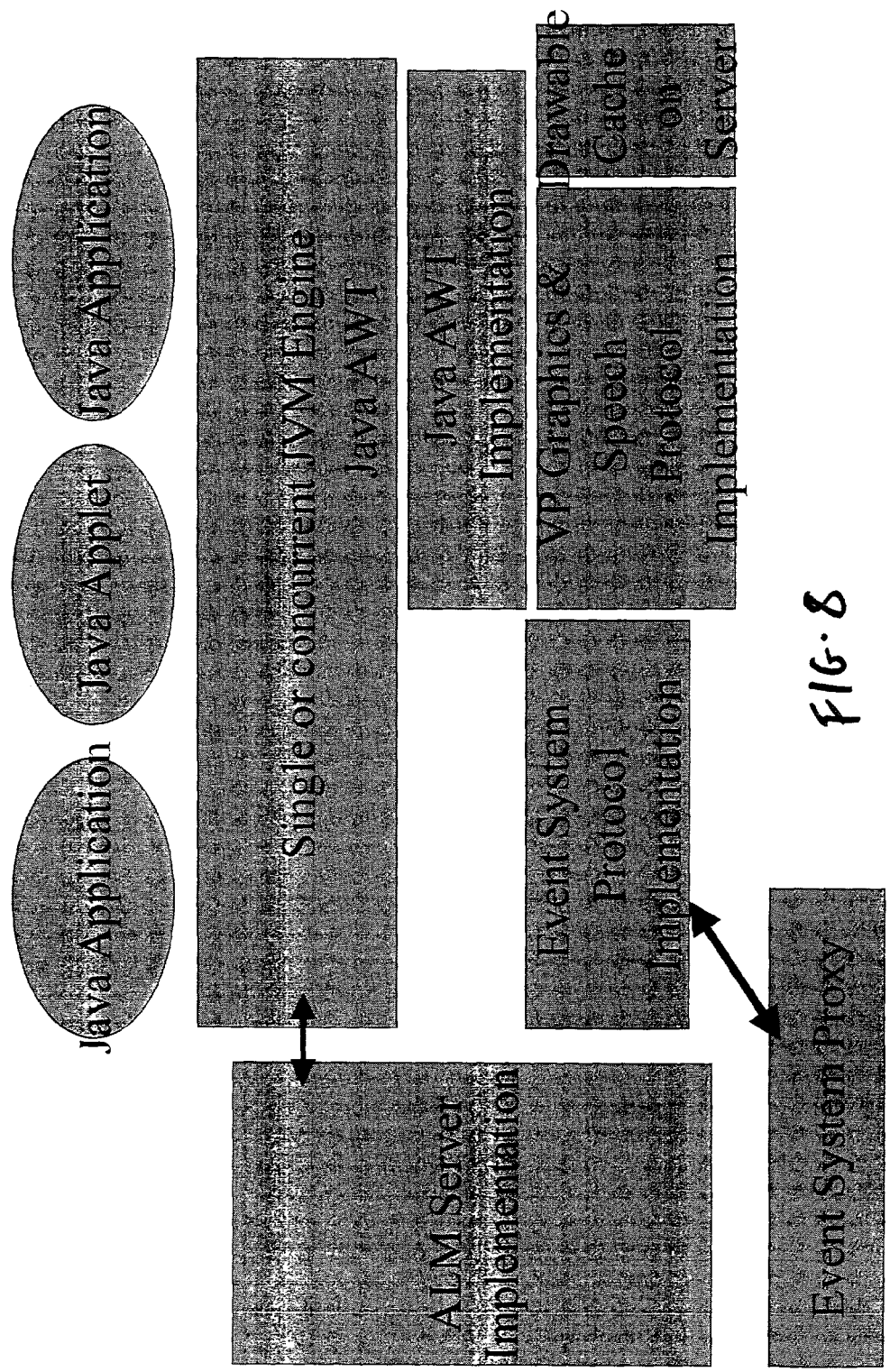
FIG. 8 shows an illustrative embodiment of server software implementation using the Java® programming language Abstract Windowing Toolkit (AWT).

FIG. 8 shows an exemplary embodiment implemented in the Java™ programming language. Higher end Java implementations like the Personal Java® Application Environment has an Abstract Windowing Toolkit implementation. This windowing platform provides a wide range of capabilities including Widgets like ScrollBars, TextAreas, TextFields, etc. as well as the ability to support multiple Windowing components on one or multiple windows. A server side implementation must maintain complete caches of all drawables and look to maximally use compound requests by aggregating various drawing actions. An implementation must look to perform several drawing actions at once. For instance, all drawing actions to a given panel that contains multiple widgets like buttons, text areas, etc. can all be aggregated into one compound request.

Figure 9:
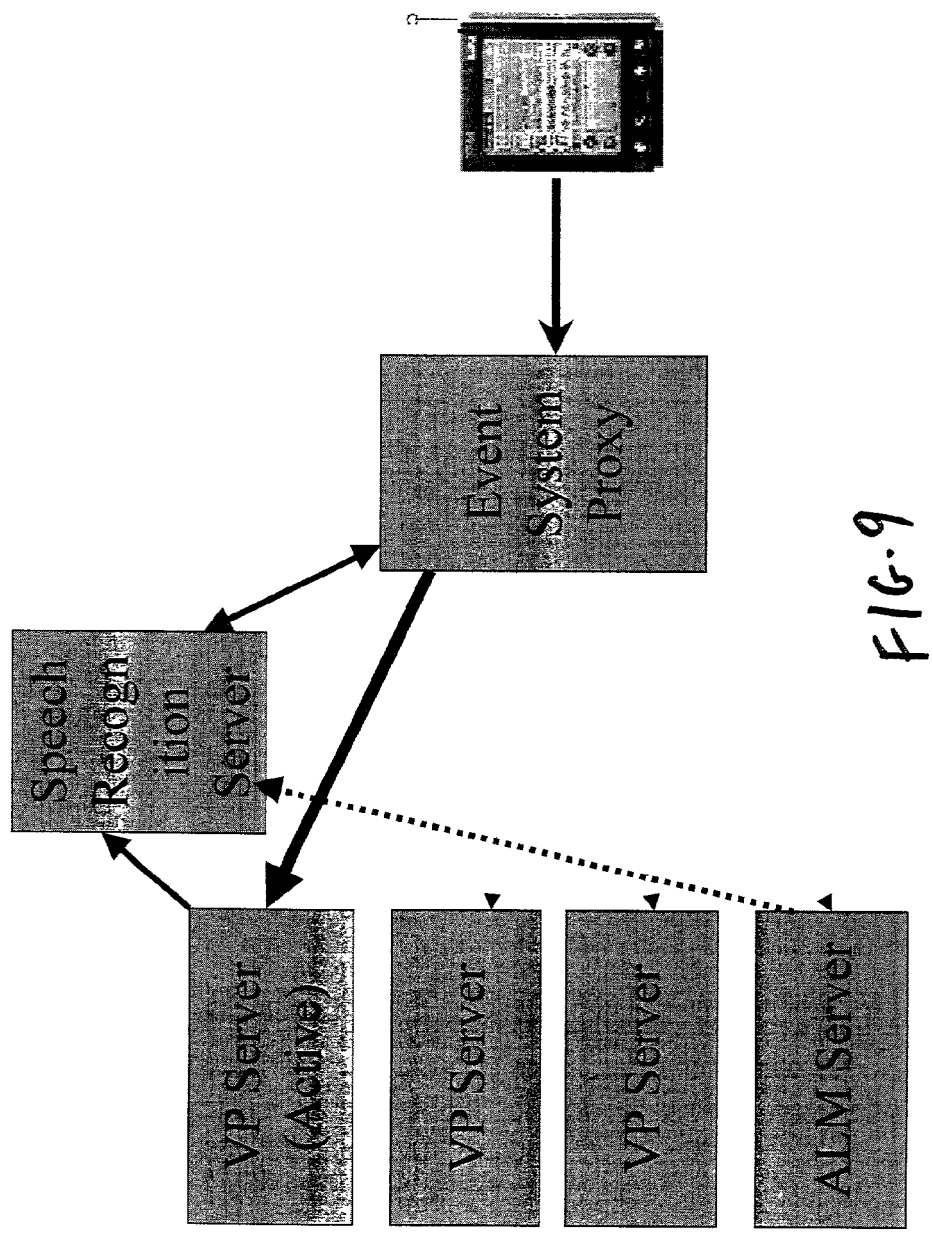
FIG. 9 outlines a sample configuration for a multimodal server farm that uses speech, and display as methods of communication.

FIG. 9 outlines a simple configuration for a server farm. The Application on the VP server using an interface like Java.speech, handles speech input. The Speech Recognition server receives user input from the Event System proxy (or alternatively from an RTSP connection with the handset) and following recognition returns the recognized speech back to the VP Server where the application would take appropriate action. An illustration—a user gesture (through touch), pointing to Australia, with a voice command, "Airport Locations", will result in the event proxy sending the touch gesture directly to the VP Server and there on to the application, with the voice information sent to the Speech Recognition server which following recognition is sent to the Application, which then outputs, "Sydney, Melbourne, Canberra, Perth, . . . " on the map. This form of multimodal application is possible with VP as the application runs in the network.

The VP servers in a server farm configuration on an MSC would implement the ALM protocol and run various applications. The ALM protocol implementation will wait for requests from a VP client. When the VP client contacts ALM, it will look to either launch the ALM UT application on a VP server that ALM specifies or directly connect to one of the existing applications that the user left running on this or other server.

Figure 5:
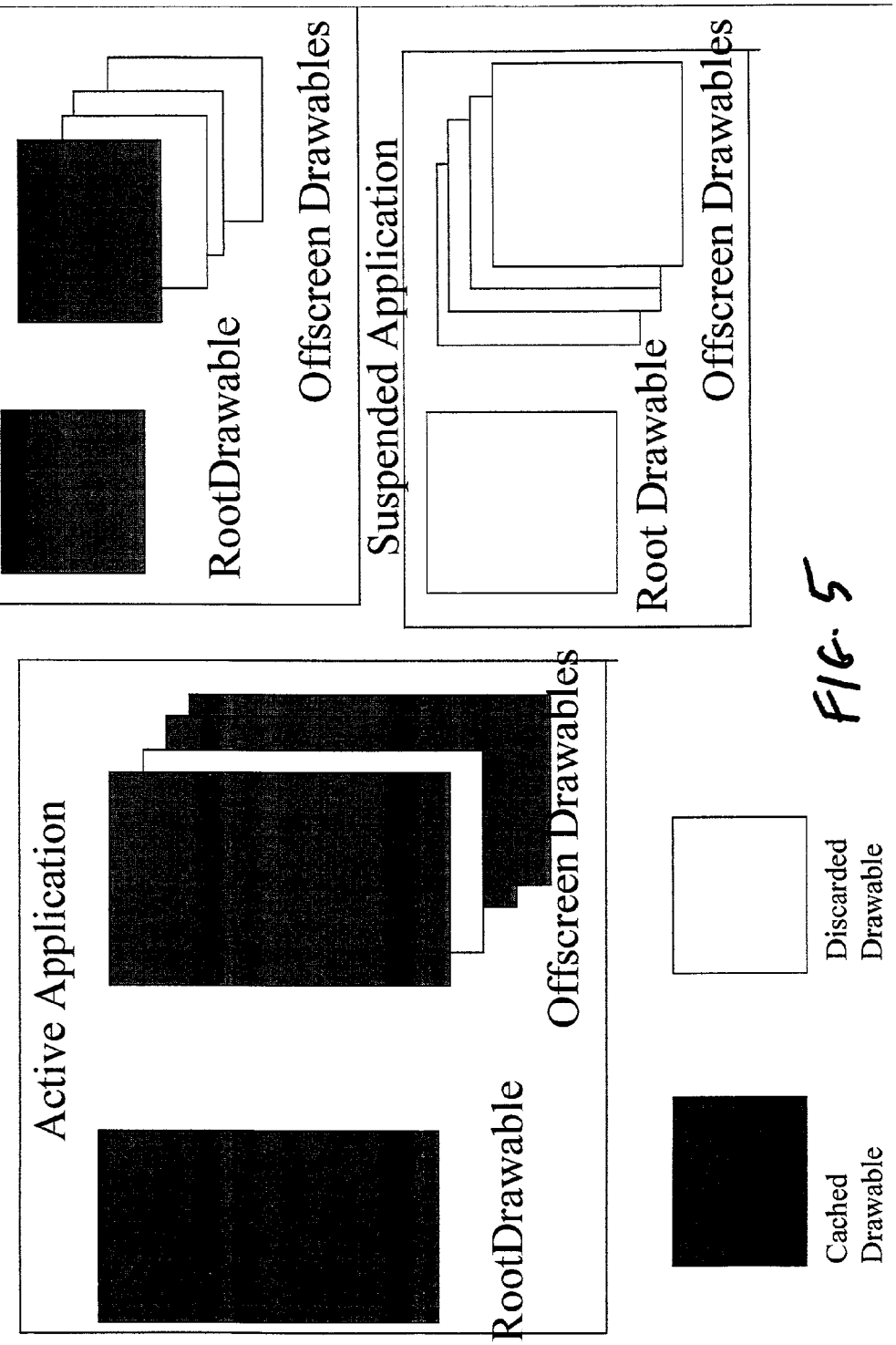
FIG. 5 depicts drawable cache on an illustrative client device configured in according to the principles of the present invention, and three applications—one active and two suspended—each with a set of drawables, wherein the solid colored drawables indicate full caches while the white colored drawables indicate cleared caches.
Figure 6:
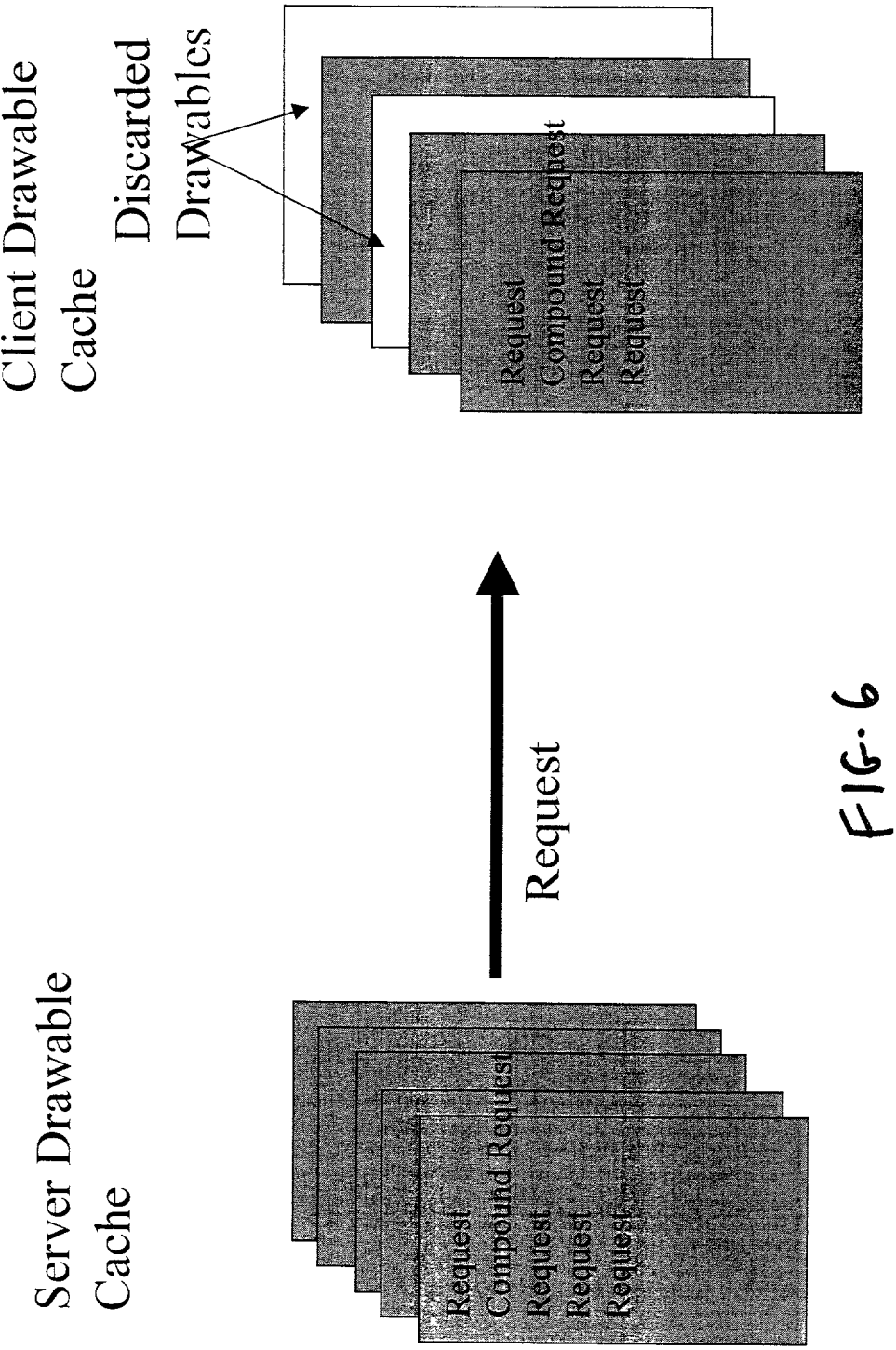
FIG. 6 depicts a server and a client configured according to the principles of the present invention showing a request from the server to the client, wherein the server holds all of its drawables, and the client has cleared its cache on some drawables.

Referring now to FIG. 5, the VP server running this application then examines the drawable cache on the client and replays the cache on the appropriate drawables, which are either stale or discarded. The server then issues a command LISTDRAWABLECACHE, which causes the VP client to return the list of drawables available. The VP Server then updates the discarded drawables using single large compound requests as shown in the example below. It then does a REPAINT DRAWABLE or SHOWDRAWABLE to bring the Client VP display state back into sync. The application then proceeds as the active application for this VP.

For example, consider the following application,
Abutton=new Button ( ),
AtextArea=new TextArea ("Enter text here . . . ");
Ascrollbar=new Scrollbar ( );
. . .
setVisible ( );

The AWT implementation would then take action to display the frame on the display. The technology at the time of setVisible must perform all the drawing operations associated with Abutton, AtextArea and Ascrollbar all at once using one single compound request. This large compound request would be able to reduce the traffic to fewer—in the example shown, a single exchange—hereby conserving bandwidth and possibly ameliorating the latency problem.

Cache replay also can be in the form of compound requests if the VP client supports it. This will allow a large set of requests to be replayed all at once. The mechanism for a REPLAY could make the best use of compound requests by using the stacking paradigm allowed for drawables.

Thus, an original sequence of requests—

```
                CREATEDRAWABLE -> DRW1
                CREATEDRAWABLE -> DRW2
    ----
    |           DRAWRECT DRW 2
    C           FILLRECT DRW2
    |           COPYAREA DRW2 DRW1
    ----
    ----
    |           FILLRECT DRW1
    C           DRAWPOLYGON DRW1
    |           DRAWPOLYGON DRW1
    ----
    ---
    C           DRAWIMAGE DRW1
    |           FILLRECT DRW 1
    -----
```

Would be replayed as follows as 1 compound request

```
    ----
    |       CREATEDRAWABLE
    |       PUSHDRAWABLE DRW1
    |       CREATEDRAWABLE DRW2
    |       PUSHDRAWABLE DRW2
    |       DRAWRECT (CURDRAWABLE)
    C       FILLRECT (CURDRAWABLE)
    |       COPYDRAWABLE (CURDRAWABLE) (CURDRAWABLE -1)
    |       POPDRAWABLE
    |       FILLRECT DRW1
    |       DRAWPOLYGON DRW1
    |       DRAWPOLYGON DRW1
    |       DRAWIMAGE DRW1
    |       FILLRECT DRW1
    -------
```

This is a simple implementation illustration, which shows how efficiently drawables can be replayed using the mechanisms available in Virtual PalmTop.

Event System Implementation

Figure 10:
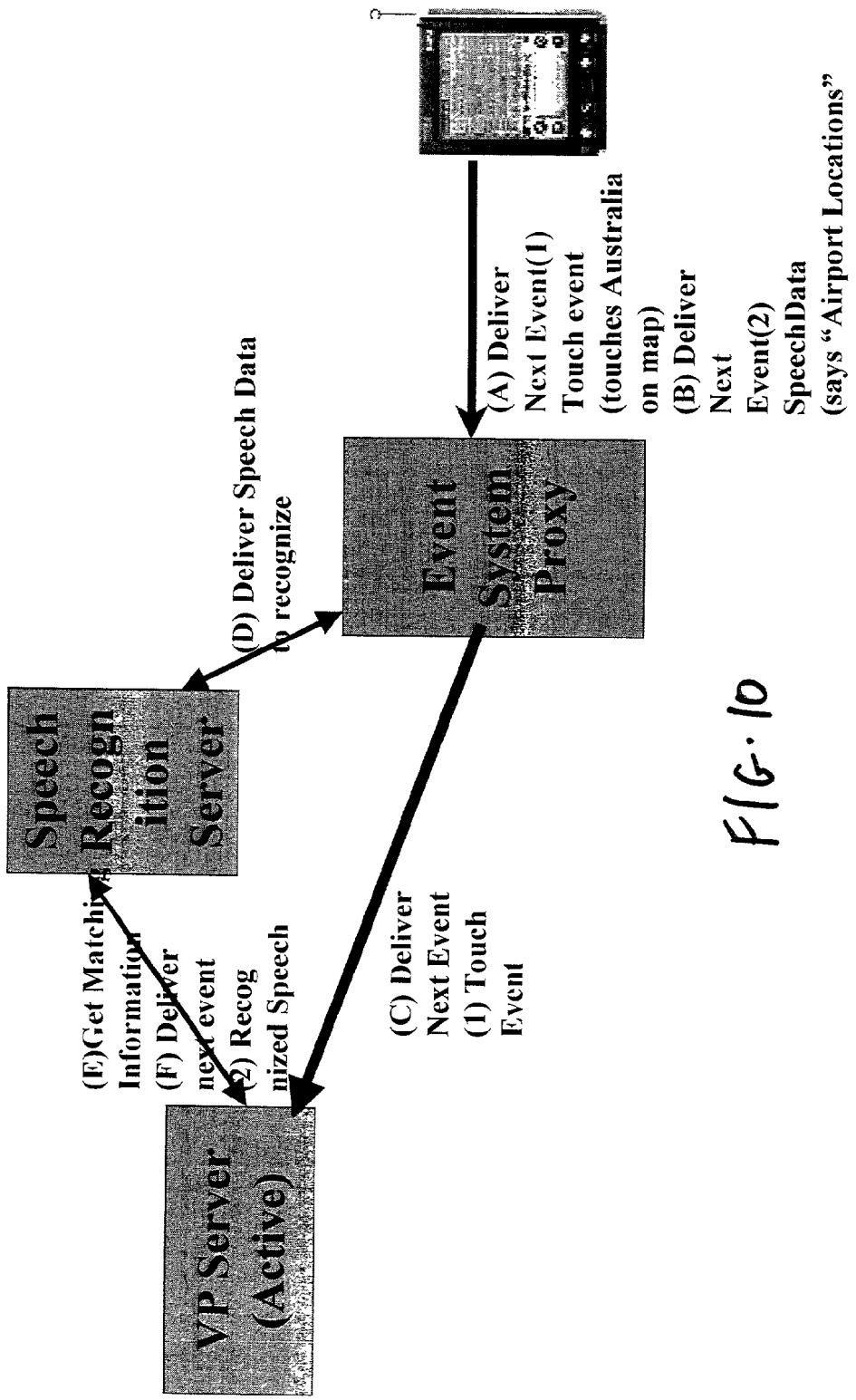
FIG. 10 shows an illustrative interaction of input events in a multimodal (speech and display) application.

Referring to FIG. 10, the event system implementation on the server can either use an agent or it can be implemented directly. The application environment implementation (for instance the Java AWT implementation in the case of Java) receives its events from the VP client either directly or through the event system proxy. A typical implementation on a server is the server side of the event system protocol (evnt.x) and it picks up user events and delivers in into the application environment which finally forwards it into the Application.

The following illustration on Palm OS indicates an implementation of how this is done.

```
static void
EventLoop (void)
{
    EventType event;
    Word error;
do {
    EvtResetAutoOffTimer ( );
    svc_run ( );
    EvtGetEvent (&event, 0);
    switch (event.eType) {
    case appStopEvent:
    case nilEvent:
        break;
            case keyDownEvent:
            // send hard-button presses directly to server
            switch (event.data.keyDown.chr) {
            case pageUpChr: case pageDownChr: case vchrHard1:
            case vchrHard2: case vchrHard3: case vchrHard4:
                pickupevent (&event);
                continue;
            }
            //fall through! sorry for the mess.
    default:
        // Give the system a chance to handle the event.
        if (!SysHandleEvent (&event)) {
                    if (!gEventSysInitialized) {
                        . . . .
                    } else {
                if (!pickup_event (&event)) {
                    . . . .
                }
            }
        }
    }
    } while (event.eType != appStopEvent);
}//end EventLoop ( )
bool_t
pickup_event (EventPtr eventp) {
    NextEvent nevt;
    EVstat *retval;
    int i = 0;
    switch (eventp->eType) {
    case penDownEvent:
        nevt.EventDID = 1;
        nevt.EventSeqNum = seqnum++;
        nevt.evt.etype = TOUCHEVENT; /* BUTTONPRESS */
        nevt.evt.Event_utps.x = eventp->screenX;
        nevt.evt.Event_utps.y = eventp->screenY;
        while (!(retyal delivernextevent_1 (&nevt, gEvtclnt)) && (i++ <5)) { }
        return true;
    case penUpEvent:
        nevt.EventDTD = 1;
        nevt.EventSeqNum = seqnum++;
        nevt.evt.etype = TOUCHEVENT;
        /* Note this was a BUTTONRELEASE */
        nevt.evt.Event_u.tps.x = eventp->screenX;
        nevt.evt.Event_u.tps.y = eventp->screenY;
        while (!(retval = delivernextevent_1 (&nevt, gEvtclnt)) &&
            (i++ <5)) { }
        return true;
    case keyDownEvent:
        nevt.EventDID = 1;
        nevt.EventSeqNum = seqnum++;
        nevt.evt.etype = KEYPRESS;
        nevt.evt.Event_u.kps.x = eventp->screenX;
        nevt.evt.Event_u.kps.y = eventp->screenY;
        nevt.evt.Event_u.kps.key = getkey (eventp->data.keyDown);
        while (!(retval = delivernextevent_1 (&nevt, gEvtclnt)) &&
            (i++ <5)) { }
        return true;
    default:
        return false;
    }
}
EVstat *
delivernextevent_1 (argp, clnt)
        NextEvent *argp;
        CLIENT *clnt;
{
        static EVstat res;
```

-continued

```
    bzero ((char *)&res, sizeof (res));
    if (clnt_call (clnt, DeliverNextEvent,
        (xdrproc_t)xdr_NextEvent, (char *)argp,
(xdrproc_t)xdr_EVstat, (char *) &res, TIMEOUT) != RPC_SUCCESS) {
        return (NULL);
    }
    return (&res);
}
```

EventLoop above waits for user events. When user events are received a remote procedure call to do a DELIVERNEXTEVENT or a DELIVEREVENTS is made this causes the event to be delivered to the server either directly or through a proxy. The server reacts to the input event and updates the screen correspondingly.

Speech Processing Capability Implementation

There are many possibilities when speech is used in multimodal applications. They include the following input options
(A) Speech is used in a separate voice channel (through a phone call)
(B) Speech is used through the data channel but using a separate stream
(C) Speech is used as part of the event system protocol as described in the VP client specification.
(D) The event system can be proxied and speech can be delivered through this proxy.

Speech input is then recognized and forwarded into the application to indicate user requests.

Speech output on the server can either be raw or encoded speech in some of the indicated formats.

FIG. 8. Describes how speech data when it is sent as part of the event system protocol is received by the proxy and forwarded to the recognition engine, recognized and then forwarded to the end VP server where the application resides which then takes appropriate action and updates the User Interface.

The various events that take place from A through F in that order are as follows. The user simultaneously clicks and speaks (in the illustration, he points at Australia and says, "Airport Locations"). The two user events are sent in two separate DeliverNextEvents to the Event System Proxy which then forwards the Event System request to the VP Server and the speech request to the Speech Recognition Engine. The Recognition Engine could request the end user application for strings to match against (this happens from inside the virtual environment say from within a java.speech implementation). The application then sends a list of strings it is waiting on (or indicates that it receives all data). The Recognition engine matches the input to the provided strings or recognizes it otherwise and then forwards the information to the VP server. (ALM too could be waiting for speech input to launch new applications, etc.).

Multimedia Services

In the case of multimedia a viewer running on a VP Server can selectively choose streams to send to the end user. For instance, in the case of MPEG-4 Audio Visual Objects (AVOs) are streamed separately. The background of a tennis match and the players and the ball each can be separate AVOs. With VP as the application runs on the server and wireless bandwidth is expensive compared to wireline, it is possible for the application (the viewer) to selectively stream only the players and the ball and not the background. The viewer can cache all the streams allowing the user to choose to replay them. This form of capability is possible easily with VP. (and is a requirement for the Virtual Home Environment).

1.1 Overview of the Features Included in the Client Device

Referring to FIG. 1, the client device supports multiple Input/Output features to enable remote servers to "run" a variety of applications on the client device. The software configured to operate the client device is called VP client, which includes a graphical display with support for at least raw drawing and simple graphical actions on the frame buffer. The VP client must also support at least one of mouse, keyboard, touch panel or similar input and can have multiple such input methods including speech. The ability to support speech input and output in any of the defined forms is purely optional. VP client can be compliant without any speech support although applications that rely on speech as the sole input method or that mandate it might not "run" on devices that do not provide support for it.

The Client device is intended to run over simple mobile transports where latency is noticeably larger than equivalent Wire line counterparts. Optional features in the VP Protocol enable the efficient use of both bandwidth and the amelioration of problems relating to latency in Mobile Networks by allowing for both caching of requests, their replay from these caches and the judicious use of larger compound requests. Wireless latencies may be in the range of 50 ms. to 100-ms for air interface for WCDMA, GPRS, UMTS and other networks.

Client devices can also be used in WLAN environments. The availability of more bandwidth and the lower latency of these environments further enhance the suitability, capabilities and appropriateness of using VP in educational environments, open public places, enterprises, small offices and buildings and homes.

The Client device also can work on a range of devices with more complex and less complex capabilities. The onus of supporting a variety of these devices rests on the ability of servers. Servers can however indicate that they are unable to support certain features and the VP Client must then fall back to find a least common denominator of its own and the server's capabilities.

The VP Client can support multiple features including Speech and multimedia. In the case of speech, it is possible for speech to be delivered to servers either on a separate channel, over the data channel with no detection of silences (on a continuous basis) or as and when the user speaks. The format of speech too is determined at the time of capability negotiations. In a multimodal application, the speech can be played back either using a TTS converter on the client device or by having the server stream out the speech over the negotiated channel.

VP Clients are also intended to "run" server hosted MMS applications, MPEG-J based applications, and bring about a rich environment of multimedia-enabled applications for mobile users. While this is optional on VP Clients, the ability to support multimedia is part of the VP Client. Further it should be possible for users to selectively turn off some of the channels of a multimedia message replay as and when they want. (A user might want to turn off the video but not the audio of a message to save bandwidth while on the road but not while he is at his office).

VP Clients can run multiple applications concurrently. In one embodiment, there could be only one application active at a time (this is implied but it is not mandated). VP Clients can obtain information about any or all applications at any time.

At the time of bootstrap the VP Client obtains session, security and state information about the User's current list of Applications and verifies login and authenticates the user. Following authentication, the VP Client is bootstrapped back to its prior existing state. The Application List protocol (along with DHCP) is intended to provide support for this process and is implemented by the Application List Manager. It could contact an Application List Manager UI, which is a VP Application hosted by the bootstrap server that drives the User Interface of the VP Client with an application from where the user can launch additional applications and browse his current Virtual Environment. Additionally, as part of the bootstrap process, the speech system might establish an RTP/RTSP session to a proxy server. As the VP Client changes Application Servers, information about this proxy server and the VP Client's session with it are forwarded to each new Application Server.

1.1.1 Overview of Graphics Interactions and Protocol

The Graphics Interaction Protocol is intended to be a drawing protocol that scales across the graphical capabilities of a gamut of device classes. It ranges from allowing very simple devices to implement a very simple graphics protocol that uses more bandwidth and have higher latency to more complicated devices that can have inherent Widget support and can handle compound requests and cache them thus using lesser bandwidth and working well over high latency environments. The Graphics Interaction Protocol allows the client and server to negotiate the capabilities for the session at the outset allowing them to specify the right set of features that would be used in the session as well as when the client is reconnected to the server. The goal of the VP Client is to provide the richest possible user support given the capability negotiation. The VP Client must attempt to conserve bandwidth and decrease end user latency and implementations are encouraged to support this.

The Graphics Interactions protocol works by providing drawing and rendering actions on drawables. These are flat rectangular surfaces that vary in size from the size of the screen of the client device (full drawables) (or possibly even larger surfaces if the VP client supported this capability) to subdrawables that are smaller. Drawables can nest (only one level of nesting is supported in this version of the protocol) and there can be drawables that can be contained inside a full drawable and allow independent actions on them. There is the notion of a root drawable that represents the physical screen, as well as off-screen drawables that represent memory for drawables, that can be shown as needed. Drawables need not persist across disconnections. However, there could be clients that could support persistence. (The onus rests on servers to support both persistent and non-persistent drawable systems). The Client device at the outset indicates the number of drawables it can reasonably support and the server will try to restrict its usage to within that number. A variety of operations are possible on these surfaces and they form the basis of this protocol.

1.1.1.1 Compound Operations on Drawables

The goal in providing support for Compound Operations is to decrease the number of over the wire operations and interchanges. This decreases the associated end user latency while reducing contention over a potentially shared air interface. A compound operation may take place on one or more drawables. But each element of a compound request will correspond at most to one or two drawables. They would however have to involve one target drawable (either a root drawable or an off screen drawable). Operations to copy drawables, copy an area of a drawable, etc. also are possible. The aim in such operations is to reduce the amount of over the wire data as well as to allow reduced latency. Further clients can cache operations on a drawable without actually rendering them in the case of off screen drawables (but not the display itself). Client behavior does NOT require the creation of drawables at the time of the call. Instead the system can choose to postpone actions based on available memory capacity, etc. till the time when it is deemed necessary to render it to the off screen or when the drawable is shown (rendered to the display).

To support compound operations, there are two drawables that are defined. There is the current drawable of the compound request, which is passed between the individual requests in the compound request. This could be the result of a CREATEDRAWABLE request or passed as the drawable in the first request. There is the saved drawable which is pushed into a save area. The definition of the current is NULL and the saved drawable is −1; (ffffffff)

This Virtual Screen system thus allows the ability of a limited memory system to support multiple actions on a drawable. Further, as indicated in the protocol, it is possible to have the VP client indicate that it no longer has state associated with a specific (off screen) drawable (which must be unique!). The server could then replay with the actions on the drawable and then repeat the request.

Supporting Compound operations is recommended but not mandatory. A limited system could choose to not implement Compound Operations and might work just as well in certain environments.

1.1.1.2 Client Capabilities and Negotiations

Client Capabilities are negotiated at the beginning of each application session. Servers may choose to reuse Client Capability information to save bandwidth. However, it must indicate the start of a new application as Clients use this information to purge and reuse cached data using their own smart algorithms.

Client Capability Negotiation relates to a large number of display and input features as well as system features. These include whether the system supports color displays, input features like speech, font capabilities, image formats, multimedia support, etc.

Client Capability Negotiation allows servers to negotiate the full capability up front. This allows Servers to plan their actions accordingly. For instance, a server might use this client capability to decide whether it will support compound operations, drawing interactions, etc.

1.1.1.3 The State of VP Clients and their Relationship to Sessions

A VP Client can be in one of several states with respect to sessions: an ACTIVE state of the session, which is when an application is actively running; and a STANDALONE state when there is no active session at a given instant. State of a VP Client is defined within the context of a session with a server. A session is said to be ACTIVE if an application is active and controls the display at a particular instant. When the VP Client transitions from the ACTIVE state, it could either go to a SUSPENDED state, a DISCONNECTED state or a TERMINATED state for that session. The SUSPENDED state is when the VP Client transitions from one to another application. This second application could be running on either the same server or on another server. When in the SUSPENDED state, the VP Client can choose to disconnect either by sending a message or by breaking the connection (if there is one). A server does not know if the client has transitioned to the DISCONNECTED state or not unless it has explicitly said so. Thus servers wait for prespecified periods of time (recommended 4 minutes) before assuming that they are disconnected. A server caches ALL information needed to restore state. This includes actions performed on offscreen drawables, the root drawable as well as other information. The TERMINATED state is caused by an exiting of the Application or by the user initiated termination (or killing) of the application (the client deletes all caches).

A client which supports Compound requests must cache requests on the current active drawable. It must also look to cache requests on as many drawables in the ACTIVE session if possible, but if it cannot, it must respond with a REPLAY error during the time of a SHOWDRAWABLE on a drawable. This allows the system to reconstruct its state on the drawable, which is then shown.

Clients have no ability to command reconstruction of state. They are forced to rely on servers to help them. At the time of reconnection (implying a move from either the SUSPENDED state or the DISCONNECTED state) back to the ACTIVE state a server might request the list of cached drawables from a client and choose to update them. This might help speed the user response time subsequent to reconnection.

1.1.1.4 ColorSystems

The various color systems that VP Clients could support include the Gray Color, RGB, YUV or RGBA systems and other systems that represent extensions. RGB systems can be either RGB565, RGB888. VPClients could support any of the defined colorsystems as well as additional color systems that are specific to the server and the client. It is hoped that these ColorSystems will be standardized (through addenda). Further there is support for other colorsystems and one can use GETVISUALINFO for obtaining visual information. However VP Clients must support at least one of the defined colorsystems in addition to any extensible colorsystems.

1.1.1.5 Drawing Interactions

A variety of drawing interactions are specified in the protocol. They include the drawing of common graphical shapes including rectangles, polygons, ellipses and arcs, lines and solid objects. Drawing interactions do not reflect the needs of 3D. This will be tackled in later versions of the protocol. The client specification requires that the handset should support all mandatory procedures (18 to 31) shown in 5.18 to 5.31 to be in compliance. The client should support this minimal set of procedures.

Support for Drawables is mandatory. At least one offscreen drawable and the ability to create sub-drawables within the main screen must be provided. The recommended number is at least 4 offscreen drawables for very limited memory devices and 8 or more drawables for devices with 8 MB or more available memory supporting compound operations with caching and when there is support for multiple simultaneous applications. The intention is to allow these client devices to maximally use their networked capabilities to bring greater user access and productivity in a dynamic mobile environment.

Additionally the interactions do require that when support for "OnAction" operations (including mouse over operations) exists, the implementations do make a best effort to render the changes as reflected. (there is no drag and drop support in this version of the protocol). Support for OnAction operations is optional.

1.1.1.6 Font Handling Interactions

The support for font handling is similar to drawing interactions. At the time of the capability negotiations, all supported fonts must be indicated by the handset. This allows servers to choose the appropriate font for rendering on the screen. Support for scaleable fonts is an important (though optional) requirement for VP devices. If this is absent it is difficult to support Classmark II and Classmark III devices and possibly other future classmarks.

The font handling system could also be additionally compliant with "VP Font Metrics". This will allow servers to avoid querying the client device about the lengths of text sequences through "GetTextWidth" calls.

Additionally Font Handling Interactions could support OnAction operations (to Underline, Embolden or Italicize). This is optional.

1.1.1.7 Image Interactions

At the time of the capability negotiation, the image interactions are determined. The VP Client must specify the formats it can encode indicating as many formats as it can. This will allow the server to determine the appropriate format for transmission. It may be that the server might use only one of the formats specified for over the air transmission. The type of image used is specified per image transmission. Support for the improvement of visual clarity might be present in servers and clients (if they both support this feature). In this case, at the user's behest, the system can choose to retransmit the picture possibly with lower compression or in an improved format.

Image Interactions are intended to simplify the easy handling of images and rendering of compressed and uncompressed pictures over the air. The image system is lossy in that the picture is recompressed (this is avoided if the final format supported and the format of the original picture is the same) in the negotiated format.

1.1.1.8 Widget Interactions

The aim in providing support for Widget Interactions is to allow state of the art operating systems that have compact Widgets to make very effective use of their capabilities. The system at the time of capability negotiation indicates support for Widget Interaction. The Widgets are then rendered on the display. They are updated and maintained by the client and all actions on the Widget, including selections and are sent back to the server. Selections are sent only after the user makes one and not while he scrolls through the list. Typically servers could also maintain a mirror of the client's Widget and reflect actions on it.

Scrolling actions are not typically sent over the wire until the final state is reached at which point a "Scrolled ToText" request is sent.

1.1.1.9 Advanced Usage of Compound Operations

The usage of Compound Operations tends to make things difficult for Servers. For this reason it is important to make client behavior specific for each sequence of compound operations. Compound operations tend to produce many failure cases as any one of a sequence can fail. Sequence numbers give a server a chance to recover from failures due to over the air corruption or errors. However, Client behavior must strive to respond predictably. This allows Servers to make best case efforts and assumptions.

VP Client behavior requires that clients stop performing subsequent operations in a sequence of compound operations if one operation fails. This behavior allows servers to recover by looking at the error on the failed request and replaying subsequent requests in the set.

Further, VP Clients must cache Compound Requests made to on screen drawables. This is required due to OnAction style operations.

In the case of OffScreens of the current active application, the client must request a REPLAY of all requests to a drawable at the time of a SHOWDRAWABLE and reach the state in which the drawable was at the time of the request to SHOWDRAWABLE.

It is typical that this implies that Clients cache either all or no operations on any drawable. The intention must be to try and preserve over the air bandwidth and user latency.

A further use of advanced compound operations involves the definition of visual objects and movement actions on them. Support for Visual Objects is a strictly optional feature for a VP Client. A Visual Object is a persistent compound request that defines a grouped graphical object. The object once defined can be custom moved anywhere on the screen or resized. The CREATEVISUAL, SHOWVISUAL, HIDEVISUAL, MOVEVISUAL and RESIZEVISUAL requests are intended to support this. The Visual Object is intended to support icons and graphical cursors typically with Alpha Blending. A future version of this protocol will address even more complicated graphical operations using Visual Objects. The PAUSE operation can be used along with MOVEVISUAL operations to indicate cursor movements. Typically, it is required that small sequences with very short pause times are specified. This is because of the intention to avoid excessive threading requirements on the client device or handset in this version of the protocol.

Compound Operations are also used by the input system to indicate event sequences.

1.1.2 Overview of the Event Handling Protocol

The Event Handling Protocol defines the actions taken by the event system. The actions of the VP Client are outlined in this document. The Event System tends to allow the VP Client a chance to handle requests sent to it. The goal of the VP protocol in this is to allow the handset a simple way of sending user events back to servers and the application to handle them. The various events that are defined in the protocol represent actions by the user or are the result of actions on the system by the user.

Typical actions include Touch Events, Key Events, Mouse Events and Speech Events. There are sequence numbers that typically get reset across active sessions. The events are delivered in order and processed in order. VP Clients also deliver the causal events that let the state of the system change.

The event handling protocol that the client implementation must follow requires that events be delivered in order and that duplicate handling of events does not take place. For this sequence numbers are used. This must proceed in sequence from 0 to 65535 and then rotate back to 0 on any given session. The connection and state on the client for the Event Handling Session must follow the same states as the Drawing Protocol. This one-to-one association guarantees that events are not delivered incorrectly. Thus when VP Clients transition they must transition both connections. The Event Handling protocol is subsequently tied to the handling of various simple actions.

At the time of EventSystem Initialization, the VP Client specifies the various event systems resident on the device. If Speech (input) is one of them, then there could be multiple possibilities about how the server could get speech input from the client and additional session level interactions might need to be established to enable this.

It is additionally possible for the VP Client to use a proxy or an agency to deliver events to the VP server. The presence of a proxy could simplify interactions by allowing VP Clients to persist with connections, allow the VP Client to send speech to a different location from the other events or to allow input to be sent to multiple applications without much reconnect time.

1.1.2.1 Mouse, Key and Touch Panel Events

Mouse, Key (or Button) and Touch panel events generate requests that get sent to the server. The events are delivered in sequence over the wire. These are traditional Input device events that specify a click or a press or a touch panel touch. Typically they specify a location. In the case of Key Panels, the DTMF or keypad touch is delivered translated as an ASCII character string. Key panel press events should be batched and sent as KeyString Event requests as much as possible. They can also be echoed on the local terminal when there is local support for Widgets. (for instance, Text Boxes, TextAreas and TextFields will echo local events). Typically, more sophisticated devices with a small keyboard should try to support TextAreas and TextFields to allow simple and typing functions. (but this is only a recommendation). If they do not support these Widgets, they should try to support the DrawRectTextBox function. When DrawRectTextBox is supported, the handset should echo all data upto the point where the TextBox is full leaving additional actions to be taken by the server. Graphiti writing as seen in contemporary client devices also fall under the purview of Key events.

If none of TextField, TextArea Widgets or TextBoxes is supported, the Event System should fall back to echoing characters back to the server.

Touch Panel Events too can be compounded as a string of actions and sent to the server. These are line drawings, etc. Touch Panel Events can also form the basis for actions to a handwriting recognizer (application). In this case, the sequence of events is sent to the server as a compound event using DELIVEREVENTS. The Server then recognizes the character and issues a DrawChar or DrawString Event.

1.1.2.2 State Transition Events

The various state transition events that take place with respect to session connections are also sent back to the Server (Application). Servers too, can initiate state transitions through the CHANGESERVER Request. (Called an Application Worm Hole, this is similar to a hyperlink button, and causes a new application to be launched (Change Server results in the VP Client reconnecting with a new server which could be on either the same machine or on a different machine). The Client could also initiate a link to a new Application from the client device. Subsequent to the request to launch the new application (on another server) the server sends the CHANGESERVER request. The VP Client could check with the user at this point or could go ahead and move the connection into the SUSPENDED state (as recommended by the CHANGESERVER REQUEST) or the TERMINATED STATE if the Application is Exiting. State Transition Events can also occur from User Actions that are local to the Client. The result is that the Client moves to a new state with respect to this application. State Transition Events can be delivered back to the Application Itself. It is typical although not necessary for servers to suspend applications when the client is moved to the SUSPENDED state.

Typically, state transition events are sent to indicate a change with respect to a session with an application. It is possible for the VP Client to seek the user's advice on whether to disconnect or terminate the current set of active applications at the time of poweroff. (not necessary).

A system list of the current set of applications running on behalf of the users can be obtained using the APPLICATIONLIST request. This request is made to the ApplicationListManager (ALM). The VP Client can use this information to browse and decide the list of Applications the User is currently running and where (and additional information about them). This gives the user access to his environment and the ability to reconnect to any application in it.

1.1.2.3 Speech Interactions

The role of speech is to enable speech and multimodal applications and act as a means for delivering it over a shared channel. Speech can be both an input and output in such applications and the event system deals with the use of speech as Input. Speech is sent in one of several formats to the server. Speech Recognition systems on the server would recognize the spoken word and the application would display and verify what was spoken. This acts as a feedback mechanism to the user and helps correct and rectify errors. Speech can also be a means to verify and authenticate a user and speaker identity systems have been in use. It is preferable to use Raw Speech for speaker identity.

1.1.3 Overview of the Speech Interactions and Protocol

Speech can occur both in the data channel or outside the data channel. (over a separate channel). In GPRS systems, the system might support simultaneous modes as well as a swap mode or only support data mode. Multimodal interaction is possible in all three modes. Typical signal processing systems use Voice Activity Detection (VAD) to detect moments of silences and these are used in contemporary cellular voice systems. Multimodal Man-Machine Applications involve much longer silences than regular phone conversations and involve much less talk typically. There is a burst followed by other actions and then a burst of speech. Although separate voice channels can be established and used through the length of the application, such usage may not seem efficient for multimodal applications. The other possibility is through the data channel. When speech is sent over the data channel, the VP Client could choose to either send it as part of the DeliverNextEvent RPC request or using a separate channel or IP connection using the Session Initiation Protocol and RTP/RTSP to send data to the server application. It is also not necessary for the speech data rate in multimodal applications to match the channel rate (it could be higher instantaneously) as one could assume that even though the data channel rate is low, the bursts of speech activity allow one to spread the speech over a longer time. Further in Man-Machine communications, delays are not as important as in person-person communications. The formats for speech are specified in the next section. Several formats are possible. The client device and the server must agree on a format. It is preferable if the speech recognizer and the handset agree on the format that the recognizer uses internally as a conversion from one format to another might lose speech information. This is again decided as part of the capabilities and negotiations.

If Speech is sent over the dedicated speech channel and involves a phone call that terminates just across the air interface (probably at an MSC), then it is typical for speech to be recognized by a speech recognition system there. This could be the same location as the application. If it is not, then speech could be forwarded (relayed) to the actual server using a server-to-server Media Gateway Session (and is beyond the scope of this specification). If Speech is sent over the data channel using the Event System Connection and as part of the DeliverNextEvent RPC, there is no need for a separate Speech Connection. If this is found to be unsuitable by the client and server, then it is possible to have a separate RTP/RTSP connection and this is negotiated as part of the Event System Initialization. It is also possible for the VP Client's speech to always be sent through a proxy to the current Application Server. It is also important to note that Speech either recognized or unrecognized can be forwarded back to the Application List Manager UI (and is discussed later).

Speech can be sent in various forms. There is the simple form of speech that involves sampled raw speech. Another form could be ADPCM. A third form of speech is the one used in GSM Networks (RPE-LTP). 3G PP has specified AMR which has many internal modes of ACELP. A fifth format is the one used by the Sphinx system which uses homomorphic analysis of speech and involves cepstral and delta cepstral parameter transmission. (input from Companies is needed for this) It is preferable if some form of noise cancellation is done as part of the process. This could be done either at the server or at the client.

1.1.3.1 Input Methods and Speech Recognition

The several (pointing device) input methods used like Touch Panel, Mouse, etc. can be complemented by speech. Speech input can be fed back into the user interface. For instance, a user might specify the new cursor setting using the Touch Panel and then use speech input to update the TextField he has targeted. Also it is possible for speech inputs to cause multiple actions both in the active APPLICATION or in a secondary application.

Speech Input can also serve to enable meta-actions on the user interface. For instance, a "List file menu" request might imply that the UI list the File menu. Such Interfaces can be developed for an application. Speech can also be input to a VoiceXML browser. Several additional possibilities exist.

1.1.3.2 Speech Output Methods and Text-to-Speech Conversion

The Speech Aspects of the protocol relate to delivery of Text for TexttoSpeech conversion when the system supports it and the delivery of raw speech (in the negotiated format) to aid Speech output to support Multimodal applications.

1.1.3.3 Recommendations for Multimodal Applications and Server Behavior

Multimodal Applications will have a significant impact on the future of mobile computing. Multimodal applications require that the platform and the application interoperate to provide a unified look and feel involving both an audio and a visual input/output mechanism. Multimodal Applications accept input from key and touch panels as well as from Speech. The Spoken word could lead to a meta-action (like help on the overall screen), might be context sensitive to the current location of the cursor or might lead to the launch of a new application (and have been intended for the Application Manager). The semantic import of the speech could thus vary with the User Interface. The use of deictic gestures (including pars-pro-toto deixis) with coordinated speech input offers new and powerful user interfaces that could easily for the basis for building compelling and attractive user interfaces. The interactions to support this might involve additional application level protocols, server to server protocols and use conditions that go beyond the scope of this specification. Further, multimodality brings added robustness as errors in speech recognition could be rectified through visual reverification. Typical Multimodal Applications include VoiceXML browsers, future Multimodal Markup Language browsers, java.speech enabled AWT applications, etc. The W3C is actively studying the scope of multimodal web interfaces and is likely to also create a markup language to bring new killer applications[15].

1.1.4 Overview of Multimedia Interactions and Protocol

The main multimedia interactions relate to the delivery of audio and video between a VP Server and the VP Client. Multimedia Audio and Video are heavy bandwidth users and need realtime support. This makes multimedia streaming a challenge in mobile networks. Heavy rate control and error robustness handling is required for realtime streaming in Wide Area Wireless environments. Instantaneous rates can both exceed the channel rate as well as the random moving average rate from the original source can be too high for use on the particular channel. This implies that the VP Server must reduce rates to match the available bandwidth in the air interface through multiple means including lossy compression schemes, recompression, lowering screen rates, etc.

Users should also have a say in deciding the rate they want and they might want higher rates for certain kinds of activity and lower rates for others.

The MExE stage 1 specification require fine grain user control over streamed media. Currently, 3G PP is specifying a Packet Switched Streaming Service (PSS [16]) for media streaming. This specifies multiple formats including MPEG-4 and H.263. In addition, a multimedia messaging service is being defined by 3G PP to support the delivery of multimedia messages to clients. This too defines several formats and protocols to be implemented by the MMS User Agent. Various capabilities provided in MPEG-4 are again optional features.

VP Clients can have Multimedia support as a strictly optional feature.

1.1.5 The Mobile File Store Interactions and Protocol

At the broadest level, user state typically includes permanent storage including owned application storage, data and applications.

Permanent storage is scarce in most current day handsets and handheld computers. Thus permanent storage inside the network seems a viable option for end users. VP Clients could support this through several means. The first would be to implement a networked file system to browse data from handsets. NFS V4 is also built around ONC RPC and shares several features and functionality with VP Clients. This could be used to implement a networked file access system. Another alternative is for the Application Manager to provide a visual file browsing capability from the server to a virtual view of the users files located inside the network.

Server supported file set migration and replication capabilities are additionally important in mobile application environments and the presence of a mobile file store and the ability of users to manage it might serve as a complementary addition and support the notion of a Virtual Home Environment that users find ubiquitously available. The Mobile File Store is a optional and complementary.

1.1.6 Security Interactions and Protocols

The VP Client protocol uses a slight variant of the RPC specification (and XDR) defined in RPC1831 and RFC1832. Several security flavors traditionally existed for RPC notably Unix Security, DES, Kerberos. In recent years, RPC-SEC_GSS security flavor as defined in RFC2203 (and uses GSS-API as specified in RFC2078) has been proposed for the addition of stronger and more secure wide area connectivity. RFC2847 specifies the LIPKEY infrastructure for use with RPC. This is a low infrastructure public key system for use with RPC.

Further discussion on the detailed methods for implementing Security on a VP Client is expanded in brief in Section 4. Detailed specification is deferred to a sister document of this specification.

1.2 General Definitions

The definitions below are used to illustrate the use of terminology in this document. Additional terminology reference is also available from 22.057 the MExE Stage 1 specification and 23.057, the MExE Stage 2 specification and a few referenced documents. This draft version does not however predefine all terms prior to use and several must be understood in the context of their use.

| | |
|---|---|
| VP Client | The term "VP client" describes the software on the User's Equipment which handles the display and input of the client device and Implements the VP Protocols and interactions described in this document |
| VP Server | A server that runs applications on behalf of the VP Client and uses the VP Protocols to interact with the Client |
| BootStrap Server | Runs DHCP and enables the VP Client to find a variety of information that it is looking for. Also runs the Application List Manager |
| Application List Manager | The Application List Manager is a service that runs on the BootStrap Server and implements the server side of the Application List Protocol. At the VP Client request it could launch a new application or connect the user to application to any of his existing applications or launch the Application Manager UI |
| Application Instance | The Application Instance is an executing VP Application that is launched and running on a VP Server. |

1.3 Overview of the Interactions for Bootstrapping VP Clients

This section is only a recommended guideline for bootstrap in the context of IP. VP Clients could use alternative mechanisms to bootstrap themselves and VP Clients could run on alternate transports and networks.

A variety of interactions exist for bootstrapping VP Clients. They include the initial DHCP request to the DHCP BootStrap Server. Typically every handset should be in an environment that has a DHCP server. Using the DHCP response (and following a possible authentication), the VP Client establishes a connection to the Application Manager and could then either automatically return to the previously running Application (by querying the Application List Manager) or launch the Application Manager UI. From the VP Client's perspective the core of the bootstrap process is intended to return to the previously existing state of the VP Client.

1.3.1 DHCP and Bootstrap Support in the Client Device

The DHCP bootstrap process is intended to enable VP Clients to gain an identity (like a mobile IP address) and connect to their existing state in any environment that the user is in. DHCP is defined in RFC2131. DHCP extensions to support VP Clients in Mobile IP environments will be defined in a related sister specification.

A variety of servers and services information is needed as part of the VP Client bootstrap process. These include security and authentication services and information, User Identity information, and other configuration information. Additional Host Profile identification and information could be obtained through server-to-server protocols and is beyond the scope of this specification.

1.3.2 The Application List Manager

The Application List Manager (ALM) is an RPC service that runs on a server identified by the DHCP server in the client device's service environment. It is intended to support the client device's environment and its mobility. It is implicit that the Application List Manager in a mobile environment will involve a server-to-server protocol or mechanism to obtain information on the user's current environment and how to connect back to it.

The ALM also helps the client device join one of its existing applications or binds to the last run application.

The ALM and its associated protocol is designed to offer a client device and the MExE service environment a supporting framework to enable the Virtual Home Environment or VHE [3]. The intention is to allow serving networks to provide complete access to a user's environment, his running applications and to enable users to personalize their service environments. The ALM mechanisms are intended to use existing HLR and VLR databases with extensions to handle and support the access to and the easy provisioning of new services. The retrieval and reestablishment of previously established state is a cornerstone of VP and a necessary requirement for the idea of ubiquitous computing.

1.3.3 The Application List Manager Protocol

The Application List Manager Protocol is used to communicate with the ALM. A VP Client sends ALM requests to the ALM RPC service. The protocol serves to retrieve Application information and for Application Discovery and connection. It is a mechanism to enable VP Clients to find appropriate VP Servers. ALM Servers cooperate with each other to discover the user's existing applications and application environment.

New Application Launching is handled in cooperation with the ALM. VP Clients being mobile migrate to new virtual environments. In these environments, new applications could run on appropriate servers and new applications might exist. The ALM is intended to support this mechanism. The VP Client uses the ALM Protocol for its Application needs. VP Servers also use the ALM protocol when there is a button or link that leads to the launch of a new application. In this case, the ALM Protocol as well as additional mechanisms could be used to obtain an appropriate Server. Once the appropriate server is found, the application is launched on this server and the VP Client is informed about it.

Some of the server-to-server aspects of ALM is beyond the scope of this specification.

2. Protocol Data Types

This section provides the various data types used by the protocols listed in this document. The various data types listed here are used to implement the protocols required.

2.1 Basic Data Types

| Data Type | Definition |
| --- | --- |
| int32_t | typedef int int32_t; |
| uint32_t | typedef unsigned int uint32_t; |
| int64_t | typedef hyper int64_t; |
| uint64_t | typedef unsigned hyper uint64_t; |
| short_t | typedef short ushort_t; |
| ushort_t | typedef unsigned short_t; |
| Uchar | typedef unsigned char Uchar; |
| Uchararray | typedef unsigned char Uchararray<>; |
| Fid | typedef short Fid; |
| Namestr | typedef string Namestr<MAXNAMELEN>.; |
| Drawable | typedef opaque Drawable[DRLENGTH]; |
| Parray | typedef int Parray<>; |
| Seq_t | typedef unsigned short seq_t; |
| Wid | typedef short Wid; |
| Enums | typedef unsigned short enums; |
| Procnums | typedef unsigned short Procnums; |
| VPstat | typedef unsigned short VPstat; |
| Reqnum | typdef unsigned short ReqNum; |

2.2 Constants and Enumerations

```
const RGB = 3;
const RGBA = 4;
const YUV = 3;
const MAXNAMELEN = 255;
const StaticGray = 0;
const GrayScale = 1;
const StaticColor = 2;
const PseudoColor = 3;
const TrueColor = 4;
const DRLENGTH = 4;
const CURRENTDRAWABLE = 0
const SAVEDDRAWABLE = −1;
enums sessionstate {
    ACTIVE = 0,
    SUSPENDED = 1,
    DISCONNECTED = 2,
    TERMINATED = 3,
};
enums colorsystem {
    CL_RGB565 =           1,
    CL_RGB888 =           2,
    CL_RGBA8888 = 3,
    CL_YUV888 =           4
};
enums eventsystem {
    EVT_MOUSE = 1,
    EVT_REMOTE = 2,
    EVT_KBD = 3,
    EVT_JOYSTICK = 4,
    EVT_SPEECH
};
const MAXEVENTSYSTEMS = 8;
enum imgtype {
    JPEG = 1,
    GIF = 2,
    PIXMAP = 3
};
enums img_enum {
    RETOK = 0,
    RETRY = 1,
    NOMEMORY = 2
};
const MAXIMAGEDATA = 8192;
enums mask {
    VisualNoMask = 0,
    VisualIDMask = 1,
    VisualScreenMask = 2,
    VisualDepthMask = 4,
    VisualClassMask = 8,
    VisualRedMaskMask = 16,
    VisualGreenMaskMask = 32,
    VisualBlueMaskMask = 64,
    VisualColormapSizeMask = 128,
    VisualBitsPerRGBMask = 256
};
enums Fnttype {
    THIN = 0x1,
    LIGHT = 0x2,
    REGULAR = 0x4,
    BOLD = 0x8,
    ISITALIC = 0x16,
    ISUNDERLINE = 0x32,
};
enums Labelhow {
    LEFT = 0,
    RIGHT = 1,
    CENTER = 2
};
enums ScrollbarType {
    VERTICAL = 0,
    HORIZONTAL = 1
};
enums TareaScrollbars {
    SCROLLBARS_BOTH,
    SCROLLBARS_NONE,
    SCROLLBARS_HORIZONTAL_ONLY,
    SCROLLBARS_VERTICAL_ONLY
};
enums SetTextHow {
    START = 0,
    APPEND = 1,
    INSERT = 2,
    REPLACERANGE = 3
};
enums MenuItemType {
    MENUITEM = 0,
    SUBMENU = 1,
    CHECKBOXMENUITEM = 2
};
enums OnOpType {
    ONCLICK=0,
    ONOVER=1,
    ONOUT=2,
    ONCLICK2=3,
    ONSELECT=4,
```

2.3 Structured Data Types

```
            OnScrollLUP =5,
            OnScrollLDOWN = 6,
            OnScrollPUP = 7,
            OnScrollPDOWN = 8
    };

struct colrgbtype {
/*
            byte r;
            byte g;
            byte b;
*/
            char rgb[RGB];
        };
        struct colrgbatype {
/*
            byte r;
            byte g;
            byte b;
            byte a;
*/
            char rgba[RGBA];
        };
        struct colyuvtype {
/*
            byte y;
            byte u;
            byte v;
*/
            char yuv[YUV];
        };
        struct colothertype {
            opaque colcookie[2];
            opaque       colval<COLSIZE>;
        };
        const DRLENGTH = 4;
        enums colorsystem {
            CL_RGB565 =           1,
            CL_RGB888 =           2,
            CL_RGBA8888 =         3,
            CL_YUV888 =           4,
            CL_GRAY2 = 5,
            CL_GRAY4 = 6,
            CL_GRAY8 = 7,
            OTHER = 8
        };
        enums eventsystem {
            EVT_MOUSE = 1,
            EVT_TOUCH = 2,
            EVT_KBD = 3,
            EVT_REMOTE = 4,
            EVT_SPEECH=5,
            EVT_JOYSTICK = 6
        };
        const MAXEVENTSYSTEMS = 8;
        const COLSIZE = 8;
        union Color switch (colorsystem colsys) {
        case CL_RGB565:
            col565type            colrgb565;
        case CL_RGB888:
            colrgbtype            colrgb;
        case CL_RGBA8888:
            colrgbatype           colrgba;
        case CL_YUV888:
            colyuvtype            colyuv;
        case CL_GRAY2, CL_GRAY4, CL_GRAY8:
            char                  colgray;
        case OTHER:
            colothertype          colval;
        default:
            void;
        };
        union ColArray switch (colorsystem colsys) {
        case CL_RGB565:
            col565type            rgb565array<>;
        case CL_RGB888:
            colrgbtype            rgb888array<>;
        case CL_RGBA8888:
            colrgbatype           rgba8888array<>;
        case CL_YUV888:
            colyuvtype            yuv888array<>;
        case CL_GRAY2, CL_GRAY4, CL_GRAY8:
            char                  colgrayarray<>;
        case OTHER:
            colothertype          colvalarray<>;
        default:
            void;
        };
        struct ScreenParams {
            int        ScreenID;
            int        ScrWidth;
            int        ScrHeight;
            int        ScrWidthMM;
            int        ScrHeightMM;
            colorsystem ScrCol;
            OSC_resp oscresp;
            DrwResp           RootDrawable;
            /* maybe we need a Font Here */
        };
        enum imgtype {
            JPEG = 1,
            GIF = 2,
            PIXMAP = 3
        };
        enum img_enum {
            RETOK = 0,
            RETRY = 1,
            NOMEMORY = 2
        };
        const MAXIMAGEDATA = 8192;
        union ImgArray switch (imgtype itype) {
        case JPEG:
            opaque PegData<MAXIMAGEDATA>;
        case GIF:
            opaque GifData<MAXIMAGEDATA>;
        case PIXMAP:
            ColArray           ColorArr;
        };
        struct EventParams {
            int       EventSysID;
            eventsystem evttype;
            bool      DragAndDrop;
        };
        #define MAXRECTS 1
        struct Rectangle {
            int X;
            int Y;
            int Width;
            int Height;
        };
        typedef struct Rectangle Rectangle;
        struct RectSize {
            short Width;
            short Height;
        };
        struct Coordinate {
            short X;
            short Y;
        };
        union WidgetU switch (bool created) {
            case TRUE:
                Wid widget;
            case FALSE:
                void;
        };
        union WidgetListU
            switch (bool created) {
            case TRUE:
                Wid widget<>;
            case FALSE:
                void;
        };
        Union Widsize switch (bools recommend) {
```

```
            Case TRUE:
                RectSize         size;
            Case FALSE:
                Void;
    };
    struct Button {
        Label label;
    };
    struct CreateLabelReq {
        int ScreenID;
        Drawable drw;
        Button button;
    };
    struct Checkbox {
        Label label;
        bool on;
        WidU checkboxgroup;
    };
    struct ChoiceItem {
        Uarray Name;
    };
    struct errseqreply {
        Seq_t    received;
        Seq_t    expected;
    };
    union ObjectU switch (bool created) {
        case TRUE:
            Objid Object;
        case FALSE:
            void;
    };
    enums speechformat {
        SPEECH_CALL=0,
        SPEECH_SIP_RAW = 1,
        SPEECH_SIP_RPE_LTP = 2,
        SPEECH_SIP_SPHINX = 3,
        SPEECH_EVT_RAW = 4,
        SPEECH_EVT_RPE_LTP = 5,
        SPEECH_EVT_SPHINX = 6
    };
```

2.4 Error Definitions

VPOK—Request was performed successfully

VPCOMPNOTSUPP—Compound Operations is not supported

VPONOPSNOTSUPP—Does not support "onxxx" operations

VPUNWRAP—unwrap the compound operation as it is too complicated

VPNOTSUPP—Procedure is not supported

STALEDRAWABLE—The drawable supplied is stale—(recreate and replay the sequence on the drawable to reestablish its state)

OUTOFSEQ—Sequence Number failure—(received, expected seqnum is appended)

VPINVAL—The argument supplied was invalid

VPCOLSYSNOTSUPP—The ColorSystem chosen is not supported

EVENTSYSNOTSUP—One of the EventSystems chosen is not supported

IMAGESYSNOTSUP—One of the ImageSystems chosen is not supported

FONTSYSNOTSUPP—one of the FontSystems chosen is not supported

3. RPC/XDR Usage and Behavior

VP is mostly based on the use of RPC and XDR[6], [7] and is intended to completely reuse existing specifications, leverage security styles and because of the ubiquitous availability of both software and documentation on the subject.

3.1 Deviations From the RPC/XDR Specification

One departure from RFC1832 and RFC1831 is that data in the XDR format is rounded off on 2 byte boundaries rather than 4 byte boundaries. This is due to the need to conserve bandwidth and is one of the methods to reduce bandwidth usage.

A further optimization is the definition of a short enumeration enums and a short boolean type bools.

3.2 Sequence Numbers and their Use

Sequence Numbers are used to identify requests and most protocols require actions to be executed in order. Thus every RPC request in the VP protocol (and the Event System Protocol) begin with a sequence number. This is implied in the sections 5, 6 and 7 protocol specifications.

4. Security Interactions and RPCSEC_GSS

Security Interactions could change based on the location of usage. It is important to note that VP Clients can be used in both local environments, where the level of trust and security is higher and hence does not require sophisticated security, as well as wide area environments where sophisticated security will be very important. For this reason, some of the implications of security must be carefully explored in the context of mobile environments.

The VP protocol uses RPCSEC_GSS where appropriate and leaves the specifications for security to a related specification with the important comment that much of the onus of supporting a variety of flavors is implicitly placed on servers. VP Clients could choose to implement just one appropriate security flavor other than AUTH_NONE.

5. The Graphics and Speech Interface Protocol

The detailed specification of the Graphics and Speech Interface Protocol is outlined below. The protocol is designed to enable VP Clients to service requests from a Server. It defines the protocol interactions and behavior of the client. Please note that the terminology of Client and server used here is the reverse of traditional use in RPC environments. The VP Client is the server side of the RPCs sent by the VP Server. To be consistent this document uses VP Client even when the software described is the server side of RPC.

5.1 Null Operation

```
Procedure 0: NULL - No Operation
SYNOPSIS
    <null>
ARGUMENT
    Void;
RESULT
    Void;
```

Description

Standard NULL procedure. This is used to measure overhead or is sometimes overloaded to handle initial security negotiations.

Errors

None 5.2 Compound Operations

Compound operations is adapted from its use in NFS V4. Although compound request support is optional on clients, it can be said that it is a recommendation for handsets with more advanced capabilities, particularly those targeted for Wide Area low latency networks. The model for compound operations is for the client to service requests in order till a request fails. On failure, subsequent operations are not handled. The operations happen on the "current" drawable. There is also the "saved" drawable. The basics of the COMPOUND request involve sending a series of (op+args) requests. The reply involves a corresponding series of status and results.

The onus is on the server to handle recovery from errors. (if it keeps track of requests it can choose to reestablish state on the drawable or reshape the UI).

```
SYNOPSIS
    Compoundargs → compoundres
ARGUMENT
    union VP_args switch (procnums proc) {
        Case <OPCODE>: <argument>;
        ....
    }
    struct Compoundargs {
        VP_args VP_argarray<>;
    }
RESULT
    Union VP_res switch (procnums proc) {
        Case <OPCODE>: <argument>;
        ....
    }
    struct Compoundres {
        VPstat status;
        VP_res VP_rearray<>;
    };
```

Description

The Compound Procedure combines multiple VP requests into one single request. The VP client performs the individual requests of the compound request in order till one of the requests fail. The result is the same as that of the last request executed. Several operations have a void response (these are mandatory requests that involve simple Drawings). No bytes are sent in the response for these.

Implementation

The implementation requires that the VP Client conform to the capability negotiation agreed upon. VP Clients that support Compound requests and the OnAction operations defined would need to cache compound requests on the root drawable.

Errors

All defined errors.

VPCOMPNOTSUPP, VPONOPSNOTSUPP—can both be returned by Compound.

In addition, the client can either say that it does not support compound operations or ask the server to unwrap the compound operation as it is not able to execute the long sequence. It can also say that it does not support Onxxx operations.

5.3 Client deviceSystem Info

```
SYNOPSIS
    VPSystemInfoargs → VPSystemInfores
ARGUMENT
    Union   SpeechSupport  switch  (bools   supported) {
        case TRUE:
            SpeechFormat speechformat<>;
        Case FALSE:
            Void;
    }
    VPSystemInfoargs {
        Bools supportcompound;
        Bools supportonop;
        SpeechSupport  speechInput;
        SpeechSupport  speechoutput;
        colorsystem  colsys<>;
        eventsysem evtsys <>;
        imgtype        imgsys<>;
        fontsystems   fontsys<>;
    };
RESULT
    VPSystemInfores {
        Bools supportcompound;
        Bools supportonop;
        SpeechSupport speechoutput;
        SpeechSupport speechinput;
        short NumActiveDrawables;
        short NumCachedDrawables;
        int64_t SuppOptProcflags;
        short   ScrWidth;
        short   SerHeight;
        short   ScrWidthMM;
        short   ScrHeightMM;
        colorsystem ScrCol;
        Bools supportforVisuals;
        Bools supportforfillstyles;
        eventsystem evtsys<>;
        imgtype imgsys<>;
        fontsystems fontsys<>;
    }
```

Description

This represents the capability negotiation that takes place between the client and the server regarding the VP Client's display and Input capabilities. The VP Server informs the VP client regarding its own support for the display size, color system used, the supported input and output capabilities, support for compound operations etc. It is advisable that VP Servers support the broadest possible set of capabilities.

The client replies with indications about its own support for Compound Operations, OnAction operations, various forms of speech output etc. from the list of capabilities the server supports. This results in a lower common subset as the negotiated capabilities used by servers to access VP Clients.

The reply also indicates if the VP Client supports colorsystems beyond the identified systems. If this is the case, the VP Server can then use GetVisualInfo to query for additional capabilities.

This is a mandatory procedure and all VP Clients must support it.

Implementation

It is advisable that VP Clients look to follow recommended profiles as advised by the Classmark. This will ensure that servers support their capabilities. However, it is better if servers support the widest possible array of VP Client capabilities.

A VP Server might not use this operation if it has previously negotiated and might choose to directly proceed with either initializing the graphics system or directly to request actions on drawables, caches etc.

The recommendations that VP Clients make on Cached Drawables are purely advisory. As they disconnect and reconnect it is possible that they might choose to discard cached state. The Onus is on servers to always maintain state and be able to recover when VP Clients have discarded state across disconnections and reconnections.

VP Client implementers must note that servers can use server to server protocols to transfer negotiated capabilities to minimize over the air traffic.

Errors

INVAL—if the arguments supplied by the server are invalid 5.4 InitializeGraphicsSystem

```
SYNOPSIS
    InitializeGraphicsSystemargs → InitializeGraphicsSystemRes
ARGUMENT
    Struct InitializeGraphicsSystemargs {
        Colorsystem Scrcol;
        Color fg;
```

-continued

```
        Color bg;
        short ScrWidth;
        short ScrHeight;
        eventsystem evtsys<>;
        imgtype imgsys<>;
        fontsystems fontsys<>;
        bools isnewapp;
        bools isRootActive;
        opaque AppCookie[APPCOOKIESIZE];
    };
RESULT
struct Offscreenresp {
        short NumDrawables;
};
union OSC_resp switch (bool hasoffscr) {
case TRUE:
        Offscreenresp offscr;
case FALSE:
        void;
};
union DrawableCache switch (bool supportcache) {
        case TRUE:
                Drawable drcache<>;
        Case FALSE:
                Void;
}
union DrwResp switch (bool created) {
case TRUE:
        Drawable drw;
case FALSE:
        bools updated;
};
struct InitializeGraphicsSystemresponse {
        bool hascookie;
        DrawableCache drawablecache;
        colorsystem ScrCol;
        OSC_resp oscresp;
        DrwResp    RootDrawable;
};
union InitializeGraphicsSystemres switch (VPstat stat) {
case VPOK:
        InitializeGraphicsSystemresponse igs;
default:
        void;
};
```

Description

This is the graphics system initialization that takes place after clients and servers negotiate. The system attempts to specify whether the application is old or new and then advises the VP Client about the screen parameters previously negotiated, the foreground color, the background color, the event systems negotiated, etc.

The VP Client is advised on the Application and whether this is a new application or an old one. If it is new, it is advised on the whether there have been any intervening updates to the screen while the user was disconnected (if there were then isRootActive is false). The AppCookie must be unique on the server across reboots, etc. Thus the tuple, server address and AppCookie represent a unique identifier for the application from the VP Clients point of view. A VP client that supports caches can indicate that it has the Appcookie by setting hascookie to TRUE.

The VP Client if it caches drawables then indicates the list of cached drawables for this application. If the RootDrawable was also cached, the Client updates the screen with the cached version of the RootDrawable (only if isRootActive is TRUE). VP Clients that do not support caches must still conform with the protocol and set supportcache as FALSE.

Implementation

VP Clients that support Caching must cache Appcookies and server tuples as well as the current Root Drawables to effectively return to previously existing and cached state. They should cache drawables whole or not at all.

Errors

INVAL—The arguments supplied by the server are invalid

VPCOLSYSNOTSUPP—The ColorSystem chosen is not supported

EVENTSYSNOTSUP—One of the EventSystems chosen is not supported

IMAGESYSNOTSUP—One of the ImageSystems chosen is not supported

FONTSYSNOTSUPP—one of the FontSystems chosen is not supported

The errors are unlikely but on seeing these, the VP server will attempt to renegotiate.

5.5 InitializeEventSystem

```
SYNOPSIS
        InitializeEventSystemArgs → InitializeEventSystemRes
ARGUMENT
union SpeechSysAction switch (SpeechFormat) {
        Case SPEECH_CALL:
                String PhoneNum;
        Case SPEECH_SIP_RAW,
        SPEECH_SIP_RPE_LTP, SPEECH_SIP_SPHINX:
                Address SIPServer;
        Case SPEECH_EVT_RAW, SPEECH_EVT_RPE_LTP,
SPEECH_EVT_SPHINX:
                Short hostcookie;
};
Union EventSysAction switch (evttype) {
        Case EVT_KBD, EVT_MOUSE, EVT_TOUCH, EVT_REMOTE,
EVT_JOYSTICK:
                Short hostcookie;
                /* this is typically a port address on the server */
        Case EVT_SPEECH:
                SpeechSysAction speechaction;
};
struct InitializeEventSystemArgs {
        EventSysAction evttype<>;
};
RESULT
struct EventParams {
        short EventSysID;
        eventsystem evttype;
};
union EventU switch (bool evtreply) {
case TRUE:
        EventParams evtparms;
case FALSE:
        void;
};
union InitializeEventSystemRes switch (Vpstat stat) {
case VPOK:
        EventU evts<>;
Default:
        Void;
}
```

Description

This initializes the EventSystems for sending input back to the server. The effect of this is to initialize the list of event systems the VP Client supports and to connect to Speech systems when they are supported. This requires the initialization of connections by the Event System Protocol and the establishment of a conduit back to the VP server from it. The hostcookie is typically a port on the server that the Event System Protocol could use (either directly or through an agency). The request specifies the various possible event systems to initialize. The response however specifies the list of Event Systems that were actually initialized.

If Speech input is supported the PhoneNum or SIPAddress is provided by the server as a recommendation.

Support for this request is mandatory.

Implementation

When Caches are known to exist and compound requests are supported, this request itself can be compounded with InitializeGraphicsSystem. This will allow fewer over the air transfers as part of reinitialization or initialization.

In single threaded VP Clients this might take a period of time as the Event System is initialized by the VP Client implementation.

VP Clients could choose to switch to the PhoneNum or they could continue with their existing number. If they do continue then the VP Client must indicate back to the server on the InitEventSystem request as part of the initialization of the Event System Protocol the server that it is using. If it uses an agency or proxy for its regular event system requests, that too is indicated by the InitEventSystem request. (agency support will be explained by an addendum or reference).

Errors

INVAL—when arguments are invalid

EVENTSYSNOTSUPP—when a system recommended by the server is not supported

EVENTSYSCONNECTERROR—there was a problem connecting or establishing the connection with a certain eventsystem.

5.6 FreeGraphicsSystem

```
SYNOPSIS
    FreeGraphicsSystemArgs → Void
ARGUMENT
    FreeGraphicsSystemArgs {
        opaque AppCookie[APPCOOKIESIZE];
    };
RESULT
    Void;
```

Description

Free the GraphicsSystem associated with the AppCookie. This frees all resources, caches, etc and disconnects the event-system as well Implementation Typically VP Clients could choose to return to the ALM when this request is seen. This will allow the VP Clients to bind to additional applications or advise the user that the application has exited.

Errors

5.7 GetVisualInfo

```
SYNOPSIS
    GetVisualInfoargs → GetVisualInfores
ARGUMENT
    Struct GetVisualInfoargs {
        mask    masks;
        Vtemplate vtemplate<>;
    }
RESULT
    Enums Colorclass {
        DIRECTCOLOR = 0,
        GRAYSCALE = 1,
        PSEUDOCOLOR = 2,
        STATICCOLOR = 3,
        STATICGRAY = 4,
        TRUECOLOR = 5
    };
    Struct VisualInfo {
        short depth;
        enums Colorclass;
        unsigned long red_mask;
        unsigned long green_mask;
        unsigned long blue_mask;
        short colormap_size;
        short bits_per_rgb;
        bools tilesandstipples;
    }
    union GetVisualInfores switch (VPstat ret) {
        case VPOK:
            VisualInfo Vinfo<>;
        default:
            void;
    };
```

Description

For advanced Graphics Systems like gaming systems, GetVisualInfo allows the use of new colormap handling and visuals. This concept is adopted from X Windows. When the colorsystem is OTHER, this is used to obtain information about that colorsystem.

Implementation

The use of this capability is mainly intended for supporting better graphics and can be specific to certain applications and devices.

Many VP clients may not support this capability. (depends on input).

Errors

VPINVAL—parameters are invalid

VPNOTSUPP—this procedure is not supported

5.8 SetFillStyle

```
SYNOPSIS
    SetFillStyleArgs → VPstat
ARGUMENT
    Enums FillStyle {
        FILLSOLID = 0,
        FILLTILED = 1,
        FILLSTIPPLED = 2,
        FILLOPAQUESTIPPLED = 3
    };
    union SetFillStyleU switch (enums FillStyle) {
        case FILLSOLID:
            void;
        case FILLTILED:
            Pixmap    tile;
        Case FILLSTIPPLED:
            Pixmap    stipple;
    }
    struct SetFillStyleArgs {
        Drawable drw;
        SetFillStyleU sfsu;
        Coordinate    tsorigin;
    }
RESULT
    VPsat;
```

Description

SetFillStyle is again used in advanced graphics systems to paint a brush pattern while drawing or coloring. This request is used to develop better user interfaces in modern UI systems. Pixmap represents the pattern used to transcribe.

Implementation

SetFillStyle is used to develop an improved graphics system and can be used also in gaming etc. VP Clients must support both tiling and stippling. It can be used with compound operations to implement interesting features. Thus advanced VP Clients could support this capability notably if they are interested in gaming etc.

Errors

VPINVAL—arguments are invalid

VPNOTSUPP—the procedure is not implemented

VPINVALDRAWABLE—the drawable is invalid

5.9 CreateDrawable

```
SYNOPSIS
    CreateDrawableArgs → CreateDrawableRes
ARGUMENT
    struct CreateDrawableReq {
        short X;
        short Y;
        short Width;
        short Height;
        Color bgCol;
        Color fgCol;
        bools isOffscr;
    };
RESULT
    union DrwResp switch (VPstat created) {
        case VPOK:
            Drawable    drw;
        default:
            void;
    };
```

Description

Create a new drawable. The drawable could be offscreen or on the screen. The created drawable has the foreground and background colors as indicated.

Implementation

With Compound requests the PUSHDRAWABLE can be used. Otherwise with Compound requests, subsequent actions would be on this drawable.

Errors
 INVAL—if arguments exceeds screen parameters
 VPNOMOREOFFSCR—if the number of available off-screens exceeds the capability of the system

5.10 FreeDrawable

```
SYNOPSIS
    FreeDrawableArgs → void
ARGUMENT
    struct FreeDrawableArgs {
        Drawable drw;
    };
RESULT
    Void;
```

Description

This frees the drawable and all resources relating to it.

Implementation

The associated caches etc. are also freed.

Errors
 -

5.11 CopyArea

```
SYNOPSIS
    CopyAreaArgs → CopyAreaRes
ARGUMENT
    struct CopyAreaArgs {
        Drawable src;
        Drawable dst;
        short X;
        short Y;
        short Width;
        short Height;
        short DstX;
        short    DstY;
    };
RESULT
    Vpstat stat
```

Description

This allows Copying between two areas either within the same drawables or between drawables.

The VP Client copies content from one part of the drawable to another.

Implementation

This is a typical copy request used in Drawing Operations. It could be done either as a simple or as a compound request.

Errors
 INVAL—arguments were invalid
 INVALDRAWABLE—one of the drawables was invalid
 ILLEGAL—exceeded the sizes of the drawable

5.12 ClearRect

```
SYNOPSIS
    ClearRectArgs → VPStat
ARGUMENT
    struct ClearRectArgs {
        Drawable drw;
        short X;
        short Y;
        short Width;
        short Height;
    };
RESULT
    Vpstat stat
```

Description

This is used to clear a rectangular area. The area returns to the background color.

Implementation

When this area covers the size of the screen, it might be prudent to purge the cached requests associated with this drawable.

Errors
 INVAL—arguments were invalid
 INVALDRAWABLE—one of the drawables was invalid
 ILLEGAL—exceeded the sizes of the drawable

5.13 LoadFont

```
SYNOPSIS
    LoadFontArgs → LoadFontRes
ARGUMENT
    struct LoadFontArgs {
        Drawable drw;
        bools isQuery; /* is this a query load */
        Namestr name; /* uses X Font Conventions */
        short Height;
        short Width;
        short type; /* is a combination of FntTypes */
    };
RESULT
    struct FontReplystruct {
        short ascent;
        short descent;
        short maxascent;
        short maxdescent;
        short width;
        short direction;
        bools isFixed;
        Fid fontid;
    };
    Union LoadFontRes switch (bool fidreply) {
        case TRUE:
            FontReplystruct    font;
        case FALSE:
            void;
    };
```

Description

This request loads a font for use within a drawable. The font has a fid which can be used to write data.

Implementation

The Loaded font should conform to the closest equivalent of the request. It might help for implementations to keep a table against popular fonts.

The Fid returned must not be 0. (0 is reserved for the "current" Fid in compound requests).

Errors 5.14 FreeFont

```
SYNOPSIS
    FreeFontArgs → void
ARGUMENT
    Struct FreeFontArgs {
        Drawable drw;
        Fid Fontid;
    }
RESULT
    Void;
```

Description

Free this Font for this Drawable

Implementation

All fonts loaded are freed when a drawable is freed.

5.15 GetTextWidth

```
SYNOPSIS
    GetTextWidthArgs → GetTextWidthRes
ARGUMENT
    Struct GetTextWidthArgs {
        Drawable Drw;
        Fid fontid;
        short ascent;
        short descent;
        short direction;
        short height;
        Uarray ustring;
    };
RESULT
    Union GetTextWidthRes switch (Vpstat stat) {
        Case VPOK:
            Short Length;
        Default:
            Void;
    }
```

Description

This returns the length of the string on the client's machine. The client allows servers to evaluate the right length that is suitable for display.

Implementation

VP Clients could implement well known font systems that allow the server to itself decide the length of those fonts.

Errors

INVAL—arguments were invalid
INVALDrawable—the Drawable is invalid
INVALFid—there is no knowledge of this Fid 5.16 DrawChar

```
SYNOPSIS
    DrawCharArgs → VPStat
ARGUMENT
    struct DrawCharArgs {
        Drawable drw;
        Fid    fontid;
        Color col;
        Uchar uchar;
        short Offset;
        short Length;
        short X;
        short Y;
    };
RESULT
    VPStat;
```

Description

Draw a single character at the location specified.

Implementation

Errors

INVAL—arguments were invalid
INVALdrawable—the Drawable is invalid
INVALFid—there is no knowledge of this Fid 5.17 DrawString

```
SYNOPSIS
    DrawStringArgs → VPStat
ARGUMENT
    Union Tbstring switch (bools inTB) {
        Case TRUE:
            Wid           TB;
        Case FALSE:
            Void;
    }
    struct DrawStringArgs {
        Drawable drw;
        Fid fontid;
        Color col;
        Uarray ustring;
        Tbstring Tbstring;
        short Offset;
        short Length;
        short X;
        short Y;
        bools      isUnderline;
        bools      isItalic;
        bools      isSelected;
    };
RESULT
    Vpstat;
```

Description

Write a string at the specified location. The string is specified in a UTF-16 array. The Tbstring is used to draw into a TextBox. isUnderLine if set causes the string to be underlined. IsItalic causes it to be italicized. IsSelected causes it to be selected.

Implementation

The string must be written in sequence and in the color specified at the location. VP Client implementations must write the data at the location specified. The onus on ensuring readability and Layout in the case of VP Clients rests on the server, the software environment and the Application. IsSelected is implementation dependent.

In the case of usage in compound requests, if the Wid is the current Wid (0) then the DrawString is on the last created TextArea, TextField or TextBox in the Compound Request. Similarly, if the Fid is current Fid (0) then the DrawString uses the current font that has been loaded.

Errors

INVAL—arguments were invalid
INVALDrawable—the Drawable is invalid
INVALFid—there is no knowledge of this Fid

5.18 DrawBytes

```
SYNOPSIS
    DrawBytesArgs → Vpstat
ARGUMENT
    Union Tbstring switch (bools in TB) {
        Case TRUE:
            Wid    TB;
        Case FALSE:
            Void;
    }
    struct DrawBytesArgs {
        Drawable drw;
        Fid fontid;
        Color col;
        Uchararray ustring;
        Tbstring Tbstring;
        short Offset;
        short Length;
        short X;
        short Y;
        bools   isUnderline;
        bools   isItalic;
    };
RESULT
    Vpstat;
```

Description
  DrawBytes is same as DrawString with the difference that the argument is a character array.
Implementation
  Same as DrawString.
Errors

5.19 DrawLine

```
SYNOPSIS
    DrawLineArgs → VPstat
ARGUMENT
    struct DrawLineArgs {
        Drawable drw;
        Color col;
        short X1;
        short Y1;
        short X2;
        short Y2;
    };
RESULT
    Vpstat;
```

Description
  DrawLine draws lines on the specified drawable.
Implementation
  With compound operations drawline typically will occur on the current drawable.
Errors
  INVAL—arguments were invalid
  INVALDRAWABLE—the drawable was invalid

5.20 DrawArc

```
SYNOPSIS
    DrawArcargs → Vpstat
ARGUMENT
    struct DrawArcArgs {
        Drawable drw;
        Color col;
        short X;
        short Y;
        short Width;
        short Height;
        short StartAngle;
        short ArcAngle;
    };
RESULT
    Vpstat;
```

Description
  DrawArc draws an arc at X, Y with the rectangle of width and height as specified.
  The StartAngle and ArcAngle are in ¹⁄₆₄th of a degree.
  This procedure is also mandatory.
Implementation
  Some simplistic clients might not have much support for Arc Drawing but it is possible to simulate it from line drawing. Best effort drawing should suffice for Arc Drawing.
Errors
  INVAL—arguments were invalid
  INVALDRAWABLE—the drawable was invalid

5.21 FillArc

```
SYNOPSIS
    FillArcargs → VPstat
ARGUMENT
    struct FillArcargs {
        Drawable drw;
        Color col;
        short X;
        short Y;
        short Width;
        short Height;
        short StartAngle;
        short ArcAngle;
    };
RESULT
    Vpsat
```

Description
  Similar to DrawArcArgs but provides fill shading. This is again to enable drawing of arcs and shapes.
  The procedure is mandatory.
Implementation
  See Above. FillDrawing can be simulated by FillRects just as DrawArc can be simulated with Lines.
Errors
  INVAL—arguments were invalid
  INVALDRAWABLE—the drawable was invalid

5.22 DrawOval

```
SYNOPSIS
    DrawOvalArgs → Vpstat
ARGUMENT
    struct DrawOvalReq {
        Drawable drw;
        Color col;
        short X;
        short Y;
        short Width;
        short Height;
    };
RESULT
    Vpstat;
```

Description
  Drawing Ovals is also mandatory. X, Y specify the center and the Width and Height specify the length and width of the rectangle that fits the Oval.

Implementation

Could be implemented through multiple arc drawing algorithms.

```
SYNOPSIS
    FillOvalargs → VpStat
ARGUMENT
    struct FillOvalargs {
        Drawable drw;
        Color col;
        short X;
        short Y;
        short Width;
        short Height;
    };
RESULT
    Vpstat
```

Description

Fills the Oval with specified color with Origin X, Y and rectangle of specified width and height.

This procedure is mandatory

Implementation

Could be implemented through multiple fill arcs or as a rectangle and several fill arcs.

Errors

INVAL—arguments were invalid
INVALDRAWABLE—the drawable was invalid 5.24 DrawPolygon

```
SYNOPSIS
    DrawPolygonargs → Vpstat
ARGUMENT
    struct DrawPolygonReq {
        Drawable drw;
        Color col;
        short numPoints;
        Parray Xpoints;
        Parray Ypoints;
    };
RESULT
    Vpstat;
```

Description

The Polygon drawing request specifies the number of points and the X and Y coordinates of the points. A polygon is drawn around them.

Implementation

The lines are drawn in order. The VP Client need not check to see if the coordinates make a consistent polygon or not. It is upto Servers to specify the order and ensure convexity, etc.

Polygons is a mandatory procedure.

Errors

INVAL—arguments were invalid
INVALDRAWABLE—the drawable was invalid 5.25 DrawPolyLine

```
SYNOPSIS
    DrawPolyLineargs → Vpstat
ARGUMENT
    struct DrawPolylineReq {
        Drawable drw;
        Color col;
        short numPoints;
        Parray Xpoints;
        Parray Ypoints;
    };
RESULT
    Vpstat;
```

Description

The polyline is an open ended polygon (without the last line back to the origin). The polyline is developed for complex line drawing.

Polyline is also mandatory as it does not take much beyond line drawing. (although a compound request might have sufficed).

Implementation

The Polyline is similar to polygons.

Errors

INVAL—arguments were invalid
INVALDRAWABLE—the drawable was invalid 5.26 FillPolygon

```
SYNOPSIS
    FillPolygonargs → Vpstat
ARGUMENT
    struct FillPolygonArgs {
        Drawable drw;
        Color col;
        short numPoints;
        Parray Xpoints;
        Parray Ypoints;
    };
RESULT
    Vpstat;
```

Description

The fill polygon args request fills a polygon in the specified color.

This procedure is mandatory.

Implementation

Fill Polygon implementations rely on the server to ensure that the points are specified in the right order. VP Clients must however be careful about this not being the case as it could cause unexpected actions.

Errors

INVAL—arguments were invalid
INVALDRAWABLE—the drawable was invalid 5.27 DrawRect

```
SYNOPSIS
    DrawRectargs → Vpstat
ARGUMENT
    struct DrawRectArgs {
        Drawable drw;
        Color col;
        short X;
        short Y;
        short Width;
        short Height;
    };
RESULT
    Vpstat;
```

Description

The DrawRect request is probably one of the most common requests. It is mandatory.

Implementation

It is likely that DrawRect is a simple and often used routine. With compound request implementations, it must be possible to easily perform this routine.

Errors
INVAL—arguments were invalid
INVALDRAWABLE—the drawable was invalid

5.28 DrawRectTextBox

```
SYNOPSIS
    DrawRectTextBoxArgs → DrawRectTextBoxRes
ARGUMENT
    Struct for3D {
        Bools raised;
        Col     linecol;
    }
    Union switch 3Drect (bools is3D) {
        Case TRUE:
            For3D 3Dparams;
        Case FALSE;
            Void;
    };
    struct DrawRectTextBoxArgs {
        Drawable drw;
        Color col;
        Color fillcol;
        Color defaultfontcol;
        Fid     reqFid;
        short X;
        short Y;
        short Width;
        short Height;
        short showfrom;
        3Drect for3Drects;
        bools   isArea;
    };
RESULT
    Struct TextBoxReply {
        Wid    TBWid;
        Fid    reqFid;
        short  linesdisplayed;
    };
    union DrawRecTextBoxRes switch (bools created) {
        case TRUE:
            TextBoxReply    tbreply;
        case FALSE:
            Void;
    };
```

Description

The Rectangular TextBox is the most primitive of Widgets. It is a rectangular area which contains text. The TextBox is a rectangular area that displays text that can be scrolled. This is a building block for lists, menus, textfields, text areas, etc. The isArea parameter indicates if it is a one line field or an area. The fillcol specifies the color of the box. Showfrom is used to indicate the initial place in the text that is currently shown. In Compound operations with OnOp, showfrom can be adjusted on the cached Drawable.

The request is not mandatory as support for Widgets is not mandatory for compliant VP Clients. However, TextBoxes is recommended. It can be used to form the basis of several other widgets and its features can be used to develop many complex devices and systems.

The TextBox can be a 3D text box. Refer Draw3Drect.

SetText request is used to set and change the TextArea information.

Implementation

This is simple widget which can form the basis for other widgets. It is a building block that VP Client implementations could support if they do not have the ability to support the rest of the widgets. This along with compound requests simplifies the making of very good UI systems.

With Cached OnOp operations TextBox contents are adjusted using Showfrom. Thus Showfrom can be incremented on the Widget.

Errors
INVAL—arguments were invalid
INVALDRAWABLE—the drawable was invalid

5.29 FillRect

```
SYNOPSIS
    FillRectArgs → VPStat
ARGUMENT
    struct FillRectArgs {
        Drawable drw;
        Color col;
        short X;
        short Y;
        short Width;
        short Height;
    };
RESULT
    Vpstat;
```

Description
The FillRect is another commonly used primitive.
It is mandatory.
Implementation
The FillRect request is a commonly used request.
Errors
INVAL—arguments were invalid
INVALDRAWABLE—the drawable was invalid

5.30 DrawRoundRect

```
SYNOPSIS
    DrawRoundRectargs → Vpstat
ARGUMENT
    struct DrawRoundRectargs {
        Drawable drw;
        Color col;
        short X;
        short Y;
        short Width;
        short Height;
        short Warc;
        short Harc;
    };
RESULT
    Vpstat;
```

Description

DrawRoundRect is another commonly used primitive. It consists of several lines and arcs. It is a primitive worth supporting due to the fact that well rounded Widgets are very popular for buttons, etc. It is also mandatory for VP Clients. The Harc and Warc are the Height and Width of the arcs that form the RoundRect.

Implementation

A round rectangle can be implemented by breaking up the request into a series of lines and arcs. For certain widget toolkits the use of RR buttons might be very popular depending on the look and feel.

Errors
INVAL—arguments were invalid
INVALDRAWABLE—the drawable was invalid

5.31 FillRoundRect

```
SYNOPSIS
    FillRoundRectargs → Vpstat
ARGUMENT
    struct FillRoundRectargs {
```

-continued

```
            Drawable drw;
            Color col;
            short X;
            short Y;
            short Width;
            short Height;
            short Warc;
            short Harc;
        };
RESULT
        Vpstat;
```

Description

The FillRoundRect fills a roundrect area with the given color. It is a mandatory procedure.

Implementation

The implementation for FillRoundRect typically involves 4 or 5 FillRects and a 4 FillArcs.

Errors

INVAL—arguments were invalid

INVALDRAWABLE—the drawable was invalid 5.32 Draw3Drect

```
SYNOPSIS
        Draw3Drectargs → Vpstat
ARGUMENT
        struct Draw3DRectReq {
            Drawable drw;
            Color col;
            short X;
            short Y;
            short Width;
            short Height;
            bool raised;
            Color Rgb;
        };
RESULT
        Vpstat;
```

Description

Draw3D is to develop a raised or lowered 3D rectangle. It is commonly used in widget implementations, textboxes etc.

This procedure is mandatory.

Implementation

VP Clients must faithfully reproduce the server's request.

Errors

INVAL—arguments were invalid

INVALDRAWABLE—the drawable was invalid 5.33 Fill3Drect

```
SYNOPSIS
        Fill3Drectargs → VPStat
ARGUMENT
        struct Fill3DRectargs {
            Drawable drw;
            Color col;
            short X;
            short Y;
            short Width;
            short Height;
            bools raised;
            Color Rgb;
        };
RESULT
        Vpstat;
```

Description

Fill3Drect is similar to Draw3D. It colors the interior to reflect a 3D effect on the rectangle.

Implementation

VP Clients must faithfully reproduce the server request.

Errors

INVAL—arguments were invalid

INVALDRAWABLE—the drawable was invalid 5.34 DrawImage

```
SYNOPSIS
        DrawImageargs → img_reply
ARGUMENT
        struct DrawImageargs {
            Drawable drw;
            imgtype imgtype;
            int TrnSize;
            int srcX;
            int srcY;
            int Width;
            int Height;
            int imgXid;
            ImgArray imgarray;
            bools continues;
            bools displayimmediate;
        };
RESULT
        Union Img_reply switch (bools moredetail) {
            Case FALSE:
                img_enums    finalreply;
            case TRUE:
                img_enums    contreply;
        }
```

Description

The DrawImageargs is intended to draw an image and it performs the drawing as indicated. There is also the possibility of continuations for Image Requests. Therefore DrawImage has a continuation. If the image has a continuation request then the displayimmediate indicates to the client whether it must display immediately or not. (see implementation on the import of offscreens)

DrawImage is a mandatory procedure for VPClients.

Implementation

The implementation requires that DrawImage draw the image. If the drawable is offscreen, then the implementation could choose to wait till the image is shown to render it to screen at that time.

It is possible to have the first few parts of the image to provide a low level of detail and for continuations to provide more detail.

Errors

INVAL—arguments were invalid

INVALDRAWABLE—the drawable was invalid 5.35 DrawImageContinuation

```
SYNOPSIS
        DrawImageContinuationargs → DrawImageContinuationRes
ARGUMENT
        struct DrawImageContargs {
            Drawable drw;
            imgtype imgtype;
            short srcX;
            short srcY;
            short Width;
            short Height;
            short imgXid;
            short Seqnum;
            ImgArray imgarray;
            bools continues;
            bools displayimmediate;
        };
```

-continued

```
RESULT
    Union Img_reply switch (bools moredetail) {
        Case FALSE:
            img_enums    finalreply;
        case TRUE:
            img_enums    contreply;
    };
```

Description

ImageContinuation offers a continuation to images. Large images are broken up and sent as a sequence of packets. There could be a smaller packets or larger packets as appropriate. The Sequence number requires that they be sent in order.

ImageContinuation is mandatory.

Implementation

It is possible for continuations to provide added detail. The VP client could indicate that it does not want detail beyond a point in an effort to trade off bandwidth and picture quality, given the sensitive nature of bandwidth. Some freedom is left to implementations.

Errors

INVAL—arguments were invalid

INVALDRAWABLE—the drawable was invalid 5.36 DrawLabel

```
SYNOPSIS
    DrawLabelArgs → WidgetU
ARGUMENT
    struct DrawLabelArgs {
        Drawable drw;
        Label label;
        Color col;
    };
RESULT
    WidgetU;
```

Description

This is used to define Labels. These are important Widget operations. Labels are passive controls and do not support user interaction. As Widget support is optional, support for this operation is optional. However VP Clients that support Widgets must support Labels.

Implementation

The implementation for Labels could vary between VP Clients. However, they must strive to implement support for the behavior specification expected.

Errors

INVAL—arguments were invalid

INVALDRAWABLE—the drawable was invalid 5.37 DrawButton

```
SYNOPSIS
    DrawButtonargs → WidgetU
ARGUMENT
    Union Widsize switch (bools recommend) {
        Case TRUE:
            RectSize    size;
        Case FALSE:
            Void;
    };
    Union Location switch (bools recommend) {
        Case TRUE:
            Coordinate    Place;
        Case FALSE:
            Void;
    };
```

```
    struct Button {
        Label label;
    };
    struct DrawButtonargs {
        Drawable drw;
        Button button;
        Location    where;
        Widsize     Widgetsize;
        Color col;
    };
RESULT
    WidgetU
```

Description

The DrawButton request draws a button to a specified drawable. The Label associated with a button can be changed using SetText later. Thus an empty Label with a NULL string is also possible. Location and Size could specify the location and size of the Button.

DrawButton is not mandatory.

Implementation

The implementation of Widgets could be very system specific. For instance, buttons can be square, rectangular, oval or roundrects. VP Clients are at a liberty to implement these in any way. The location, size recommendation is however important as VP Clients must strive to offer servers the ability to handle layout. Widget Implementations must also restrict the Label to be within the Widget, so partially displayed Labels are allowed.

Errors

INVAL—arguments were invalid

INVALDRAWABLE—the drawable was invalid

VPNOTSUPP—Widget support is absent 5.38 DrawCheckbox

```
SYNOPSIS
    DrawCheckboxargs → WidgetU
ARGUMENT
    union CbWidU switch (bool partofGroup) {
        case TRUE:
            int WidU;
        case FALSE:
            void;
    };
    struct Checkbox {
        Label label;
        bool on;
        CbWidU checkboxgroup;
    };
    struct DrawCheckboxargs {
        Drawable drw;
        Checkbox checkbox;
        Widsize    size;
        Location   where;
        Color col;
    };
RESULT
    WidgetU
```

Description

The Checkbox request is intended to create and draw a check box. "On" sets the checkbox on. The Checkbox could be part of a Checkbox group in which case it is added to the Checkboxgroup. If the Checkbox is set and the Checkbox is part of a Checkbox group, then the new Checkbox is set and the already on Checkbox disabled.

Implementation

The Implementation for Checkbox could be specific to the VP Client implementation. However the size recommendation is important.

Errors
    INVAL—arguments were invalid
    INVALDRAWABLE—the drawable was invalid
    VPNOTSUPP—Widget support is absent 5.39 DrawCheckboxGroup

```
SYNOPSIS
    CheckboxGroupargs → WidgetListU
ARGUMENT
    struct CheckboxGroupargs {
        Drawable drw;
        Checkbox cblist<>;
        Color col;
    };
RESULT
    WidgetListU;
```

Description

The Checkboxgroup request is intended to create a mutually exclusive set of checkboxes. Only one of the list can be set to on. The list can be empty as well and individual Checkboxes can be added later.

Implementation

The VP Client implementation must check to ensure that only one of the Checkboxgroup is checked on. The VP Client must strive to use the recommendations for size and location as this enables layout handling at the Server.

Errors
    INVAL—arguments were invalid
    INVALDRAWABLE—the drawable was invalid
    VPNOTSUPP—Widget support is absent 5.38 DrawCheckbox

```
SYNOPSIS
    DrawChoiceListargs → WidgetU
ARGUMENT
    struct ChoiceItem {
        Uarray Name;
    };
    struct DrawChoiceListargs {
        Drawable drw;
        int selectedindex;
        ChoiceItem List<>;
        Location     where;
        Widsize      Widgetsize;
        Color col;
    };
RESULT
    WidgetU;
```

Description

The implementation for ChoiceList is to create a list of items that can pop up and give the user the ability to choose from that list. There is a default selection. (1 . . . size Of list). The value −1 indicates that there is no selection. Future references could use 1 . . . size Of list to select an item.

Implementation

VP clients could specify an appropriate implementation for this Widget. VP clients could also choose the default when the −1 index is set (to importune the user to select).

Errors
    INVAL—arguments were invalid
    INVALDRAWABLE—the drawable was invalid
    VPNOTSUPP—Widget support is absent 5.41 DrawList

```
SYNOPSIS
    DrawListargs → WidgetU
ARGUMENT
    struct ListItem {
        Uarray Name;
        bools selected;
    };
    struct DrawListargs {
        Drawable drw;
        bools multiSelect;
        ListItem List<>;
        Location     where;
        Widsize      Widgetsize;
        Color col;
    };
RESULT
    WidgetU;
```

Description

DrawList request is similar to Choice, except that multiple selections are possible. Several selections are possible.

Implementation

The implementation typically requires a scrollbar and the ability to scroll down the list and make a selection. Several items are selectable.

Errors
    INVAL—arguments were invalid
    INVALDRAWABLE—the drawable was invalid
    VPNOTSUPP—Widget support is absent 5.42 DrawScrollBar

```
SYNOPSIS
    DrawScrollBarsargs → WidgetU
ARGUMENT
    enum ScrollbarType {
        VERTICAL = 0,
        HORIZONTAL = 1
    };
    enum ScrollType {
        PAGEUPDOWN,
        LINEUPDOWN,
    };
    struct Scrollbar {
        ScrollbarType stype;
        ScrollType atype;
        short Initial Value;
        short ThumbSize;
        short Min;
        short Max;
    };
    struct DrawScrollBarargs {
        Drawable drw;
        Scrollbar sb;
        Location     where;
        Widsize      Widgetsize;
        Bools DeliverScrollinfo;
        Color col;
    };
RESULT
    WidgetU
```

Description

DrawScrollBar draws a scrollbar that can scroll up or down. It is typically coupled with other Widgets. ScrollBars form a sliding scale of adjustment. The ScrollType decides whether a single touch leads to a large block move or a single line move.

Deliver ScrollInfo forwards scrolling events back to the server.

Implementation

Scroll Bars can work with Compound Operations and OnOp combinations requests to develop common Widgets implementations. They implement the ONScrollLUP, ONScrollLdown, ONScrollPUP, ONScrollPDown operations.

Using Compound Requests one could,
DrawRectTextBox
PushWid
DrawScrollBar
OnAction (currentWid)—
   ONScrollPUP—PopWid—Increment Showfrom
   ONScrollPDown—PopWid—Decrement Showfrom
OnAction (PopWid)—
   OnSelect—SelectText (and HighLight) SendEvent Errors
  INVAL—arguments were invalid
  INVALDRAWABLE—the drawable was invalid
  VPNOTSUPP—Widget support is absent 5.43 DrawTextField

```
SYNOPSIS
    DrawTextFieldargs    → WidgetU
ARGUMENT
    struct indexrange {
        int staff;
        int end;
    };
    union selectedTextU switch (bool selected) {
        case TRUE:
            indexrange irange;
        case FALSE:
            void;
    };
    struct DrawTextFieldargs {
        Drawable drw;
        bool isEditable;
        bool setEchoChar;
        int numChars;
        Uarray str;
        SelectedTextU stU;
        Color col;
    };
RESULT
    WidgetU;
```

Description

The DrawTextField request is intended to support the creation of TextFields. These are single line text areas and can be used for inputting text or to display a line of Text.

This is an optional procedure.

Implementation

The TextField is implemented to support text entry. They are straightforward implementations of simple text handling. Several contemporary User Interface Systems have support for TextFields and Areas.

Errors
  INVAL—arguments were invalid
  INVALDRAWABLE—the drawable was invalid
  VPNOTSUPP—Widget support is absent 5.44 DrawTextArea

```
SYNOPSIS
    DrawTextAreaargs → WidgetU
ARGUMENT
    enum TareaScrollbars {
        SCROLLBARS_BOTH
        SCROLLBARS_NONE
        SCROLLBARS_HORIZONTAL_ONLY,
        SCROLLBARS_VERTICAL_ONLY
    };
    struct DrawTextAreaargs {
        Drawable drw;
        TareaScrollbars tsb;
        short numLines;
        short numChars;
        short showfrom;
        bools isEditable;
        bools DeliverScroll;
        Uarray str;
        SelectedTextU stU;
        Color col;
    };
RESULT
    WidgetU
```

Description

The TextArea request is for creating TextAreas. Typically they are square areas where text scrolls. The associated scrollbar can be used for scrolling through the text. The request specifies the number of lines and characters and a portion of the text can be selected.

This is an optional procedure.

Implementation

TextAreas are commonly used primitives. It is typical in most applications, notably browsers, etc.

Errors
  INVAL—arguments were invalid
  INVALDRAWABLE—the drawable was invalid
  VPNOTSUPP—Widget support is absent 5.45 DrawMenu

```
SYNOPSIS
    DrawMenuArgs → WidgetListU
ARGUMENT
    enum MenuItemType {
        MENUITEM = 0,
        SUBMENU = 1,
        CHECKBOXMENUITEM = 2
    };
    struct MenuI {
        Label label;
        bool isEnabled;
    };
    struct CheckboxMenuI {
        Label label;
        bool on;
    };
    union MenuItem switch (MenuItemType type) {
        case MENUITEM:
            MenuI menui;
        case SUBMENU:
            Menu menuelem;
        case CHECKBOXMENUITEM:
            CheckboxMenuI cbmenui;
    };
    struct Menu {
        Label name;
        bool removable;
        MenuItem    menulist<>;
    };
    struct DrawMenuargs {
        Drawable drw;
        Menu menu;
        Color col;
    };
RESULT
    WidgetListU;
```

Description

DrawMenu is intended to support Menus. A menu contains a list of available items and the items could have other submenus under them. The Menu is a complicated and explorable Selection list and is useful in client devices with small screens (but not too small).

The reply returns a list of Widgets. The Widgets correspond to the list of Widgets created and in the same order as that requested.

DrawMenu is an optional request.

Implementation

The implementation can be quite complicated in some systems as there is limited real estate on most handsets. However when available it is a useful feature. Applications must limit the size of menus to small and measurable sizes.

The implementation must also support the corresponding event selection and handling.

Errors
    INVAL—arguments were invalid
    INVALDRAWABLE—the drawable was invalid
    VPNOTSUPP—Widget support is absent 5.46 DrawMenuBar

```
SYNOPSIS
    DrawMenuBarargs → WidgetListU
ARGUMENT
    struct MenuBar {
        Menu menus<>;
    };
    struct DrawMenuBarArgs {
        Drawable drw;
        MenuBar mb;
        Color col;
    };
RESULT
    WidgetListU;
```

Description

MenuBar are horizontal bars that contain a list of Menus. These are typically for larger screen systems. A MenuBar is a series of Menus. MenuBar is completely optional.

Implementation

The implementation for MenuBar can be quite complicated. There are several contemporary UI systems that support MenuBars. Thus MenuBar is supported in VP as well. MenuBar implementation can be avoided to simplify software burdens on most handset implementations.

Errors
    INVAL—arguments were invalid
    INVALDRAWABLE—the drawable was invalid
    VPNOTSUPP—Widget support is absent 5.47 SetText

```
SYNOPSIS
    SetTextArgs → Vpstat
ARGUMENT
    union SetTextU switch (SetTextHow how) {
        case START:
            Uarray str;
        case APPEND:
            Uarray str;
        case INSERT:
            Insertstr istr;
        case REPLACERANGE:
            Replacestr rstr;
    };
    struct SetTextargs {
        Drawable drw;
        short Wid;
        Color col;
        SetTextU stu;
```

-continued

```
        Bools highlight;
        Bools Italicize;
        Bools Underline;
    };
RESULT
    Vpstat;
```

Description

The SetText request adds text to a specified Widget. It is possible to do SetText on a Textbox, TextField, etc.

Implementation

Errors
    INVAL—arguments were invalid
    INVALDRAWABLE—the drawable was invalid
    VPNOTSUPP—Widget support is absent
    INVALWID—The Wid is invalid
    INVALTEXTONWID—Text Additions and actions specified are not possible on this Wid 5.48 ClearText

```
SYNOPSIS
    ClearTextArgs → Vpstat
ARGUMENT
    Struct Textrange {
        Short index;
        Short length;
    }
    enums ClearTextHow {
        ALL=0,
        FROM=1
    };
    Union ClearTextU switch (ClearTextHow cth) {
        Case ALL:
            Void;
        Case FROM:
            Textrange tr;
    }
    struct ClearTextargs {
        Drawable drw;
        short Wid;
        ClearTextU ctu;
    };
RESULT
    Vpstat;
```

Description

ClearText clears the text in an a Widget.

Implementation

SetText can itself be used for much of the functionality of ClearText.

Errors
    INVAL—arguments were invalid
    INVALDRAWABLE—the drawable was invalid
    VPNOTSUPP—Widget support is absent
    INVALWID—The Wid is invalid
    INVALTEXTONWID—Text Additions and actions specified are not possible on this Wid 5.49 SelectText

```
SYNOPSIS
    SelectTextArgs → Vpstat
ARGUMENT
    Enums PositionHow {
        CHARCOUNT = 0,
        LINECOUNT = 1,
        LINEANDCHAR = 2
    };
```

-continued

```
struct lineandchar {
    short lineno;
    short charno;
};
Union Position switch (enum PositionHow) {
    Case CHARCOUNT:
        Short charno;
    Case LINECOUNT:
        Short lineno;
    Case LINEANDCHAR:
        Lineandchar lnc;
};
Struct SelectTextArgs {
    Drawable drw;
    short Wid;
    Color col;
    PositionHow ph;
    Short Length;
}
RESULT
    Vpstat;
```

Description

This is used to select a part of the Text. A selection can occur or be set on any part of the text.

This is optional but if a VP client implementation implements any of the Text Widgets specified it must implement SelectText.

Implementation

The selected text is highlighted. The highlighting is position independent.

Errors
  INVAL—arguments were invalid
  INVALDRAWABLE—the drawable was invalid
  VPNOTSUPP—Widget support is absent
  INVALWID—The Wid is invalid
  INVALTEXTONWID—Text Additions and actions specified are not possible on this Wid 5.50 SelectonWidget

```
SYNOPSIS
    SelectOnWidgetargs → Vpstat
ARGUMENT
    Enums Select {
        THISWID = 0,
        INDEXNUM = 1,
        LABELSTRING = 2
    };
    Union SelectHow switch (select sl) {
        Case THISWID:
            Void;
        Case INDEXNUM:
            Short index;
        Case LABELSTRING:
            String label;
    }
    SelectOnWidgetargs {
        Drawable drw;
        Wid    wid;
        SelectHow sh;
    };
RESULT
    Vpstat;
```

Description

The SelectOnWidget request causes a selection to be made on a Widget Item or the Widget itself. This is used in Widget implementations of various kinds.

Implementation

The implementation requires a highlighting of the item chosen.

Errors
  INVAL—arguments were invalid
  INVALDRAWABLE—the drawable was invalid
  VPNOTSUPP—Widget support is absent
  INVALWID—The Wid is invalid
  INVALACTIONWID—Actions specified are not possible on this Wid 5.51 AddtoWidget

```
SYNOPSIS
    AddtoWidgetargs → Vpstat
ARGUMENT
    Enums ItemType {
        CHECKBOX = 0,
        CHOICEITEM = 1,
        LISTITEM = 2,
        MENUITEM = 3,
        MENU = 4
    };
    union ItemWhich case (Itemtype it) {
        case CHECKBOX:
            Checkbox cb;
        Case CHOICEITEM:
            ChoiceItem ci;
        Case LISTITEM:
            ListItem li;
        Case MENUITEM:
            MenuItem mi;
        Case MENU:
            MENU me;
    };
    AddtoWidgetargs {
        Drawable drw;
        short Wid;
        ItemWhich iw;
    };
RESULT
    Vpstat;
```

Description

The AddtoWidget procedure is intended to add a new item or widget to a given widget. It can be used for adding items in response to actions etc.

This is optional as it applies to VP Clients that supports Widgets.

Implementation

Selections and Additions are present to enable VP Clients to add to items to Widgets.

Errors
  INVAL—arguments were invalid
  INVALDRAWABLE—the drawable was invalid
  VPNOTSUPP—Widget support is absent
  INVALWID—The Wid is invalid
  INVALACTIONWID—Actions specified are not possible on this Wid 5.52 RemoveFromWidget

```
SYNOPSIS
    RemoveFromWidgetArgs → Vpstat
ARGUMENT
    union RemoveItemWhich case (Itemtype it) {
        case CHECKBOX:
            Wid    Widget;
        Case CHOICEITEM:
            Short   index;
        Case LISTITEM:
            Short   index;
        Case MENUITEM:
            Wid    Widget;
```

```
            Case MENU:
                Wid    Widget;
        };
        RemoveFromWidgetargs {
            Drawable drw;
            short Wid;
            RemoveItemWhich iw;
        };
RESULT
        Vpstat;
```

Description

RemovefromWidget removes an item from a Widget wid.

Implementation

Errors

INVAL—arguments were invalid
INVALDRAWABLE—the drawable was invalid
VPNOTSUPP—Widget support is absent
INVALWID—The Wid is invalid
INVALACTIONWID—Actions specified are not possible on this Wid 5.53 NewApplication

```
SYNOPSIS
        NewApplicationargs → VPstat
ARGUMENT
        union ClassmarkU switch (bools isMExE) {
            case TRUE:
                short classmark;
            case FALSE:
                void;
        };
        Struct Program {
            ClassmarkU    CU;
            short Environment;
            Featureset features<>;
            LocationURL programURL;
        };
        struct Server {
            Address Vphost;
        }
        struct NewApplicationargs {
            Program program;
            Server recommendedservers<>;
            Bools exiting;
        }
RESULT
        Vpstat;
```

Description

The NewApplication request takes place sometimes on a click or some other event. The VP Server, realizes that this leads to a new program launch, informs the VP Client that it has requested the Launch of a new application. The VP Client then uses the ALM Protocol to launch a new application.

The variable exiting indicates that the current application is exiting.

Implementation

The VP Client must check the list of servers. If the list is empty then the VP Client uses NewApplication to contact the ALM to launch the Application on any appropriate server and waits for the VP Server to connect to it. If the list is not empty, the the VP Client uses LaunchNewOnServer to get the ALM to launch the application on a given server. The Application (or the environment in which it runs) will then launch itself and use this protocol to connect to this VP client.

The VP Client can also reply saying that there is no launch. In this case the current application will continue to drive the UT or do a APPLICATIONCHANGE back to the ALM.

If the current application is exiting, the VP server informs the ALM before it exits.

Errors

VPINVAL—arguments were invalid
VPNOTLAUNCH—the VP Client does not want to Launch a new application 5.54 CopyDrawable

```
SYNOPSIS
        CopyDrawableargs → CopyDrawableRes
ARGUMENT
        Struct RDrawable {
            Drawable drw;
            Bools replace;
        };
        Union DestDrw switch (bools create) {
            Case TRUE:
                Void;
            Case FALSE:
                RDrawable DestDrw;
        }
        Struct CopyDrawableargs {
            Drawable srcdrw;
            DestDrw dstdrw;
            Bools isOffscr;
        }
RESULT
        Union CopyDrawableRes switch (VPStat vp) {
            case VPOK:
                Drawable dstdrw;
            Default:
                Void;
        }
```

Description

CopyDrawable copies the contents of a drawable. The srcdrw can be the rootdrawable or an offscreen drawable.

The destination drawable must also be held for subsequent requests and is active. VP clients must copy to specified destination drawable unless the replace is TRUE. If Replace is TRUE, then the VP Client can choose to either replace the drawable or not. The request returns the old or new drawable as appropriate.

IsOffscr specifies if the destination is onscreen or offscreen.

This operation is optional but it is a must for implementations with Compound Operations.

Implementation

The copy action can be a cache request copy. Copy Drawable could be used along with Compound Requests to alter a given viewable screen and show it with less use of bandwidth.

Thus the following Compound Operation,

PushDrawable (current root)

CopyDrawable (root to created)—(created drawable will become current)

Drawing and Screen Actions

ShowDrawable (show the current which becomes new root)

PopDrawable (old root)

FreeDrawable (free the old root drawable)

Errors

INVAL—arguments were invalid
INVALDRAWABLE—the drawable was invalid
VPNOTSUPP—Widget support is absent

5.55 PushDrawable

```
SYNOPSIS
    PushDrawableargs → Vpstat
ARGUMENT
    Struct    PushDrawableargs    {
        Drawable drw;
    }
RESULT
    Vpstat;
```

Description

The request has relevance only in the case of Compound Operations. It allows a push of the Drawable onto the stack or save area of drawables.

Optional for those VP clients that do not support Compound Operations.

Implementation

The implementation for this requires that drawables be pushed and popped as needed.

Errors
  INVAL—arguments were invalid
  INVALDRAWABLE—the drawable was invalid
  VPNOTSUPP—No Support for this procedure in this VP Client

5.56 PopDrawable

```
SYNOPSIS
    Void → PopDrawableres
ARGUMENT
    Void;
RESULT
    Union PopDrawableRes switch (Vpstat) {
        Case VPOK:
            Drawable drw;
        Default:
            Void;
    }
```

Description

The request has relevance only in the case of Compound Operations. It allows a pop of the Drawable onto the stack or save area of drawables.

Optional for those VP clients that do not support Compound Operations.

Implementation

The implementation for this requires that drawables be pushed and popped as needed.

Errors
  INVAL—arguments were invalid
  INVALDRAWABLE—the drawable was invalid
  VPNOTSUPP—No Support for this procedure in this VP Client

5.57 RepaintDrawable

```
SYNOPSIS
    RepaintDrawableArgs → Vpstat
ARGUMENT
    Union SubRect switch (bools isSubRect) {
        Case TRUE:
            Rectangle    subrect;
        Case FALSE:
            Void;
    }
    Struct RepaintDrawableArgs {
        Drawable drw;
        SubRect sb;
    };
RESULT
    Vpstat;
```

Description

The RepaintDrawable request is used to repaint the drawable or a portion of it.

This is again Optional.

Implementation

The RepaintDrawable request is used to refresh a drawable and could happen as part of a compound request. The Compound Request could lead to the Drawable being updated with requests and then the entire log of requests could be replayed or refreshed.

Repainting portions of screens may not be possible in some UI systems.

Errors
  INVAL—arguments were invalid
  INVALDRAWABLE—the drawable was invalid
  VPNOTSUPP—No Support for this procedure in this VP Client
  VPCACHEREPLAY—The Cache of request was lost; replay the drawable cache

5.58 ShowDrawable

```
SYNOPSIS
    ShowDrawableArgs → Vpstat
ARGUMENT
    Struct ShowDrawableArgs {
        Drawable drw;
    }
RESULT
    Vpstat;
```

Description

The ShowDrawable request is used to show a drawable to the screen. This causes an offscreen drawable to be made the root drawable.

This procedure is mandatory.

Implementation

The ShowDrawable request can sometimes cause a VPCACHEREPLAY error. The VP Client issues this error when it has discarded the cache for the drawable. The Server will then attempt to recreate the state of the drawable on the client.

ShowDrawable could be the last procedure in a compound request to update the screen with the contents of a newly created drawable.

Errors
  INVAL—arguments were invalid
  INVALDRAWABLE—the drawable was invalid
  VPNOTSUPP—No Support for this procedure in this VP Client
  VPCACHEREPLAY—The Cache of request was lost; replay the drawable cache

5.59 MapSubDrawable

```
SYNOPSIS
    MapSubDrawableArgs → Vpstat
ARGUMENT
    Struct MapSubDrawableArgs {
```

```
            Drawable drw;
            Coordinate Location;
        }
    RESULT
        Vpstat;
```

Description

The MapSubDrawable is for VP client implementations that have a Windowing system or miniwindowing system. They map the subdrawable to the specified location which specifies the top-left corner.

This is purely optional.

Implementation

This is for VP Clients that have Windowing systems implemented.

Errors

INVAL—arguments were invalid

INVALDRAWABLE—the drawable was invalid

VPNOTSUPP—No Support for this procedure in this VP Client 5.60 UnMapSubDrawable

```
SYNOPSIS
    UnMapSubDrawableArgs → Vpstat
ARGUMENT
    Struct UnMapSubDrawableArgs {
        Drawable drw;
    };
RESULT
    Vpstat;
```

Description

The UnMapSubDrawable is a request intended to unmap a given subdrawable. It performs this operation and makes the drawable an offscreen drawable.

Purely optional, but all VP clients that implement MapSubDrawable must implement UnMapSubDrawable.

Implementation

The UnMapSubDrawable is for VP Clients that have Windowing Systems or similar functionality. There is no requirement to cache the Drawable, but it is better to do so as it might be brought back to be shown.

Errors

INVAL—arguments were invalid

INVALDRAWABLE—the drawable was invalid

VPNOTSUPP—No Support for this procedure in this VP Client 5.61 ListCachedDrawables

```
SYNOPSIS
    ListCachedDrawablesargs → ListCachedDrawableRes
ARGUMENT
    Void;
RESULT
    Union ListCachedDrawableRes switch (Vpstat stat) {
        Case VPOK:
            Drawables drwlist<>;
        Default:
            Void;
    };
```

Description

The ListCachedDrawables request is to help in the management of the drawable caches. The VP Client replies with the list of drawables that it holds in its cache (in full) for this application session.

Implementation

The ListCachedDrawables is used by VP Servers to determine which drawables to replay to ameliorate end user performance delays. This is typical also after a RECONNECT.

Errors

INVAL—arguments were invalid

VPNOTSUPP—this procedure is not supported 5.62 PushWid

```
SYNOPSIS
    Wid → Void
ARGUMENT
    Wid
RESULT
    Void
```

Description

PushWid pushes a Widget on the stack of Wids. It assumes Compound Operations.

This is an optional procedure.

Implementation

This is used to enable Compound Operations.

Errors

INVAL—arguments were invalid

VPNOTSUPP—this procedure is not supported 5.63 PopWid

```
SYNOPSIS
    Void → WidU
ARGUMENT
    Void;
RESULT
    Union WidU switch (VPStat stat) {
        Case FALSE:
            Void;
        Case TRUE:
            Wid    wid;
    };
```

Description

The PopWid primitive pops the Wid and makes it the current Wid.

Implementation

The use of PopWid is to change the Wid in Compound Operations.

Errors

VPWIDSTACKEMPTY—the WID stack was empty 5.64 PushFid

```
SYNOPSIS
    Fid → Void
ARGUMENT
    Fid
RESULT
    Void;
```

Description

This pushes a Fid onto the stack. The PushFid request is used in Compound Operations.

This is an optional request.

Implementation

The use of PushFid/PopFid is to enable Compound Request to VP Clients MultiFont capabilities to efficiently add text that is in several fonts.

Notably it allows Textareas like those in a browser to send single requests to update a full page.
Errors
    VPINVALFID—The Fid is invalid
5.65 PopFid

```
           SYNOPSIS
           Void → Fid
           ARGUMENT
           Void;
           RESULT
           Fid;
```

Description
    PopFid pops the Fid from the stack.
Implementation
    See above.
Errors
    VPFIDSTACKEMPTY—The FID stack was empty (underflow)
5.66 ClearScreen

```
           SYNOPSIS
           ClearScreenargs → VPStat
           ARGUMENT
           Struct ClearScreenargs {
               Bools    ReleaseMappedDrawables;
               Bools    ReleaseAllDrawables
           }
           RESULT
           VPStat;
```

Description
    The ClearScreen request is intended to clear the screen. If ReleaseMappedDrawables is set, then all subdrawables that are mapped currently are released. If ReleaseAllDrawables is set, then all Drawables that are both Mapped and Unmapped are released.
Implementation
    Clear Screen also causes the freeing of Drawable Caches associated with the root drawable as well as mapped subdrawables.
Errors
5.67 ApplicationChange

```
           SYNOPSIS
           ApplicationChangeargs → Vpstat
           ARGUMENT
           Union AppServerU switch (bools NewApp) {
               Case TRUE:
                   Program program;
               Case FALSE: /* an existing application */
                   ApplicationInstance  ai;
           }
           Struct ApplicationChangeargs {
               ChangedServerU app;
               Address     server;
               Bools exiting;
               Bools isALM;
           };
           RESULT
           Vpstat;
```

Description
    The ApplicationChange request directs the VP Client to change servers. It requests the VP Client to switch to a new application possibly on a different server (by interacting with the ALM). This could lead to the launch of a new application on the server or reconnection with an existing application on the server based on what was request.
    The ApplicationChange request could also be back to the ALM, if isALM is set.
    If exiting is set, it implies that the current application is exiting.
Implementation
    Similar to NewApplication but this could also be to an existing application.
    The ApplicationChange request could also be back to the ALM. The ALM can then either
    If exiting is set all the caches associated with this Server must be destroyed.
Errors
    VPINVAL—the arguments were invalid
    VPCHANGEFAILED—the launch or change to the server specified failed
5.68 OnAction Operation

```
           SYNOPSIS
           OnActionArgs → VPStat
           ARGUMENT
           union VP_args switch (procnums proc) {
               Case <OPCODE>: <argument>;
               ....
           }
           struct Compoundargs {
               VP_args VP_argarray<>;
           }
           struct SimpleArgs {
               VP_args VP_arg;
           };
           union Actionargs switch (bools compound) {
               case TRUE:
                   Compoundargs cp;
               Case FALSE:
                   SimpleArgs sp;
           }
           enums OnOpType {
               ONCLICK = 0,
               ONOVER = 1,
               ONOUT = 2,
               ONCLICK2 = 3,
               ONSELECT = 4,
               OnScrollLUP = 5,
               OnScrollLDOWN = 6,
               OnScrollPUP = 7,
               OnScrollPDOWN = 8
           };
           union ActionProc switch (OnOptype operation) {
               case <OPTYPE>:
                   Actionargs Action;
               ....
           }
           Union ObjU switch (bools isWid) {
               Case TRUE:
                   Wid    widget;
               Case FALSE:
                   Void;
           }
           Struct WidAction {
               ObjU    whichObj;
               ActionProc    actonWid;
           }
           OnActionArgs {
               WidAction widlist<>;
           }
           RESULT
           VPStat;
```

Description

The OnAction request is a persistent request that is used along with Compound Operations. It acts as a script for actions that take place on the VP Client.

The VP Client caches the OnAction request and returns after evaluating if the request can be reasonably handled on the VP Client.

There are two types of OnAction requests. Those that take place on Widgets and those that take place on primitive requests. (like rects, lines, text etc.) In the case of the latter, they could lead to highlighting underlining, etc.

OnAction requests cannot nest.

OnAction works with ChangeVariable to also accomplish additional actions.

This is a purely optional capability.

Editor's Note: Alternate Mechanisms are Possible for Implementing OnAction Style Capabilities Implementation OnAction is a more intricate capability that requires interaction with the Event System etc. It is present mainly to better support Client side scripting. (as in browsers etc.).

The OnAction implementation must be careful to prevent deadlocking. The typical implementation will create a set of checks that the Event System peruses on User Actions. If a User Actions is on a Widget that requires an OnAction action, appropriate action is taken. In the case of Widgets more complicated capabilities are possible and these might be harder to implement.

OnAction also is specific to UI input. OnOver or OnOut, for instance, imply some form of mouse, Joystick or pointing device (as opposed to touch panel).

OnAction capabilities are not required. They are intended for devices that support compound requests and are likely to run browsers, etc.

OnAction works along with other functionality like ChangeVariable etc. to bring about scripting action.

Errors

VPINVAL—invalid arguments
VPINVALDRAWABLE—invalid drawable
VPNOTSUPP—The procedure is not supported
VPNOWIDGETS—OnAction is supported but not for Widgets
VPTOOCOMPLEX—The Onaction request was too complicated 5.69 ChangeVariable

```
SYNOPSIS
    ChangeVariable      → Vpstat
ARGUMENT
    Enums varnametype {
        SHOWFROM = 0,
        COL = 1,
        TEXT = 2,
        ISITALIC = 3,
        UNDERLINE = 4,
        COL2 = 3
    };
    Union newval switch (varnametype vnt) {
        Case SHOWFROM:
            Int newshowfrom;
        Case COL:
            Col   newCol;
        Case TEXT:
            String Text;
        Case ISITALIC:
            Void;
        Case UNDERLINE:
            Void;
        Case COL2:
            Col   newCol;
    };
    Enums reftype {
        WID = 0,
        REQNUM = 1,
    };
    Union Objref switch (reftype rtype) {
        Case WID:
            Wid widref;
        Case REQNUM:
            Unsigned short reqref;
    };
    Struct ChangeVariableargs {
        Drawable drw;
        Objref oref;
        Newval value;
    };
RESULT
    VPStat;
```

Description

ChangeVariable is used as part of OnAction Operations. It is intended to support changes for OnAction operations. Although it maybe possible to have OnAction, support for ChangeVariable is recommended if OnAction is implemented.

This procedure is not mandatory.

Implementation

ChangeVariable alters UI state. For instance showfrom on a TextBox will change the visible content on the screen.

Errors

VPINVAL—invalid arguments
VPINVALDRAWABLE—invalid drawable
VPNOTSUPP—The procedure is not supported
VPNOWIDGETS—OnAction is supported but not for Widgets 5.70 CreateVisualObject

```
SYNOPSIS
    CreateVisualObjectArgs → ObjectU
ARGUMENT
    union VP_args switch (procnums proc) {
        Case <OPCODE>: <argument>;
        ....
    }
    struct Compoundargs {
        VP_args VP_argarray<>;
    };
    Union AlphaB switch (bools isAlpha) {
        Case TRUE:
            Short alpha;
        Case FALSE:
            Void;
    }
    Struct CreateVisualObject {
        Drawable drw;
        Bools isVisible;
        Coordinate Location;
        AlphaB     alphaBlend;
        struct Compoundargs cpa;
    }
RESULT
    ObjectU;
```

Description

A Visual Object is a group of drawing requests that represent an object. The Visual Object can be created shown and moved. These could include cursors, animations, etc.

CreateVisualObject creates a Visual Object. The Compound Requests are expected to be simple actions and should not contain OnAction primitives. They must also all occur on the one drawable. The Compound Requests occur relative to the Location (they assume that Location is the top left corner).

If isVisible is FALSE, the Object is invisible when created. If isalpha is set (on systems that support it), then the Object is Alpha Blended into the screen.

Implementation

VPClients that can utilize this capability are higher end devices. These are typically devices that have sophisticated UIs or are graphically intensive systems like Gaming Consoles, animation enabled AV reading and entertainment devices.

Care must be taken to ensure that the system can move the visual object intoto against a background etc. More capabilities along these lines will be available in future versions of the protocol.

VP Client implementations must strive to completely support VisualObject features or not at all.

Errors
    VPINVAL—invalid arguments
    VPINVALDRAWABLE—invalid drawable
    VPINVALNOALPHA—Alpha blending is not supported on the device
    VPNOTSUPP—The procedure is not supported 5.71 ShowVisualObject

```
SYNOPSIS
    ShowVisualObjectargs   → VPstat
ARGUMENT
    Union alphaU switch (bools setAlpha) {
        Case TRUE:
            Short alpha;
        Case FALSE:
            Void;
    }
    Struct ShowVisualObjectargs {
        Objid          object;
        Coordinate     Location;
        AlphaU         au;
    }
RESULT
    Vpstat;
```

Description

The ShowVisual Object primitive is used to display a visual object to the screen. It is a simple primitive used to bring a Visual Object onto the screen. If alphaU is set, then the alpha blending value is also set.

Implementation

The Object is brought onto the screen at the specified location.

Errors
    VPINVAL—invalid arguments
    VPINVALDRAWABLE—invalid drawable
    VPINVALOBJECT—invalid Object
    VPINVALNOALPHA—Alpha blending is not supported on the device
    VPNOTSUPP—The procedure is not supported 5.72 HideVisualObject

```
SYNOPSIS
    Objid → Vpstat
ARGUMENT
    Objid
RESULT
    Vpstat;
```

Description

The aim of HideVisualObject is to hide the object.

Implementation

The implementation requires that the object be hidden from view.

Errors
    VPINVAL—invalid arguments
    VPINVALDRAWABLE—invalid drawable
    VPINVALOBJECT—invalid Object
    VPINVALNOALPHA—Alpha blending is not supported on the device
    VPNOTSUPP—The procedure is not supported 5.73 MoreVisualObject

```
SYNOPSIS
    MoveVisualObjectargs → Vpstat
ARGUMENT
    Struct MoveVisualObjectargs {
        Objid object;
        Location     where;
    }
RESULT
    Vpstat;
```

Description

The MoveVisualObject request requires that the Visual Object be moved to the specified location.

Implementation

Errors
    VPINVAL—invalid arguments
    VPINVALDRAWABLE—invalid drawable
    VPINVALOBJECT—invalid Object
    VPINVALNOALPHA—Alpha blending is not supported on the device 5.74 ResizeVisualObject

```
SYNOPSIS
    ResizeVisualObjectargs → Vpstat
ARGUMENT
    Struct ResizeVisualObjectargs {
        short WidthScale;
        short HeightScale;
    };
RESULT
    Vpstat;
```

Description

This resizes the visual object's Width and Height. The Width and Height are on a percentage scale. (200 doubles and 50 halves, while 100 leaves it as is).

Implementation

These are operations for more advanced graphical displays.

Errors
    VPINVAL—invalid arguments
    VPINVALDRAWABLE—invalid drawable
    VPINVALOBJECT—invalid Object
    VPINVALNOALPHA—Alpha blending is not supported on the device 5.75 Pause

```
SYNOPSIS
    Short -> Vpstat
ARGUMENT
    Short;
```

```
        RESULT
            Vpstat;
```

Description

Pause is used in Compound requests to simulate slow movement. Pause values are in 100 s of microseconds. Thus Pause 100 pauses for 10 million seconds.

It is recommended that Pause operations be for very short duration.

Implementation

The Pause should be carefully implemented. Long pauses might not be in the Interest of the handset. VP Clients can exercise the liberty to avoid very long pauses.

Errors

VPINVAL—invalid arguments

VPTOOLONG—the pause request is for too long

5.76 TTS Request

```
        SYNOPSIS
            String → Vpstat
        ARGUMENT
            String
        RESULT
            Vpstat
```

Description

The TTS Request causes the request to convert the string to audio and play it. TTS request is converted to speech and played using a voice supported by the VP Client and available on the client device.

Implementation

There are multiple possibilities. Festival[14] is a commonly used and publicly available TextToSpeech system. Multiple other systems exist and can be developed.

Errors

VPNOTSUPP—The procedure is not supported

5.77 SpeechStream

```
        SYNOPSIS
            SpeechStreamargs → Vpstat
        ARGUMENT
            Struct SpeechStreamargs {
                bools inchannel;
                SpeechDataFormat dataformat;
                opaque bytesofdata<MAXSPEECHDATA>;
            }
        RESULT
            Vpstat;
```

Description

This is used to play the appropriate raw speech that is sent. Section 9 outlines the various formats that could be negotiated. The VP Client uses this for inband speech streams using the RPC form of communication.

If it is out of band and inchannel is FALSE, then the format alone is specified. This intimates the client device about the contents.

Implementation

This is an alternative to for TTS and for multimodal communication. VP clients should be able to implement at least one of the formats specified and servers must provide data in that format. This is not to be used for Media Streaming. (in this case separate media streaming technologies like RTP serve better).

Certain applications may use this for Telephony API implementations and applications.

Errors

VPNOTSUPP—The procedure is not supported

VPINVAL—the arguments specified are invalid

VPFORMATNOTSUPP—the specified format is not supported

5.78 VoiceCall

```
        SYNOPSIS
            PhoneNumber → VPstat
        ARGUMENT
            Struct PhoneNumber {
                String phonenum;
            }
        RESULT
            Vpstat
```

Description

This specifies the phone number to call. This is used to support Click-To-Voice functionality to enable Computer Telephony Integration and similar capability.

Implementation

The String specifies a phone number. The string should be strictly numeric and DTMF.

This may not be supported for some applications as the user may disable availability to this for certain classes of applications.

VP Clients could make this configurable on the client device (or servers could do this using a user profile setting).

Errors

VPNOTSUPP—The procedure is not supported

VPINVAL—the phone number string was invalid

VPPERMISSIONDENIED—the application was denied permission to do Click-To-Voice

5.79 Notification

```
        SYNOPSIS
            Void → NotificationRes
        ARGUMENT
            Void
        RESULT
            Enums NotificationRes {
                WILLRECONNECT = 0,
                BUSY = 1,
                DISABLED = 2,
                DONTCARE = 3
            }
```

Description

This is used for asynchronous notifications thus enabling servers to inform clients of events and thus call back. The intention is to allow applications like MMS to provide immediate notification to clients about impending events like messages, etc.

The VP Client either interrupts its current application and reconnects, indicates that it is busy, or that the notification feature is temporarily disabled or that it does not care about it.

Implementation

A VP Client that wishes to implement this feature, must be able to wake up on a server side transmission, check to see if action is necessary and respond to it.

A session even in the suspended state could be reinvigorated using this feature.

Errors

VPNOTSUPP—there is no support for this feature

6 The Event System Protocol

The Event System Protocol is mainly used to allow handsets to send back User Driven events back to the server. The various interactions require that user Events are delivered back to the VP server. The VP Client implementation requires that Widget Events, Clicks, Speech Events, etc. be delivered back to the server. There is a lot of interaction that is specific to the client device.

The Event System Protocol from the RPC point of view works with the client device being the RPC client and the VP Server being the RPC server.

The Event System is initialized at the behest of the VP Server when it issues an InitializeEventSystem call. This leads to the VP client identifying all supported Event Systems. The VP Server also specifies the port on the VP Server that the client should use for the Event System Connection. (where the Event System connection resides).

It is possible for the VP Client to use an agency for the Event System Protocol. If this is the case then the VP Client sends its The client sends an InitEventSystem request and information on each of the input capabilities available on the device.

FreeEventSystem is typically done when the Event System is freed.

DeliverNextEvent delivers another event to the VP Server.

DeliverEvents delivers a sequence of events to the VP Server.

6.1 Event Types and Systems

Most Event Systems are grouped under one of the following—Keyboard, Mouse, Joystick, Touch Panel, Remote or Speech Driven.

There could be other variations that could simulate one of these event systems.

There are multiple types of requests that the event system could generate. They could be simple or they could be compound requests. Simple requests are requests like a Click or a Touch Event. The Remote is used to specify that the use case where there are a few buttons on the device that are specially mapped by the application and the UI system (UISPECIFIC) (in this case the buttons are mapped in order on the handset from 1 at the top left moving horizontally till the end of the list—a later draft release could address a button mapping system). Compound requests are a series of clicks and moves. A line drawn on a touch panel could be a Compound Request. Keyboard typing could lead to a character string being sent back to the server.

6.1.1 Consts and Enums

```
Const MAXHOSTID = 20;
Enums evtsystype {
    MOUSE= 1,
    TOUCH = 2,
    KBD = 3,
    REMOTE = 4,
    SPEECH=5,
    JOYSTICK = 6
};
enums evttype {
    KEYPRESS = 1,
    KEYLIST = 2,
    TOUCH = 3,
    BUTTONPRESS = 4,
    BUTTONRELEASE = 5,
    MOTIONNOTIFY = 6,
    CLICK = 7,
    SELECT = 8,
    SCROLL = 9,
```

-continued

```
    SPEECH = 10,
};
struct keypos {
    short x;
    short y;
    short key;
};
enums datatype {
    ASCII = 0,
    UTF16 = 1,
    DTMF = 2,
    UISPECIFIC = 3
};
Union Butposdata switch (datatype dt) {
        Case ASCII:
            Char typedchar;
        Case UTF16:
            utf16 utf16char;
        Case DTMF:
            Char dtmfkey;
        Case UISPECIFIC:
            Char UISpecificKey;
};
Union Keylistdata switch (datatype dt) {
    Case ASCII:
        String data;
    Case UTF16:
        Utf16 utf16data<>;
    Case DTMF:
        Char dtmfdata<>;
    Case UISPECIFIC:
        Char uisdata<>;
};
struct keylist {
    short x;
    short y;
    Keylistdata kdata;
};
struct tpos {
    shortx;
    short y;
};
struct butpos {
    Butposdata bpdata;
};
struct motion {
    tpos from;
    tpos to;
};
struct scrollinfo {
        Wid    which;
        bools UP;
}
union Event switch (cvttype etype) {
    case KEYPRESS:
        keypos kps;
    case KEYLIST:
        keylist krs;
    case TOUCH:
        tpos tps;
    case BUTTONPRESS:
        butpos bps;
    case BUTTONRELEASE:
        butpos bps;
    case MOTIONNOTIFY:
        motion mps;
    case CLICK:
        Wid    ws;
    case SELECT:
        Wid    ws;
    case SCROLL:
        scrollinfo si;
    case SPEECH:
};
struct NextEvent {
    int EventDID;
    int EventSeqNum;
    Event evt;
};
enums kbdtype {
```

-continued

```
        ENGQWERTY = 1,
        KANJI = 2,
        DTMF = 3,
        OTHER = 4
};
struct keystruct {
        int EventDID;
        kbdtype ktype;
};
enums mousetype {
        TWOBUTTON = 1,
        THREEBUTTON = 2
};
struct mousestruct {
        int EventDID;
        mousetype mtype;
};
enums touchtype {
        NORMAL = 1,
        COMPOUND = 2
};
struct touchstruct {
        int EventDID;
        touchtype ttype;
};
struct speechstruct {
        int EventDID;
        speechformatdata sfd; /* see section 9 */
};
union EventSystem switch (evtsystem systype) {
        case MOUSE:
                mousestruct ms;
        case TOUCH:
                touchstruct ts;
        case KBD:
                keystruct ks;
        case REMOTE:
                keystruct krs;
        case SPEECH:
                speechstruct ss;
        case JOYSTICK:
                mousestruct mjs;
};
enums hosttype {
        INET = 1,
        GPRS = 2,
        OTHER
};
typedef enums hosttype hosttype;
union Host switch (hosttype hstype) {
        case INET:
                char inetaddr[4];
        case GPRS:
                char gprsaddr[8];
        case OTHER
                char <>;
};
struct EventSystemInfo {
        Host hostid;
        Opaque hostcookie[4];
        EventSystem evtsys<>;
}
struct PhoneNum {
        String dialnum;
};
```

6.2 Speech as Input Events

Speech also functions to serve as an input mechanism. There are several ways to send speech input. There are both inband and out of band methods of sending speech inputs from VP Clients. Typically in mostly data environments where speech brings a multimodal capability, the use of speech is very periodic and bursty. Thus a phone call dedicated to this mode might or might not be economically appropriate and the right approach from a resource usage point of view. It is however important to recognize that certain handsets might use this.

Speech can also be used out of band (with respect to this protocol) but through the data channel. In this case, a separate channel is established. The VP Client device recommends the use of the contemporary Session Initiation Protocol for this purpose. (rfc2543).

6.2.1 Out of Band Speech Events

As previously indicated, Out of Band Speech could use two forms of communication. There is the speech call that causes the client to dial a number. If the server supports the use of a phone call for speech, and has not already indicated the number to dial the Event System of the Client can use the Event System Protocol to obtain the remote number (using Get-PhoneNum). This form of interaction is feasible for some classes of devices (like GPRS Class A devices) which support simultaneous voice and data connectivity.

The use of SIP (or H.323) makes it possible to have a remote server that is waiting for Multiple speech formats are supported by VP protocol. The presence of many formats serves to allow VP clients to send speech data in any one of the negotiated formats. However, the client must find the server and port to connect to, the speech format and negotiate the connection successfully. The Event System Protocol ensures this using the GetSpeechServerInfo request.

It is also necessary to state that additional server to server protocols will be necessary to establish the right movement of speech data and information back to the VP server running the multimodal application. (this lies beyond the scope of this specification).

6.2.2 In band Delivery of Speech Events

The Inband delivery of speech is to use DeliverNextEvent to send speech data back to the server. The Inband delivery of speech implies that the server should by itself support the needed recognition and capabilities, and if it did not, should seek and find the agency necessary and communicate with it.

This makes the delivery of inband speech events simpler.

6.3 InitEventSystem

```
SYNOPSIS
        EventSystemInfo    → EVstat
ARGUMENTS
        Union SpeechServerInfo switch ( enums Speechformat) {
        Case SPEECH_CALL:
                String PhoneNum;
        Case    SPEECH_SIP_RAW, SPEECH_SIP_RPE_LTP,
SPEECH_SW_SPHINX:
                Address    SIPServer;
        Case    SPEECH_EVT_RAW, SPEECH_EVT_RPE_LTP,
SPEECH_EVT_SPHINX:
                Short hostcookie;
        }
        Struct EventSystemInfo {
                Applicationid Aid;
                Host    Hostid;
                Opaque hostcookie[4];
                EventSystem evtsys<>;
        }
RESULTS
        Struct Evstatlist {
                Evstat stat<>;
        }
```

Description

The EventSystemInfo request specifies the various event systems on the VP client that are to be initialized. The Hostid/hostcookie pair is either the VP server itself that was indicated in the Graphics System Protocol or the agency currently being used by the client.

The reply specifies whether the VP Server was satisfied with the request or not.

Implementation

The speech server could be the VP Server's recommendation or the server that the VP Client currently uses. If the Client uses a PhoneNumber already and does not wish to change, the VP server could expect a SIP connection that originates at the other end of the phonecall. If the Client uses an existing SIP connection and does not wish to change, the Client specifies a Hostid/Hostcookie to the server from where the VP server can expect to receive its speech information.

Additionally, an agency or proxy might be used. If this is the case then the client must specify the peer's address and port to the VP server (through the agent or proxy). Further interactions with the proxy must also prepend Application Identifiers to identify the application. The server will then contact the peer host to receive information (before it replies). The VP Client then continues to send future DeliverEvents and DeliverNextEvent request through the proxy to the VP server.

Errors

EVBADSERVER—Specifies that a server is bad 6.4 FreeEventSystem

```
SYNOPSIS
    EventSystemInfo → void
ARGUMENTS
    EventSystemInfo (as above)
RESULTS
    Void;
```

Description

This is used to free event system and to release connections. It releases tied down or dedicated resources inside the network.

Implementation

The release of resources must be done by the VP Client as well if it uses additional resources (disconnecting phone calls, SIP connections etc.)

Errors 6.5 DeliverNextEvent

```
SYNOPSIS
    NextEvent → Evstat
ARGUMENTS
    Struct NextEvent {
        short EventDID;
        short EventSeqNum;
        Drawable drw;
        Event evt;
    };
RESULTS
    Evstat;
```

Description

The NextEvent is delivered to the server in sequence (with the SeqNum incremented on each request). This is the most common request sent to the server. When it includes a speech event sent inband, it is a simple packet with the format indicated (see Section 9).

Implementation

The implementation requires that the Event System requests be sent in sequence.

If delivered through an agency or proxy, the VP Client sends the Application ID as the first parameter Of the request. The agency or proxy uses this to determine where to send the request to.

Errors

EVOUTOFSEQ—the Event was delivered out of sequence

EVSPEECHDATATOOLONG—the Speech data was too long 6.6 DeliverEvents

```
SYNOPSIS
    DeliverEventsList → Evstatlist
ARGUMENTS
    Struct SeqEvent {
        short EventSeqNum;
        Event evt;
    };
    Struct DeliverEventsList {
        short EventDID;
        Drawable drw;
        SeqEvent Eventlist<>;
    };
RESULTS
    Struct Evstatlist {
        Evstat stat<>;
    }
```

Description

Delivers a sequence of Events intended for the Application. The aim of this is to send multiple short events that are allied like touch panel line drawings, mouse movements, etc. The EventSeqNums correspond and increase for the events.

Implementation

The implementation requires that the Event System requests be sent in sequence.

If delivered through an agency or proxy, the VP Client sends the Application ID as the first parameter of the request. The agency or proxy uses this to determine where to send the request to.

6.7 SelectItem

```
SYNOPSIS
    SelectItemargs → EVstat
ARGUMENTS
    Struct SelectItemargs {
        short EventDID;
        Drawable drw;
        Wid  widget;
        short  item;
    }
RESULTS
    EVstat;
```

Description

The SelectItem request allows the VP Client to send the selection of an item by a client back to the server.

Implementation

This is possible only for VP Clients that have support for Widgets.

Errors

EVDONTKNOW—The server does not know about this Widget or Item 6.8 ScrollToText

```
SYNOPSIS
    ScrollToTextargs → EVstat
ARGUMENTS
    Struct ScrollToTextargs {
        Drawable drw;
```

```
                Wid    widget;
                Short  showfrom;
        }
RESULTS
        EVstat;
```

Description

The ScrollToTextargs enables the VP Client to indicate that the user scrolled down the page to a certain location.

Implementation

The implementation specifies the area to showfrom.

Errors 6.9 Reconnect

```
SYNOPSIS
        Reconnectargs → ReconnectresU
ARGUMENTS
        Struct ActiveCachedDrawableList {
                Drawable drw<>;
        }
        Struct Reconnectargs {
                Applicationid Aid;
                Host    Hostid;
                Opaque hostcookie[4];
                ActiveCachedDrawableList acdl;
        }
RESULTS
        Struct ReconnectEventSystemU {
                EventSystem evtsys;
                Short SeqNum;
        }
        Struct WillReplayDrawableList {
                Drawable drw<>;
                Short    Vpseqnum;
        }
        Struct StaleCachedDrawableList {
                Drawable drw<>;
        };
        struct Reconnectres {
                ReconnectEventSystemU resU<>;
                WillReplayDrawableList    wrdl;
                StaleCachedDrawableList   sedl;
        }
        union ReconnectresU switch (bools connected) {
                case TRUE:
                        Reconnectres rr;
                case FALSE:
                        Evstat stat;
        };
```

Description

The Reconnect request is sent by a VP Client to a VP server (possibly through an agent or proxy) in order to reconnect the VP Client back to the server. As part of the reconnect request the VP Client indicates the list of Drawables that it has cached for this Application Instance. The Server then informs the Client about the event systems it had in use, the sequence numbers both in the forward and reverse direction are reported as well. The Server then informs the VP Client that it will replay a list of drawables before it resumes. The Scdl specifies the list of Drawables that the VP Client has cached that have gone stale, while the VP Client was disconnected. This is now discarded by the VP Client.

Implementation

This request is used by the VP Client to reconstruct its state entirely. As the client relies entirely on the network to reconnect itself, the network must cache all information needed and the VP Client must work with the server to reestablish its state.

Errors 6.10 StateTransitionEvent

```
SYNOPSIS
        StateTransitionEventargs → EVstat
ARGUMENTS
        Struct StateTransitionEventargs {
                SessionState old;
                SessionState new;
        }
RESULTS
        EVstat;
```

Description

This is used to change state by the VP Client. The new state setting results in actions that lead to a change in the state. Typically the VP Client initiates the change in the underlying session and connection state after receiving an OK reply.

Implementation

It is important for the VP Client to initiate the state change. The VP Client after initiating the state change must continue to handle actions if notifications are to be expected from the client.

Errors

VPINVAL—arguments are invalid 6.11 SpeechServerInfo

SYNOPSIS

ARGUMENTS

RESULTS

DESCRIPTION

IMPLEMENTATION

ERRORS

7 The Application List Protocol

In the service environment of the VP client, multiple servers can exist. The VP client bootstraps itself back to its previous state using the Application List Protocol. The VP client also migrates between the various applications running on various VP servers in the service environment using the Application List Protocol.

The Application List Protocol participates in the bootstrap process to enable clients to return to their previously existing state. The VP Client using DHCP finds the host and port where the ALP resides and is running. It then starts either the ALM UI application or reconnects back to its previously running application on the VP server (getCurrent Application) or it could connect to any of the Users currently running applications (through the use of either the ALM UI or a native UI) or it could Launch a new Application.

7.1 Types and Structures

```
typedef short AppId;
typedef string LocationURL;
enums ProgramEnvType {
        PJAVA = 0,
        PJAVAEXT = 1,
        MIDP = 1,
        CLDC = 2,
        CLI_P = 3,
        CLI_C = 4
};
enums FeatureSet {
        VISUAL = 0,
        SPEECHINPUTENABLED = 1,
        SPEECHINPUTREQUIRED = 2,
        SPEECHOUTPUTENABLED = 3,
        SPEECHOUTPUTREQUIRED = 4,
        MULTIMODAL = 5,
        AUDIOENABLED = 6,
```

```
            AUDIOREQUIRED = 7,
            VIDEOENABLED = 8,
            VIDEOREQUIRED = 9
};
enums Launcher {
            VPCLIENT = 0,
            ALM = 1,
            ALMUI = 2,
            APPLICATION
};
struct Program {
            ClassmarkU   CU;
            short Environment;
            Featureset features<>;
            LocationURL programURL;
};
struct Server {
            Address Vphost;
}
union LaunchedBy switch (enums Launcher) {
            case VPCLIENT:
                        void;
            case ALM:
                        Server ALMhost;
            case ALMUI:
                        Server ALMhost;
            case APPLICATION:
                        ApplicationInstance LauncherAI;
};
struct ApplicationInstance {
            AppId aid;
            Server host;
            opaque hostcookie[4];
            Program      program;
            LaunchedBy   parent;
};
```

7.2 GetCurrentApplication

```
SYNOPSIS
      Void → AppIU
ARGUMENTS
      Void;
RESULTS
      union AppIU switch (ALMstat stat) {
      case ALMOK:
             ApplicationInstance ai;
      case ALMUILAUNCHED:
             ApplicationInstance almuiai;
      default:
             void;
      };
```

Description

This returns the current Application Instance being run by the VP Client. The VP Client bootstraps itself to continue running the application it was running before it was disconnected or turned off. The ApplicationInstance is a server/port pair where a VP Server exists. This allows the client to connect back to the Application Instance.

Implementation

The VP Client uses this to determine its current application at power On or following a disconnection with its environment. The ALM could sometimes launch the ALM UI application if the VP Client is configured to require such a launch and return that as the current application. This is possibly for a first time poweron. Typically, the ALM returns the VP Client to its last running application before it was powered off or disconnected. The ALM could use additional server to server protocols to obtain Information about this VP Client (this is beyond the scope of this document). The VP Client would then do a RECONNECT to the Application Instance, retrieve its prior state and proceed from there on.

Errors

ALMDATABASEERROR—could not retrieve state info for the VP Client

ALMPERMISSIONDENIED—the retrieval was not possible as the ALM was denied permission 7.3 GetCurrentApplicationList

```
SYNOPSIS
      Void → AppIListU
ARGUMENTS
      Void;
RESULTS
      union AppIListU switch (ALMstat stat) {
      case ALMOK:
             ApplicationInstance ai<>;
      default:
             void;
      };
```

Description

This returns the list of all Applications that the VP Client is currently running with information on all of them.

Implementation

The request is made to find all applications the VP Client is currently running. This could be used to find a particular application or to connect back to an application the user wants to use. A native application on the VP Client could also use this to list the list of VP Applications that the user has running inside the network.

The request implies the determination of permissions etc. through a server to server protocol and the server discovery mechanism is beyond the scope of this specification. However it must be said that the VP Client might have multiple air interfaces (WLAN vs. Wide Area) and could be switching from one to the other. VP Clients might still be able to discover and connect to the applications they were previously running.

Errors

ALMDATABASEERROR—could not retrieve state info for the VP Client

ALMPERMISSIONDENIED—the retrieval was not possible as the ALM was denied permission 7.4 LaunchApplicationManager

```
SYNOPSIS
      Void → LaunchU
ARGUMENTS
      Void;
RESULTS
      union LaunchU switch (ALMstat stat) {
      case ALMOK:
             ApplicationInstance ai;
      default:
             void;
      };
```

Description

This is used by the VP Client to launch an ALM UI application.

Implementation

The VP Client could be configured to not have the ALM automatically launch the ALM UI. The VP Client could do so when it chooses thus saving resources.

Errors

ALMPERMISSIONDENIED—could not launch as permission was denied

```
SYNOPSIS
    NewApplicationargs → LaunchU
ARGUMENTS
    Union LaunchOn switch (bools specify) {
        Case TRUE:
            Server    serverlist<>;
        Case FALSE:
            Void;
    }
    Struct NewApplicationargs {
        Program newprog;
            LaunchOn whicServer;
    }
RESULTS
    union LaunchU switch (ALMstat stat) {
        case ALMOK:
            ApplicationInstance ai;
        default:
            void;
    };
```

Description

This request asks the ALM to launch a new application. The Launch requires the application to be launched on a server. A series of servers could be specified by the VP client or it could be left empty implying that the ALM must find a server to launch the application on.

Implementation

This request launches a new application on an appropriate server. The ALM could use its capabilities to decide where it is to be launched. However the VP Client can refuse to connect if it does not like the server that it is actually launched on and request termination.

Errors

ALMPERMISSIONDENIED—could not launch as permission was denied 7.6 GetAvailableServer

```
SYNOPSIS
    Program → ServerU
ARGUMENTS
    Program;
RESULTS
    Union ServerU switch (ALMstat stat) {
        Case TRUE:
            Server serverlist<>;
        Case FALSE:
            Void;
    }
```

Description

This request allows the VP Client to determine a list of available servers that are capable of launching the application on. This is a simple request that allows the VP Client to find a server in the neighborhood (potentially new) and to request a launch of an application on it.

Implementation

The VP Client could choose to launch the application on any of the servers in the list possibly choosing an appropriate one. The request implies that security verification, environment compatibility, etc. have been done.

Errors 7.7 GetAvailableProgramList

```
SYNOPSIS
    GetAvailableProgramListU → ProgramListU
```

```
ARGUMENTS
    Enums listsspecified {
        LISTGROUPS = 0,
        LISTFORAGROUP = 1,
        LISTFORGROUPS = 2,
        ALLPROGRAMS = 3
    };
    Union GetAvailableProgramListU switch (listsspecified ls) {
        Case LISTGROUPS:
            Void;
        Case LISTFORAGROUP:
            String         ListGroup;
        Case LISTFORGROUPS:
            String         ListGroups<>;
        Case ALLPROGRAMS:
            Void;
    };
RESULTS
    Union ProgramListU switch (ALMStat stat) {
        Case ALMOK:
            Program programlist<>;
        Case ALMLISTS:
            String   ListGroups<>;
        Default:
            Void;
    }
```

Description

This is a request that provides the list of immediately available programs that are available in the vicinity. ListGroups is used to send multiple groups available possibly from multiple sources.

Implementation

The VP Client uses ListGroups to explore its applications in its Virtual Neighborhood. The VP Client could be using a native application to obtain these lists. The ALMUI also could serve as a mechanism to access the same information and help the user browse the applications he/she can run.

Errors

ALMPERMISSIONDENIED—the ALM was denied permissions to access information 7.8 SetCurrentApplicationInstance

```
SYNOPSIS
    Aid → ALMStat
ARGUMENTS
    Aid;
RESULTS
    ALMStat;
```

The request allows the VP Client to set the current application. This causes the ALM to inform the corresponding server of an impending RECONNECT and change its own database.

Implementation

The VP Client uses this to switch applications back to an older application.

Errors

VPAIDINVAL—the Aid was invalid 7.9 TerminateApplicationInstance

```
SYNOPSIS
    Aid → ALMStat
ARGUMENTS
    Aid
RESULTS
    ALMStat
```

Description

The request is used to terminate the application with the given Aid. It is intended to be a way by which the VP Client can terminate applications.

Implementation

This is used to terminate applications. The ALM will contact the VP Server and terminate the application and update its own database. The VP Client can then destroy all associated caches and resources on the client device.

Errors

Errors

ALMPERMISSIONDENIED—The VP Client does not have permission to terminate this application 7.10 GetSecurityInfo

SYNOPSIS

ARGUMENTS

RESULTS

DESCRIPTION

IMPLEMENTATION

ERRORS

8 The Speech Data Format

A variety of formats can be used for speech transfer. Multiple compression schemes exist for speech and the resulting compression and speech quality varies. VP however does not specify a format specifically for VOIP or schemes for handling voice calls although it is entirely possible that VP Client Devices might offer such capabilities.

8.1 Overview of the Various Formats

The Raw Speech Format represents speech in the raw form. It is sampled at the negotiated rate and could use mu-law compression as negotiated.

A variety of formats are possible. 3G PP has several defined formats for speech notably the AMR Speech Formats defined in [5] and its references. The capability of handsets to negotiate for the most appropriate format for Voice and multimodal applications is a useful and important requirement. The GSM based format is the most commonly used Wireless format for client devices. It is important to note that client devices need to support only one of the format if they are speech enabled, but could choose to support any number of them.

The aim of the VP Client implementation could be to choose the appropriate format given the channel capability, noise, user choice, server capability, etc. so that there is the best possible speech recognition.

8.2 Raw Speech Format

The Raw Speech Format involves sampling speech data at a specified rate (usually between 4000 and 16000 times a second). It is often the case that such data could be companded using a mu law quantizer.

Further it is possible that the codec could use one, two or even four bytes to sample the speech.

For this format, thus the specification indicates three parameters

```
Struct RawSpeech {
    Short samplerate;
    Short bitspersample;
    Quantizer type;
}
```

8.3 ADPCM Speech Format

In ADPCM or adaptive differential pulse code modulation, speech samples are coded with the step size adaptively adjusted (based on the speech samples) and a predictor that is adaptive. The resulting speech is compressed and for the same bit rate of higher quality.

```
Struct ADPCM {
    Short samplerate;
    Quantizer type;
    Short PredictionOrder;
};
```

8.4 GSM Speech Format

GSM uses the RPE-LTP scheme for speech compression. This uses both short and long term prediction and additional channel coding for recovery in error prone channels. The GSM speech format is a logical choice given the presence of a large number of existing handsets and the overwhelming preponderance of GSM. Multiple rates are possible with GSM although the client device might be capable of supporting only one of them.

VP Clients must ensure that they indicate the rate and class correctly.

```
Struct GSM {
    Enums rate;
    Enums class;
}
```

8.5 AMR Speech Formats

AMR uses algebraic CELP. AMR is defined in [5] and is used by 3G PP for low bit rate speech coding. It defines 8 different block sizes for its MR-ACELP scheme. For speech recognition, the best possible speech format, which is probably the highest rate class (12.2 kbps) is best chosen. It defines several modes for AMR speech.

```
Struct AMR {
    Enums encodedblocksize;
    Enums mode;
}
```

8.6 Sphinx Speech Format

The Sphinx Speech recognition system was developed by CMU and uses homomorphic speech analysis for speech recognition. Delta Cepstral coefficients are used in Sphinx. This format is also added to enable VP Clients to send the Sphinx input format precoded at the client device.

8.7 Silence Detection and Removal

Silence Removal and detection could use the AMR—VAD schemes. Silence lengths must be specified as part of the speech code format.

```
Struct SilenceLength {
    int milliseconds;
}
```

8.8 Preprocessing of Speech for Noise Removal

Discussions relating to Noise removal are currently deferred in this draft. They will be added in a subsequent draft if appropriate.

9. Multimedia Support

Multimedia support is required by various applications and its capabilities are needed in a variety of different ways. Multimedia is however an optional feature in VP Clients and it is intended to support additional stream management and software control to content, its streaming and the running of applications in the MExE service environment that relate to streaming.

Support for delivery (and management) of multimedia content on the client device is provided via the Delivery Multimedia Integration Framework (DMIF) which is a part of the MPEG-4 standard. The primary objective in using this framework is to enable maximum reuse of existing standards and protocols, and to prevent duplication of effort and functionality. The DMIF specification provides an architecture that is immune to future changes/enhancements in delivery technology, and protects investments made in multimedia terminal/application development. Further, the DMIF architecture has been demonstrated in implementation under the MPEG-4 standard.

The DMIF specification is a subset of the MPEG-4 specification, and deals with the delivery layer of the MPEG-4 standard. The DMIF architecture, which includes the DMIF Application Interface (DAI), the DMIF layer, and the DMIF Network Interface (DNI), provides a delivery technology-independent mechanism for real time distribution of multimedia content. MPEG-4, by design, targets multiple operating situations such as local retrieval, remote interaction, multicast etc., and multiple delivery technologies. DMIF makes this possible by providing transparent access to content, using URL addressing schemes, without regard to the underlying delivery technology used.

The MPEG-4 client application running on the VP Server is configured to decode and present (selectively) any or all of the streams (audio & video) obtained from the origin server. The origin server makes use of the DMIF architecture to package content for distribution over a variety of transport channels. The DAI, the DMIF layer and the DNI enable this capability in a media-independent and transport mechanism-independent fashion. Further the VP Server can choose to maintain over-the-air stream rate within bounds and maximize the quality for a given stream rate. Or it can choose to minimize the stream rate for a given picture quality. The VP server with a controlling application (possibly written using MPEG-J) can be configured by the user to manipulate and control streams to best suite his own needs. Further it can perform the necessary rate adaptation and error control that only an intervening edge located entity can.

9.1 Delivery Layer Abstraction

The delivery layer in DMIF consists of a two-layer multiplexing scheme and manages the synchronized delivery of streaming information from source to destination utilizing QoS features as available from the network. The first multiplexing layer enables grouping of elementary (audio & video) streams with low multiplexing overhead. This is useful, for instance, for grouping streams with similar QoS requirements. This layer is specified in part 6 of the MPEG-4 standard. The second multiplexing layer—the transport multiplexing layer—is not specified in MPEG-4. However, the interface to this layer is specified in the standard, and allows the transport of MPEG-4 content over a variety of transport mechanisms such as RTP (UDP, IP), ATM AAL2, H.223 (PSTN), DAB etc. The choice of the particular transport scheme is left to the service provider.

The DMIF application interface sits between the synchronization layer and the DMIF layer. The synchronization layer manages the identification and synchronization (through time-stamping) of elementary streams of different types (scene descriptors, video frames, sprites, audio etc.). The DMIF network interface sits between the DMIF layer and the transport layer, and provides a uniform interface to the upper layers which are unaware of the transport mechanism.

9.2 Client-Server Interaction

The DMIF modules at the client and server work together to provide a session-level service. DMIF includes a signaling protocol—the DMIF Signaling Protocol—which facilitates interaction between a remote terminal and a central server. The applications themselves are unaware of the signaling protocol. User interface commands, for example, are carried transparently by DMIF from the client to the server, and only interpreted in the application layer at the server; similarly, control messages from the server are passed as opaque data to the client where the application layer takes appropriate actions.

For playback control of multimedia streams at the client end, the application sends standard user-interface commands such as PLAY, REWIND, and PAUSE to the server where the appropriate action is taken. The signaling protocol is also useful for keeping track of session logs and other relevant information for billing and related purposes. It allows service providers to charge end users on a "per consumable unit" basis (time, kilobyte etc.)

The client could potentially include multiple DMIF instances configured to provide specific services. The user may request the selection of the appropriate DMIF instance. Alternatively, the instance may be inferred by a DMIF "filter" from the URL requested by the application. The DMIF filter, when implemented appropriately, enables the "plug and play" of different DMIF instances without the need to reset the terminal or reconnect the terminal to the network.

For peer-to-peer applications such as video conferencing, the mobile terminal must also have some minimal "server" side functionality so that the coordinating remote server can synchronize and manage multiple terminals by issuing appropriate requests.

9.3 MMS Support

MMS[4] provides a means by which multimedia messages (MMs) can be delivered to a User Agent. To support MMS, it is possible for the User Agent (in the case of a VP Client enabled client device) to run on either the client device or more appropriately on a server inside the network. The latter capability has several important advantages. It allows the User Agent to support many more formats than would otherwise be feasible. It allows the User Agent to selectively view messages, suppress streams, etc. Further, it is also possible for the MMS Relay and the UA to be closely intertwined and possibly even the same. Several other features required by MMS are also simplified and it is likely that wireless bandwidth use would be more judicious and less wasteful using this approach. Further the finer grain of control possible with this architecture is likely to make it more suitable and functional.

9 State Reestablishment and Caching

The role of state reestablishment is central to the VP Protocol. State as the protocol defines represents the total set of temporarily created information that can be lost due to a reset or power off. The VP Client can then reestablish itself to its prior state by recontacting servers and reobtaining all the information that they hold cached. The protocol requires servers to hold all the information necessary for a client to reestablish its prior state following a reset or power off. The procedures outlined however have several different steps and actions on the part of the client. The VP protocol requires servers to cache ALL requests that they sent to a client that the client might need to reestablish state on ANY of its currently active drawables. This each VP Server is responsible for maintaining state. Further VP Servers also maintain state about event systems as well as sequence numbers.

Further Clients are mobile. As they move around, their identity (for instance IP address in mobile Internet environments) might change. However this should not in any way affect their ability to restore state barring one factor, security. The security associated with application access can change as the VP Client moves. Thus an application that is visible and accessible might be available while the VP Client is inside an office (through Wireless LANs or Wide Area Services). However it might not be accessible from the outside world. Barring this, the ability to return to previously established state is a defining principle.

However, VP Clients also face the problem of both bandwidth and latency. For this reason, they tend to cache requests. These caches can persist across disconnections and possibly even across power off and power on based on the capabilities of the client device. The aim must be to ensure that these caches do not become stale (while the user disconnects).

A further implementation related issue relates to the ability of users to browse the cache of drawables. This is a recommended feature notably when there is a requirement to browse information offline. (for eg. While on the Tokyo subway!). Applications that are inherently data intensive like email and messaging might require support for this. VP Client implementations could also support the ability of users to keep certain caches persistent through user control. This might allow a user to retrieve information that he can then browse as necessary. There is no mandate for such a capability.

10 Supporting Virtual File Stores

The Virtual File Store exists for allowing users the ability to access FileSystem and Personal Space. The feature is completely optional and mainly intended to bring user content closer to users.

Most contemporary client devices, notably those that will be VP Clients will lack much permanent storage. Few will have disks or other permanent storage media. For this reason it is important for Users to have a personal file store based inside the network. This Virtual File Store could include the users content, applications, etc. The VP Client could access this information either using a VP Application that allows the user to browse his file information or by implementing NFS V4 [13] as part of the VP Client. In the latter case, the ability could be used to browse information in any environment that is local. Further on multiple classmark devices, it could be used to transfer applications and associated data to and from the network. This will enable effective management of storage which is scarce on the client device.

The Virtual File Store could also be a storehouse of the user's own content. As the user browses it and requests access (by clicking on files), the file browsing application could launch the appropriate application that can provide access to the content. This could work on remote filesets. Further the user could request movement of his filesets to different locations. Further discussion is beyond the scope of this document.

CONCLUSION

The invention provides a way of supporting larger screen handhelds without burdening their Central Processing Unit (CPU) memory and forcing further innovation in storage and battery technology. In contrast to WAP, the Invention allows the storage of data primarily in servers in the Wide Area network and not in the handheld. Further it maintains a log of UI transactions on the server and replays that log. This new use and unique combination of technology is likely to make a complete range of applications possible and available that were previously not possible. Further, it will allow users to run several applications concurrently that far exceed the capacities of their current handhelds.

At its core, the Virtual PalmTop uses simple and compound requests and actions on drawables with the requests being cached by both clients and servers to better use and efficiently trade off the constrained handset memory and the limited available bandwidth. Compound requests on drawables enables the creation of certain secondary solutions like OnAction primitives, visual objects and state reestablishment through a very small number of remote procedure calls. The caching process, the server maintained state process also produces additional benefits in allowing a handset to drop cached drawables as needed and reestablish state on these as the need arises.

Compound requests was first used in NFS V4 to support wide area file systems where it was used to reduce the number of over the wire calls on the Internet. In the case of Virtual PalmTop, Compound requests serves multiple purposes. It minimizes the number of over the wire calls thus reducing latency on drawing actions on drawables. It also reduces the amount of bandwidth used. It provides an efficient mechanism to update state on the handheld by providing for efficient cache updates. It is used in OnAction primitives and visual objects.

The Mobile Execution Environment (MExE) has multiple classmarks. The intent of the invention is to allow these classmarks and other Java and Common Language Infrastructure (CLI) applications on servers to run having the UI of these applications to be the client.

The invention supports the launch of several applications and concurrently run the several mechanisms, like the Application List Manager (ALM) protocol, reconnection primitives, and recreating state on the client.

The invention also uses Compound Requests in Mobile networks to ameliorate problems relating to latency and bandwidth. The compound requests are adapted from the publicly available Network File System (NFS) V.4 specification (a file access system for wireline networks on Workstation) and uses to decrease the number of round trips over the wire. Also the Event System has compound requests to support the delivery of line drawing events by the user.

Associated with Compound requests is the notion of "OnAction" primitives which browsers use through scripting languages like European Association for Standardizing Information and Communication System (ECMA) Script. However, this is a new extension that is not available in X Windows that incorporates this into a graphics kernel whose application is based elsewhere. In current mobile networks like WAP, the browser runs on the handset. However, this invention will allow the browser application itself to run on a Company's Server. As apart of the application, the server sends "on action" requests on drawables that the client caches waiting for user actions. This new innovation brings additional capabilities.

The invention will decrease the bandwidth usage by maintaining drawable caches that can persist, such as visual objects and the ability to move them as well as the ability to do complex actions on drawables.

The invention has a new support for speech and multimodal applications. The document describes how devices that use a separate channel or devices that use the data channel in either band usage or an out of band protocol can use servers that recognize speech. The recognized content can be fed into multimodal applications running on servers, however mechanisms to enable this on other systems are limited. Multimodal applications are complex and the World Wide Web Consortium (W3C) hopes to build WEB standards for them.

The invention develops features that allow the user to reconnect to his environment whenever he is using the ALM and the overall mechanisms for the complete server maintained state. This achieves a new capability that was previously conceived and defined in the Virtual Home Environment VHE (see references) but unrealized thus far through other means.

The invention further permits offline showing of drawables. When implemented, it allows even a well-connected system like the Virtual Palmtop to allow users to browse offline.

Further, the invention defines a means to allow users the ability to not send all substreams in a multimedia stream over the air while still caching them.

The invention's main capabilities are the following:
(1) Allows server maintained state;
(2) Allows protocol that allows visual applications running across the mobile network to efficiently be "viewed" on VP Clients;
(3) Allows the easy reconstruction of user environment and state thus enabling capabilities outlined by VHE;
(4) Allows multiple concurrent applications running on servers to be viewed on handsets; and
Allows a range of devices from very simple to very complicated devices to run complex applications like Personal Java (or Classmark II) or CLI (Microsoft C# applications) providing optimizations for efficient bandwidth use and the minimization of latency on each of them.

REFERENCES

[1] 3GPP TS 22.057: "MExE Stage 1 Description", available from www.3gpp.org.
[2] 3GPP TS 23.057: "MExE Stage 2 Description", available from www.3gpp.org.
[3] 3GPP TS 22.121: "Universal Mobile Telecommunications System (UMTS); Provision of Services in UMTS—The Virtual Home Environment: Stage 1", available from www.3gpp.org
[4] 3GPP TS 23.140: "Multimedia Messaging Service (MMS): Stage 2", available from www.3gpp.org.
[5] 3GPP TS 26.090: "Mandatory Speech Codec speech processing functions, AMR speech codec; Transcoding functions", available from www.3gpp.org.
[6] RFC 1831, Srinivasan, R., "RPC: Remote Procedure Call Protocol Specification Version 2", August 1995, available from www.ietf.org
[7] RFC 1832, Srinivasan, R., "XDR: External Data Representation Standard", August 1995, available from www.ietf.org
[8] RFC 1833, Srinivasan, R., "Binding Protocols for ONC RPC Version 2", August 1995, available from www.ietf.org.
[9] RFC 2025, Adams, C., "The Simple Public-Key GSS-API Mechanism (SPKM)", October 1996, available from www.ietf.org.
[10] RFC 2203, Eisler, M., Chiu, A. and L. Ling, "RPCSEC_GSS Protocol Specification", August 1995, available from www.ietf.org
[11] RFC 2847, Eisler, M., "LIPKEY—A Low Infrastructure Public Key Mechanism Using SPKM", June 2000, available from www.ietf.org.
[12] RFC 2624, Shepler, S., "NFS Version 4 Design Considerations", June 1999, available from www.ietf.org.
[13] RFC 3010, S. Shepler, B. Callagen, et. al, NFS version 4 Protocol, December 2000, available from www.ietf.org.
[14] The Festival Speech Synthesis System, available at http://www.cstr.ed.ac.uk/projects/festival.
[15] Multimodal Requirements for Voice Markup Languages, W3C Working Draft 10 July 2000, available at http://www.w3.org/TR/multimodal-reqs.
[16] 3GPP TS 26.234: "Packet Switched Streaming Services: Protocols and Codes", available from www.3gpp.org

What is claimed is:

1. A client-server computing system to enable exporting a display of a server-executed application program over a wireless data communications network, the method comprising the following steps executed by the server computer:
launching one or more application programs on the server computer, each said application program generating a graphics display that could be displayed on a remote client device;
sending drawing primitives for the server-generated graphics display to the remote client device;
storing, in the server computer, state information for a session established with the remote client device; and
if the remote client device is disconnected, accepting a reconnection request from the remote client device, sending to the client device information regarding a prior session, if any, and restoring a prior session with the remote client device by bootstrapping itself to its prior session state, wherein the display state of the client device is restored after reconnection.

2. The server computer of claim 1, wherein the one or more application programs includes an E-mail program, a tax program, a financial program, or a browser program or an application that is emulated or executes in an emulated execution environment.

3. The computing system of claim 1, further comprising a multi-modal interface wherein more than one form of input and output exist for the system as well as the applications which run on the client-server computing system with the form of modality being adapted to the needs and capabilities of the client and the application and where servers understand, retain and interpret the semantic context of the user's input and intent using touch, speech and keyboard presses possibly involving deictic gestures and performing user action that are driven by the semantic import of his request where the request where the request could be directed and appropriately forwarded to either an application or service or to navigate or operate the system itself based on the semantic context.

4. The computing system of claim 1, further comprising a multimedia interface with the ability to selectively enable, disable or adaptively modify different output forms and media streams based on the bandwidth usage to suit the connection speed and quality available.

5. A client computer which is in a client-server computing system capable of communicating with application programs executing on a server computing cluster via one or more data communication networks, comprising:
first computer-executable program code capable of establishing a session with the server computer, by authenticating the user and transmitting user information and client capabilities to said server computer via said wireless data communication network, and if the client computer has a prior session with the server computer, then, second computer-executable program code of receiving a list of one or more application programs executing and available for execution on the server computing cluster and when applicable using optional proxy agencies, for managing the handoff of the connection between multiple data communication networks and when applicable maintaining user information in a optional virtual file store capable of storing public application and data as well as user private data;

third computer-executable program code enabling the user to execute new programs or reconnect to existing running programs, either locally available or downloaded, on the server computing cluster;

an input device capable of receiving a user's input to be transmitted to one of the application programs executing on the server computer;

a data communications device capable of receiving one or more drawing primitives from the server computer, said one or more drawing primitives being capable of rendering a graphical image obtaining information regarding a prior session, if any, and then bootstrapping itself to its prior session state and reestablishing the prior session;

a graphical subsystem capable of displaying a graphic based on the one or more drawing primitives received from the server computer, with an optional cache which can be used to reestablish state and reduce bandwidth usage;

an optional multimodal interface;

an optional widget subsystem that includes the ability for the server to create interactive visual objects that drive the human interface, with the system additionally performing application discovery, separation, isolation, load balancing on multiple server computers in the service environment.

6. The client computer of claim 5, wherein the one or more application programs includes an E-mail program, a tax program, a financial program, or a browser program or an application or application group with aforesaid multimodal interface, that is emulated and/or executes or is invoked for execution in an emulated execution environment.

* * * * *